(12) United States Patent
Ghazaryan

(10) Patent No.: US 11,284,053 B2
(45) Date of Patent: *Mar. 22, 2022

(54) HEAD-MOUNTED DISPLAY AND PROJECTION SCREEN

(71) Applicant: Razmik Ghazaryan, Yerevan (AM)

(72) Inventor: Razmik Ghazaryan, Yerevan (AM)

( * ) Notice: Subject to any disclaimer, the term of this patent is extended or adjusted under 35 U.S.C. 154(b) by 0 days.

This patent is subject to a terminal disclaimer.

(21) Appl. No.: 17/174,247

(22) Filed: Feb. 11, 2021

(65) Prior Publication Data

US 2021/0258549 A1  Aug. 19, 2021

Related U.S. Application Data

(63) Continuation of application No. 16/719,824, filed on Dec. 18, 2019, now Pat. No. 10,958,884, which is a continuation of application No. 16/565,328, filed on Sep. 9, 2019, now Pat. No. 10,554,940, which is a continuation-in-part of application No. 16/370,694, filed on Mar. 29, 2019, now Pat. No. 10,466,489.

(51) Int. Cl.
| | |
|---|---|
| *G02B 27/01* | (2006.01) |
| *G02B 27/10* | (2006.01) |
| *H04N 9/31* | (2006.01) |
| *G03B 21/26* | (2006.01) |
| *G02B 27/14* | (2006.01) |

(52) U.S. Cl.
CPC ....... *H04N 9/3188* (2013.01); *G02B 27/0172* (2013.01); *G02B 27/1066* (2013.01); *G03B 21/26* (2013.01); *H04N 9/3105* (2013.01); *G02B 27/141* (2013.01); *G02B 27/149* (2013.01)

(58) Field of Classification Search
CPC .............. G02B 27/0149; G02B 27/149; G02B 27/0172; G02B 27/1066
See application file for complete search history.

(56) References Cited

U.S. PATENT DOCUMENTS

| | | |
|---|---|---|
| 3,668,984 A | 6/1972 | Rosin |
| 4,621,892 A | 11/1986 | Kataoka |
| 4,747,646 A | 5/1988 | Andrews |
| 4,845,373 A | 7/1989 | Jamieson et al. |
| 5,136,675 A | 8/1992 | Hodson |
| 5,398,082 A | 3/1995 | Henderson |

(Continued)

FOREIGN PATENT DOCUMENTS

| | | |
|---|---|---|
| CN | 101535928 A | 9/2009 |
| EP | 2786196 A1 | 10/2014 |

(Continued)

OTHER PUBLICATIONS

"Apple has applied for a foveated rendering patent", Bets VR Tech, Feb. 27, 2018, downloaded from http://bestvr.tech/apple-applied-foveated-rendering-patent/ on Feb. 3, 2019, 6 pages.

(Continued)

*Primary Examiner* — Ryan D Howard
(74) *Attorney, Agent, or Firm* — Lowenstein Sandler LLP

(57) ABSTRACT

A head-mounted display comprises an image source configured to output one or more image components and one or more optical element configured to receive the one or more image components and output one or more images onto a projection screen.

32 Claims, 50 Drawing Sheets

(56) References Cited

U.S. PATENT DOCUMENTS

| | | |
|---|---|---|
| 6,356,700 B1 | 3/2002 | Strobl |
| 6,573,819 B1 | 6/2003 | Oshima |
| 6,665,012 B1 | 12/2003 | Yang et al. |
| 6,729,734 B2 | 5/2004 | Childers et al. |
| 6,945,652 B2 | 9/2005 | Sakata et al. |
| 6,991,336 B2 | 1/2006 | Matsui |
| 7,102,700 B1 | 9/2006 | Pease et al. |
| 7,164,881 B2 | 1/2007 | Donovan |
| 7,535,436 B2 | 5/2009 | Baker et al. |
| 7,629,945 B2 | 12/2009 | Baudisch |
| 7,762,670 B2 | 7/2010 | Chiang et al. |
| 8,125,408 B2 | 2/2012 | Baker et al. |
| 8,356,905 B2 | 1/2013 | Cossairt et al. |
| 8,824,837 B2 | 9/2014 | Ren et al. |
| 9,001,028 B2 | 4/2015 | Baker |
| 9,185,373 B2 | 11/2015 | Baker et al. |
| 9,607,428 B2 | 3/2017 | Li |
| 9,661,287 B2 | 5/2017 | Baker et al. |
| 9,710,887 B1 | 7/2017 | Sahlsten et al. |
| 9,711,072 B1 | 7/2017 | Konttori et al. |
| 9,711,114 B1 | 7/2017 | Konttori et al. |
| 9,874,752 B2 | 1/2018 | Gao et al. |
| 9,892,669 B2 | 2/2018 | Heide et al. |
| 9,905,143 B1 | 2/2018 | Konttori et al. |
| 9,972,071 B2 | 5/2018 | Wilson et al. |
| 9,983,413 B1 | 5/2018 | Sahlsten et al. |
| 9,989,774 B1 | 6/2018 | Sahlsten et al. |
| 10,054,797 B2 | 8/2018 | Spitzer |
| 10,140,695 B2 | 11/2018 | Wilson et al. |
| 10,304,368 B2 | 5/2019 | Nose |
| 10,379,419 B1 | 8/2019 | Lu et al. |
| 10,466,489 B1* | 11/2019 | Ghazaryan ............ H04N 13/344 |
| 10,554,940 B1* | 2/2020 | Ghazaryan ......... G02B 27/1066 |
| 10,764,567 B2 | 9/2020 | Ollila et al. |
| 10,958,884 B1* | 3/2021 | Ghazaryan ............ H04N 9/3105 |
| 2002/0180869 A1 | 12/2002 | Callison et al. |
| 2003/0117368 A1 | 6/2003 | Pedersen |
| 2004/0135744 A1 | 7/2004 | Bimber et al. |
| 2004/0140965 A1 | 7/2004 | Wang et al. |
| 2005/0068617 A1 | 3/2005 | Mizuno et al. |
| 2005/0088425 A1 | 4/2005 | Sun |
| 2005/0128441 A1 | 6/2005 | Morgan |
| 2005/0206770 A1 | 9/2005 | Nathanson et al. |
| 2005/0264525 A1 | 12/2005 | Adams et al. |
| 2006/0119804 A1 | 6/2006 | Dvorkis et al. |
| 2007/0024995 A1 | 2/2007 | Hayashi |
| 2007/0064199 A1 | 3/2007 | Schindler et al. |
| 2007/0133635 A1 | 6/2007 | Heo |
| 2007/0176909 A1 | 8/2007 | Pavlowski |
| 2007/0205980 A1 | 9/2007 | Dijk |
| 2008/0037090 A1 | 2/2008 | Miller et al. |
| 2008/0143969 A1 | 6/2008 | Aufranc et al. |
| 2008/0225005 A1 | 9/2008 | Carroll |
| 2009/0135317 A1 | 5/2009 | Lynam et al. |
| 2010/0097393 A1 | 4/2010 | Yoneno |
| 2016/0240013 A1 | 8/2016 | Spitzer |
| 2016/0260196 A1 | 9/2016 | Roimela et al. |
| 2016/0267884 A1 | 9/2016 | Binstock et al. |
| 2018/0003962 A1 | 1/2018 | Urey et al. |
| 2018/0033405 A1 | 2/2018 | Tall et al. |
| 2018/0068640 A1 | 3/2018 | Martin |
| 2018/0081178 A1 | 3/2018 | Shpunt |
| 2018/0136720 A1 | 5/2018 | Spitzer et al. |
| 2018/0137602 A1 | 5/2018 | Spitzer et al. |
| 2018/0269266 A1 | 9/2018 | Cancel Olmo et al. |
| 2018/0275410 A1 | 9/2018 | Yeoh et al. |
| 2018/0284451 A1 | 10/2018 | Eash et al. |
| 2018/0348523 A1* | 12/2018 | Yokoyama ........... G02B 27/149 |
| 2018/0364482 A1* | 12/2018 | Georgiou ........... G02B 27/0172 |
| 2019/0025594 A1* | 1/2019 | Holmer ................ G02B 5/0278 |
| 2019/0243134 A1* | 8/2019 | Perreault ................ G02B 26/08 |
| 2020/0233222 A1 | 7/2020 | Peuhkurinen |

FOREIGN PATENT DOCUMENTS

| | | |
|---|---|---|
| JP | 2004334093 A | 11/2004 |
| JP | 2006189573 A | 7/2006 |
| WO | 2018035166 A1 | 2/2018 |
| WO | 2018057472 A1 | 3/2018 |

OTHER PUBLICATIONS

Tan, G. et al., "Foveated imaging for near-eye displays", Optics Express vol. 26, Issue 19, 2018, 14 pages, downloaded from https://www.osapublishing.org/oe/fulltext.cfm?uri=oe-26-19-25076 &id=398149 on Feb. 3, 2019.

Ogawa, M. et al. "Assessment of Stereoscopic Multi-Resolution Images for a Virtual Reality System", International Journal of Virtual Reality, vol. 9, No. 2, 2009, pp. 31-37, Manuscript received Sep. 11, 2009.

Yoshida, A. et al., "Design and Applications of a High-Resolution Insert Head-Mounted-Display", IEEE, Proceedings of the Virtual Reality Annual International Symposium (VRAIS '95) pp. 84-93.

Parkhurst, D. et al. "Evaluating Variable Resolution Displays with Visual Search: Task Performance and Eye Movements", presented at The Eye Tracking Research and Applications Symposium, Nov. 6-8, 2000, Palm Beach Gardens, FL, pp. 105-109.

Guenter, B. et al. "Foveated 3D Graphics", ACM Transactions on Graphics (TOG) vol. 31, No. 6, Nov. 2012, 10 pp.

Duchowski, A.T. et al. "Gaze-Contingent Displays: Review and Current Trends", 2003, 13 pp.

Reingold, E.M., et al. "Gaze-Contingent Multiresolution Displays: An Integrative Review", Human Factors, vol. 45, No. 2, Summer 2003, pp. 307-328.

Burbidge, D. et al. "Hardware Improvements to the Helmet Mounted Projector on the Visual Display Research Tool (VDRT) at the Naval Training Systems Center", Proceedings of SPIE, vol. 1116, 1989 Technical Symposium on Aerospace Sensing, Orlando, Florida, pp. 52-60.

Howlett, "High-Resolution Inserts in Wide-Angle Head-Mounted Stereoscopic Displays", SPIE vol. 1669, Stereoscopic Displays and Applications III, 1992, pp. 193-203.

Rolland, J.P. et al. "High-Resolution Inset Head-Mounted Display", Applied Optics, vol. 37, No. 19, Jul. 1, 1998, pp. 4183-4193.

Baudisch, P. et al. "Keeping Things in Context: A Comparative Evaluation of Focus Plus Context Screens, Overviews, and Zooming", Proceedings of the SIGCHI, Apr. 20-25, 2002, Minneapolis, Minnesota, 8 pps.

Albert, R. et al. "Latency Requirements for Foveated Rendering in Virtual Reality", ACM Transactions on Applied Perception, vol. 14, No. 4, Article 25, Sep. 2017, 13 pp.

Gruninger, J. et al. "Multi-Resolution-Display System for Virtual Reality Setups", Ergonomics and Health Aspects, HCII 2011, LNCS 6779, pp. 180-189, Heidelberg, Germany.

Yoshida, A. et al. "Optical Design and Analysis of a Head-Mounted Display with a High-Resolution Insert", SPIE, vol. 2537, 1995, pp. 71-82.

Patney, A. et al. "Towards Foveated Rendering for Gaze-Tracked Virtual Reality", ACM Trans. Graph., vol. 35, No. 6, Article 179, Nov. 2016, 12 pp.

International Search Report and Written Opinion of International Patent Application No. PCT/US2020/023695 dated May 21, 2020, 6 pages.

Allen, W. et al. "Invited Paper: Wobulation: Doubling the Addressed Resolution of Projection Displays"; SID Symposium Digest of Technical Papers; May 2005; pp. 1514-1517; vol. 36, No. 1; Blackwell Publishing Ltd., Oxford, UK.

Cheng, Q. et al. "Resolution enhancement of near-eye displays by overlapping images"; Optics Communications: Oct. 11, 2019; 6 pages; Elsevier B.V.

Cossairt, O. et al. "Occlusion-capable multiview volumetric three-dimensional display"; Applied Optics; Mar. 10, 2007; pp. 1244-1250; vol. 46, No. 8.

Denes, G. et al. "Temporal Resolution Multiplexing: Exploiting the limitations of spatio-temporal vision for more efficient VR render-

(56) References Cited

OTHER PUBLICATIONS ing"; IEEE Transactions on Visualization and Computer Graphics; Feb. 18, 2019; 11 pages; vol. 25 No. 5.

Didyk, P. et al. "Apparent Display Resolution Enhancement for Moving Images"; ACM Transactions on Graphics; Jul. 2010; 8 pages; vol. 29, No. 4, Article 113.

Fung, K. et al. "Q-View: A Compression Technology for UHD Resolution, Low Power, and Low Cost LCOS Panels"; SID Symposium Digest of Technical Papers; Sep. 2019; pp. 342-344; vol. 50.

Heide, F. et al. "Cascaded Displays: Spatiotemporal Superresolution using Offset Pixel Layers"; ACM Transactions on Graphics; Jul. 2014; 11 pages; vol. 33, No. 4, Article 60.

Jones, A. et al. "Rendering for an Interactive 360° Light Field Display"; ACM SIGGRAPH proceedings; Jul. 29, 2007; 10 pages.

Kading, B. et al. "Enhancing Head and Helmet-Mounted Displays Using a Virtual Pixel Technology"; SPIE, Display Technologies and Applications fo Defense, Security and Avionics, 2015, 7 pages; vol. 9470 947011-1; downloaded from http://proceedings.spiedigitallibrary.org/ on Jun. 3, 2015.

Lanman, D. et al. "Near-Eye Light Field Displays"; ACM Transactions on Graphics; Nov. 1, 2013; 10 pages; vol. 32, No. 6.

Lee, C. et al. "Compact three-dimensional head-mounted display system with Savart plate"; Optics Express, Optical Society of America; Aug. 22, 2016; pp. 19531-19544; vol. 24, No. 17.

Lee, K. et al. "Resolution Enhancement for AR/VR Displays Based on LC Sub-Pixel Frame Shift"; Frontiers in Optics Sep. 16, 2018; 2 pages.

Lee, Y. et al. "Enhancing the resolution of a near-eye display with a Pancharatnam-Berry phase deflector"; Optics Letters, Optical Society of America; Nov. 15, 2017, pp. 4732-4735; vol. 42, No. 22.

Leong, J. et al. "Super-resolution foveated imaging system for near-eye display (NED) using tilting concave mirror" SPIE—Advances in Display Technologies X; Feb. 26, 2020; 8 pages.

Napoli, J. et al. "Imaging artifact precompensation for spatially multiplexed 3-D displays"; SPIE—IS&T Electronic Imaging; 2008; 12 pages; vol. 6803 680304-1; downloaded from http://proceedings.spiedigitallibrary.org/ on May 18, 2015.

Nguyen, J. et al. "Screen door effect reduction using mechanical shifting for virtual reality displays"; SPIE Optical Architectures for Displays and Sensing in Augmented, Virtual, and Mixed Reality (AR, VR, MR); Feb. 19, 2020; 12 pages.

Naller, C. et al. "Q-View Technology—Approach to Achieving High Resolution and Low Power in Small Pixel Micro-Display"; SID Symposium Digest of Technical Papers; May 2018; pp. 835-838; vol. 49, No. 1.

Zhan, T. et al. "Improving near-eye display resolution by polarization multiplexing"; Optics Express; May 27, 2019; pp. 15327-15334; vol. 27, No. 11.

* cited by examiner

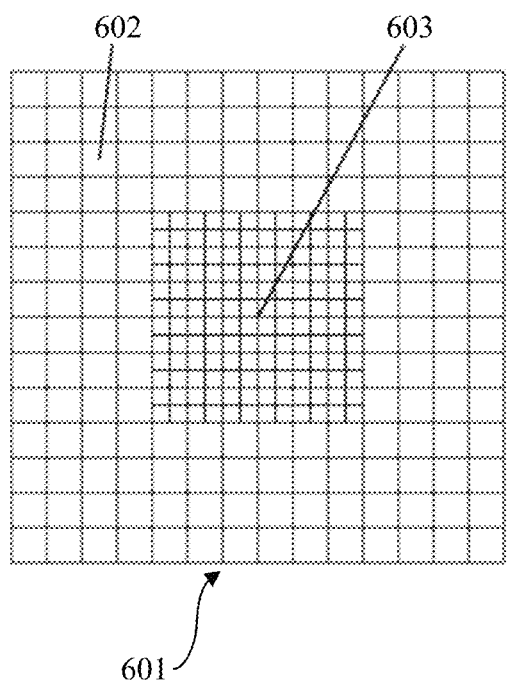 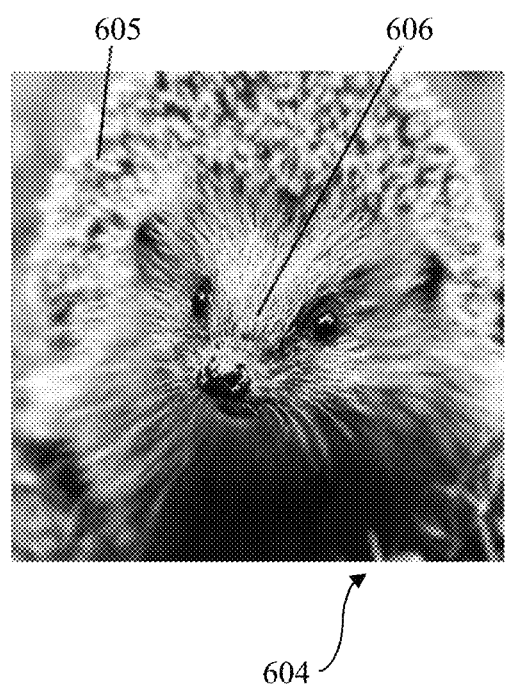
*Figure 6A*            *Figure 6B*

 
701       702
*Figure 7A*       *Figure 7B*

801

802

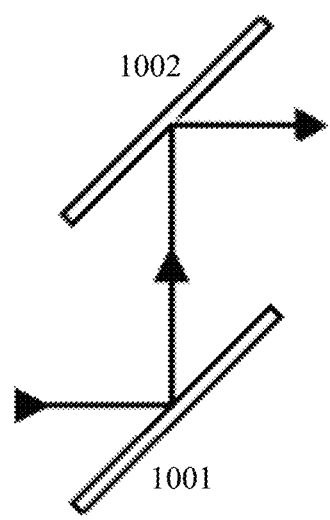 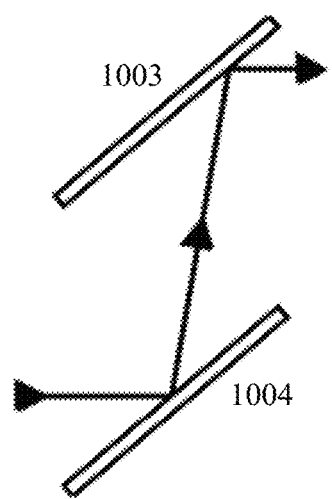
*Figure 10A*  *Figure 10B*

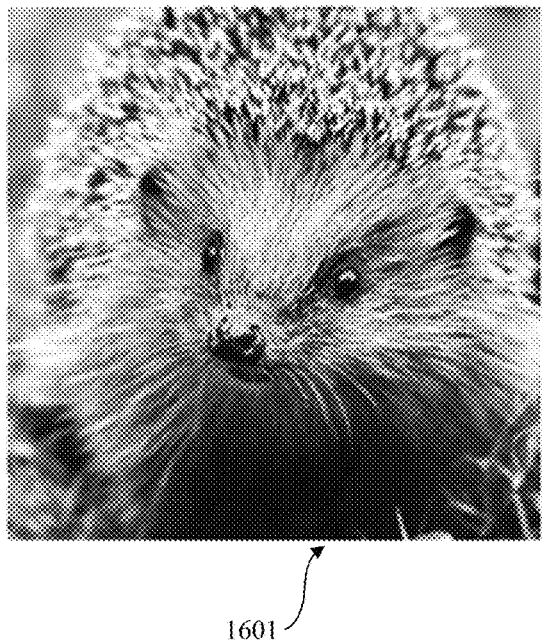 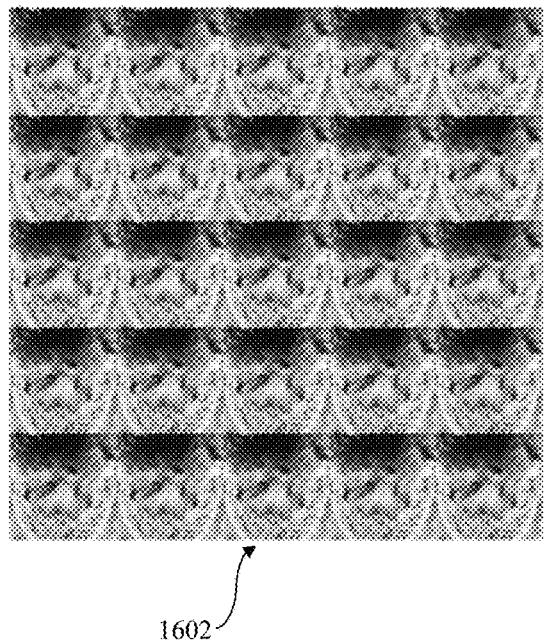
*Figure 16A*  *Figure 16B*

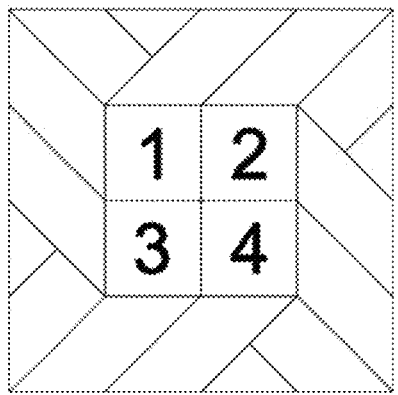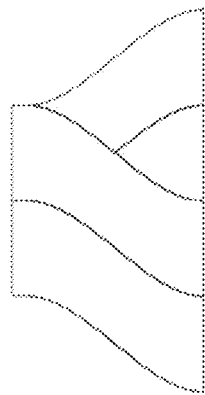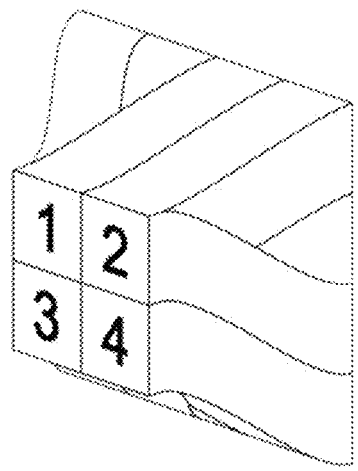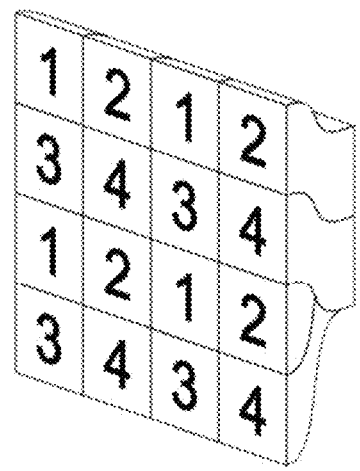
*Figure 29*

3401 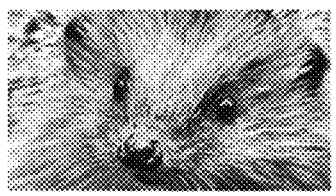
3402 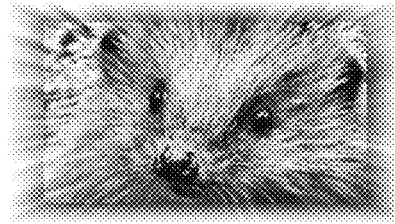
3403 
3404 
*Figure 34*

HEAD-MOUNTED DISPLAY AND PROJECTION SCREEN

RELATED APPLICATIONS

The present application is a continuation-in-part of U.S. patent application Ser. No. 16/719,824, filed Dec. 18, 2019, which is a continuation of U.S. patent application Ser. No. 16/565,328 filed Sep. 9, 2019, which is a continuation-in-part application of U.S. patent application Ser. No. 16/370,694, filed Mar. 29, 2019, which is incorporated by reference herein.

TECHNICAL FIELD

The systems, apparatuses and methods described herein generally relate to video projection systems and, in particular, to video projection systems for near-eye displays, such as in virtual reality headsets.

BACKGROUND

Since the early days of computing and television, display systems have relied on displaying of visual information across a screen. Through the years, processing power and miniaturization have allowed the screen resolution to increase dramatically, but the basic approach of uniformly displaying pixels across the screen has prevailed. However, this approach requires significant increases in communications and computational performance to deliver all of the pixels as the resolution increases. These problems have become particularly acute with the advent of virtual reality headsets, where the images, when viewed through, but not limited to, an eyepiece or waveguide cover significant amount of the viewer's field of view compared to traditional displays and end up having some of their pixels usually or always in or near to the viewer's peripheral vision.

Traditional displays have pixels or scanlines with fixed sizes and distances from each other in typically a regular grid or similar uniformly distributed pixel or scanline pattern on a flat or slightly curved screen. See FIG. 1A which shows the single pixel 101 approach to display devices such as LCD (Liquid crystal display) or OLED (Organic light-emitting diode) computer or television displays. FIG. 1B shows the scanline approach 102 used in other display devices such as CRT (Cathode-ray tube) computer or television displays and CRT or LBS (Laser beam steering) video projectors. But the eye interprets the field of vision 103 with high resolution at the center 104 and a decreased vision at the periphery 105, as seen in FIG. 1C. Although human vision is quite different from the single pixel 101 or scanline 102 design with far more photoreceptor cells and visual acuity in the foveal vision 104, this kind of fixed and even distribution of pixels or scanlines ensures a similar quality image when viewing every part of a screen from many distances and angles.

Current examples where this uniform distribution of pixels or scanlines does not apply is very limited and mostly unintentional, for example in the projection mapping industry where often 3d surfaces are used as the screens of video projectors.

Lately, a need for variable-resolution screens 103 has emerged because of increasing manufacturing costs of high resolution microdisplays, displays and projectors and much more demanding computational, bandwidth and storage requirements for display content created for traditional screens due to their increasing resolutions and fields of view, especially in virtual reality, augmented reality and mixed reality headsets (from now on referred to as "XR headsets").

Current XR headsets aim to provide a field of view close to the human field of view, which is on average 270 degrees horizontally by 135 degrees vertically taking into account eye rotations and is usually lower than that, for example 90 degrees horizontally by 100 degrees vertically for virtual reality headsets and lower than 50 degrees horizontally by 50 degrees vertically for augmented reality headsets which is still higher than many screens at normal viewing distances such as monitors, TVs and projection screens.

Other examples are video projectors that can be set up to project very wide and cover more of the viewer's field of view than with display technologies such as CRT, LCD, OLED or microLED monitors and TVs and projection screens at normal viewing distances.

A hybrid of the two is also a potential use case for this method and display apparatus such as has been demonstrated by HMPDs (Head-Mounted Projective Display) which are both a head-mounted device but project onto a retroreflective projection screen like the ones used for video projectors rather than to a waveguide or projection screen viewed with an eyepiece lens or other optics similar to other XR headsets.

At such high fields of view, the same amount of pixels or scanlines provides less pixels or scanlines per degree of the field of view of the viewer and can suffer from noticeable lack of detail, pixelation and screen-door effect or gap between scanlines.

Current methods of displaying less pixels in the periphery is done by having very high pixel density everywhere on the display and displaying less resolution on the pixels displayed near or in the viewer's peripheral vision rather than having less pixels or scanlines there to begin with. This is a technique the Sony PlayStation VR and Oculus Go head-mounted displays use (similar to 103).

This approach of increasing the pixel or scanline count on the display uniformly poses both cost and computational challenges as way more pixels or scanlines are required to cover the high fields of view, especially for the average human field of view of 270 degrees horizontally (195 degrees per eye) by 135 degrees vertically which for a 60 pixels per degree resolution needed for a 20/20 vision would require about 11,700 pixels horizontally and 8100 pixels vertically per eye.

Manufacturing custom screens with more pixels where the viewer's foveal view can reach will be very expensive and require custom display controllers.

Even if it were possible and economically feasible, the computational power required for creating real-time foveated content described above for such screens could be used for other tasks such as rendering and displaying more detailed virtual reality images in real-time.

So far methods have been proposed of optically combining two projectors or displays to achieve variable-resolution screens such as with a beam splitter. There are disadvantages to this approach such as higher cost, weight, size, requirement for color correction and synchronization between different displays or projectors and only being able to have one high resolution part and one low resolution part on the image with two displays or projectors (see the teachings in the following patents: US20160240013A1, U.S. Pat. Nos. 9,711,072B1, 9,983,413B1, 9,989,774B1, 9,711,114B1, 9,905,143B1).

Also, tilting beam splitters or steering an image with mirrors or prisms to reposition the high resolution area is challenging and results in perspective distortion and some optical aberrations which some of the methods described herein solve. Additionally, tilting or rotating mechanical parts have disadvantages associated with mechanically moving parts which some of the methods described herein solve.

BRIEF SUMMARY OF THE INVENTION

An optical apparatus for creating a variable-resolution image stream on a screen is described herein that is made up of a projector connected to a video source, where the projector transmits a light image stream in the form of a high resolution, small image component and a low resolution, large image component. Each frame of the variable-resolution image stream may be or include one of a) a low resolution, large image, b) a high resolution, small image, or a superimposition of a high resolution, small image and a low resolution, large image. This light image stream is sent to an image steering element that directs the high resolution, small image component and the low resolution, large image component to a small image optical element and to a large image optical element. Additionally, the image steering element may function as an image separation element, and may separate the first image component from the second image component in embodiments. The optical apparatus may also include an image separation element that separates the high resolution, small image component and the low resolution, large image component into a high resolution, small image stream and a low resolution, large image stream, where the small image optical element and the large image optical element focus the low resolution, large image stream and the high resolution, small image stream on the screen such that the low resolution, large image stream and the high resolution, small image stream appear as the variable-resolution image stream on the screen.

In some embodiments, the light image stream from the projector is time multiplexed between the high resolution, small image component in a first frame (frame n) and the low resolution, large image component in a next frame (frame n+1). The image separation element could be an optical shutter to manage the time multiplexing. Alternately, the light image stream from the projector could have the high resolution, small image component on one part of each image and a low resolution, large image component on another part of the image. The image separation element could be an optical mask (stencil) to support this embodiment.

In some embodiments, the screen is embedded in a virtual reality headset. The small image optical element could include a lens array. The image steering element could be a rotating optical slab, mirrors, beam splitter (e.g., polarizer beam splitter or reflective polarizer beam splitter), wedge (Risley) prisms, liquid crystal switchable mirrors, optical shutters or optical masking elements. The large image optical element could be a lens or other optics that focuses the low resolution, large image stream to an outer portion of the screen or viewer's field of view. The small image optical element could be a lens or other optics that focuses the high resolution, small image stream to a center portion of the screen or viewer's field of view.

An optical method creating a variable-resolution image stream on a screen is described herein, where the method includes the steps of creating a light image stream in the form of a high resolution, small image component and a low resolution, large image component with a projector connected to a video source; directing the high resolution, small image component and the low resolution, large image component, with an image or beam steering element, to a small image optical element and to a large image optical element; separating the high resolution, small image component and the low resolution, large image component into a high resolution, small image stream and a low resolution, large image stream with an image separation element; and focusing, by the small image optical element and the large image optical element, the low resolution, large image stream and the high resolution, small image stream to form the variable-resolution image stream on the screen.

In some embodiments of the optical method, the light image stream from the projector is time multiplexed between the high resolution, small image component in a first frame (frame n) and the low resolution, large image component in a second frame (frame n+1). The separation of these components could be accomplished by using an optical shutter for the image separation element. In another embodiment of the optical method, the light image stream from the projector could have the high resolution, small image component on one part of each image and a low resolution, large image component on another part of the image, and the image separation element could be an optical mask (stencil).

In some embodiments of the optical method, the screen is embedded in a virtual reality headset. The small image optical element could include a lens array. The image steering element could be a rotating optical slab, mirrors, beam splitter, wedge (Risley) prisms, optical shutters, liquid crystal switchable mirrors, or optical masking elements. The large image optical element could be a lens or other optics that focuses the low resolution, large image stream to an outer portion of the screen or viewer's field of view. The small image optical element could be a lens or other optics that focuses the high resolution, small image stream to a center portion of the screen or viewer's field of view. The screen could be a flat or curved diffuse projection screen, a flat or curved retroreflective projection screen, a flat or curved holographic diffuser projection screen, a flat or curved fiber optic taper bonded to a first surface or projection screen, or a flat or curved mirror or Fresnel mirror which focuses a projection onto a viewer's retina (such as the ones used in collimated display systems). The screen could also be a viewer's retina. The projector could be a microdisplay or a display.

BRIEF DESCRIPTION OF THE DRAWINGS

FIG. 6A shows an illustration with rectangles representing individual pixels.

FIG. 6B shows an illustration with individual pixels displaying an actual image.

FIG. 7A shows an original image.

FIG. 7B shows a perspective distorted image.

FIG. 10A illustrates offsetting the image or beam with two mirrors tilted 45 degrees.

FIG. 10B illustrates offsetting the image or beam with two mirrors tilted 40 degrees.

FIGS. 16A and 16B illustrates an image (FIG. 16A) as it is seen on a screen or viewer's retina (FIG. 16B) after using a lens array.

FIG. 19 shows the portions of the images to be optically and digitally rearranged do not have to be partitioned from the middle of the images.

FIG. 29 illustrates a fiber optic taper or faceplate from four different angles, in accordance with an embodiment.

FIG. 34 illustrates various visual effects that may be applied beyond a source 2D frame on a variable resolution screen, in accordance with an embodiment.

DETAILED DESCRIPTION

Figure 1A:
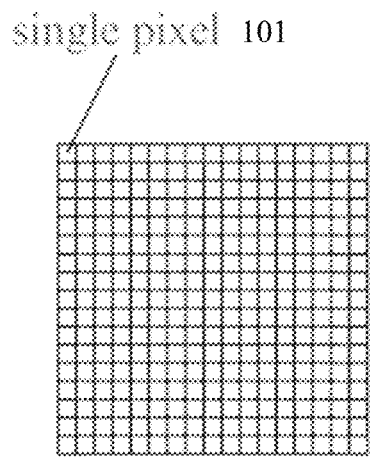
FIG. 1A shows the single pixel approach to display devices.
Figure 1B:
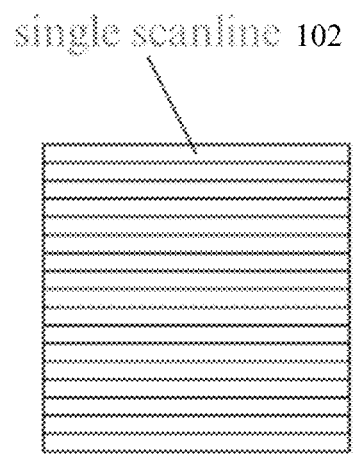
FIG. 1B shows the scanline approach to display devices.
Figure 1C:
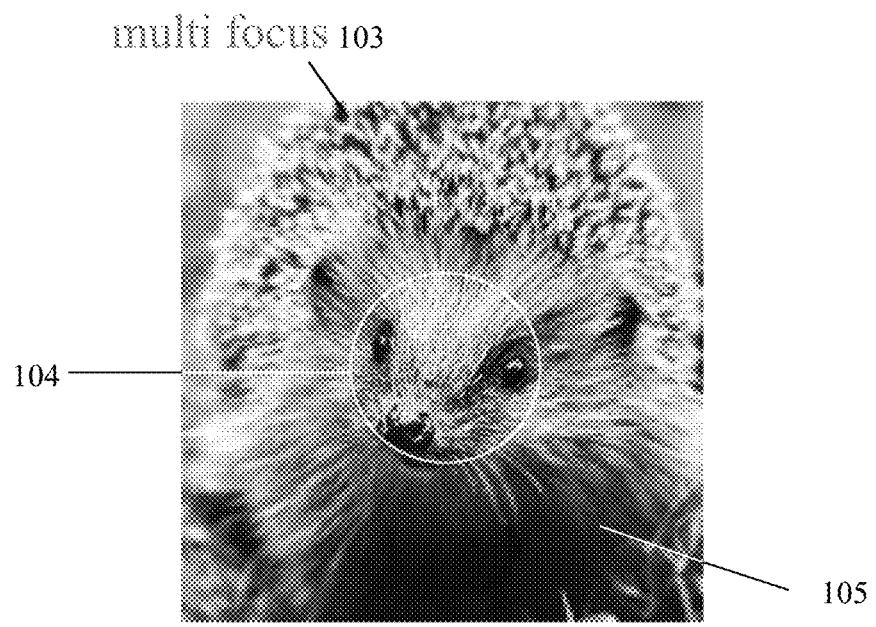
FIG. 1C shows a multi-focus approach to a display.

The present inventions describe a system and method for implementing a variable-resolution screen, where the area in front of the viewer's field of view, where the foveal vision expects the greatest resolution, are in a higher resolution than the areas of the screen on the periphery, where the peripheral vision expects less resolution and clarity. In this application four major (and many minor) embodiments are described.

The following inventions describe a method and display apparatus for achieving a variable-resolution screen, which can be defined as a screen which allows the image, when viewed directly or by, but not limited to, an eyepiece (the lens closest to the viewer's eye) or waveguide, provide a resolution which is not uniform across the image but rather more pixels or scanlines are visible to the viewer where needed on the image, such as the center of the viewer's field of view and less in other part or parts of the image.

Such a screen is different from existing screens displaying pre-rendered or real time-rendered foveated content as such methods of variable-resolution content display limit the high resolution part of the content to the native resolution possible with that part of the screen. The term "screen" can also be used to describe the viewer's retina.

Foveated content is an image, video or real time-generated images where on each image the resolution varies across the image, for example to show more resolution only where the viewer is looking, is able to look at or is meant to look at.

The variable-resolution screen methods and apparatus described here allow to achieve more resolution visible in one or more parts of the image than is possible with the microdisplay, display or projector when used without the methods described here.

The methods described may be performed using existing computing hardware such as a PC, mobile phone or tablet to provide the pre-rendered or real time-rendered content for it.

The methods may be performed with as little as a single DLP (Digital light processing), LCoS (Liquid crystal on silicon), LCD (Liquid crystal display), OLED (Organic light-emitting diode), MicroLED or similar microdisplay, display or projector or LBS (Laser beam steering) or similar projector 401, 411, 501, 511, 521, 551, 2301, 5111, 5121, 5151, 1401 for one variable-resolution screen or one of the above for one variable-resolution screen per eye, for example for head-mounted displays. Using as little as a single microdisplay, display or projector or one per eye allows to minimize the cost of producing such a variable-resolution screen apparatus, reduce weight and size of the apparatus. A single microdisplay, display or projector can also refer to microdisplays, displays or projectors where a separate display or microdisplay panel is used for each color channel and they are optically combined such as with a trichroic prism, X-cube prism or dichroic filters. This can be useful for various reasons such as eliminating color separation (also known as "rainbow artifact") and increasing the refresh rate.

The usage of such variable-resolution screens are, but not limited to, virtual reality, augmented reality and mixed reality headsets ("XR headsets") and video projectors.

Positioning with Mirrors or Wedge Prisms of a High Resolution Small Image Over a Low Resolution Large Image In one embodiment, a variable-resolution screen can be achieved by positioning a high resolution small image over a low resolution large image with mirrors or wedge (Risley) prisms.

To achieve a variable-resolution screen a single display technology such as a microdisplay or display 401, 411, 501, 511, 521, 551 is operated at fast refresh rates. Each consecutive frame (frame n+1) the microdisplay or display is used to either display a small high resolution part 204 or parts of the final image 205 or a large low resolution part 203 or parts of the final image 205 by sharing the refresh rate of the frames 201, 202 and final image 205 between the latter's two or more parts 203, 204. Persistence of vision blends the two parts 203, 204 into one final image 205. See FIG. 2.

Figure 2:
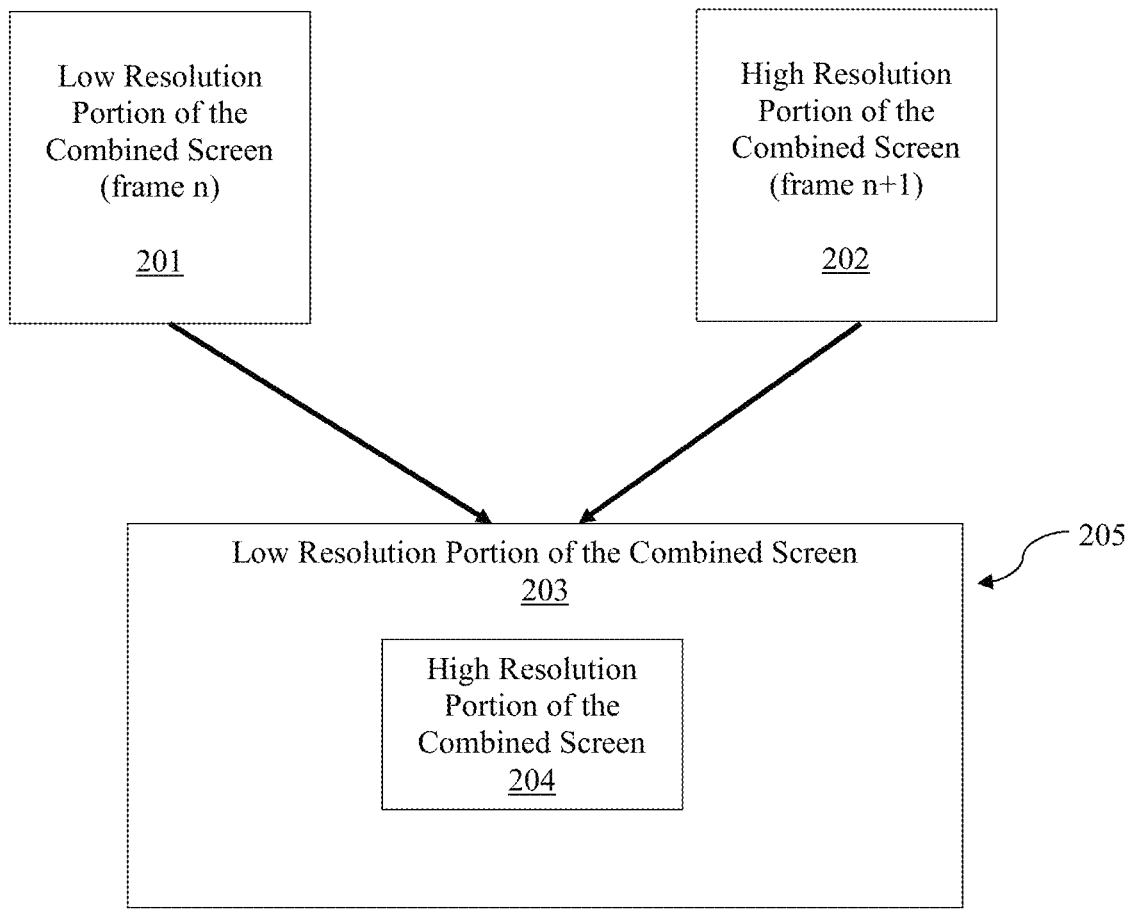
FIG. 2 illustrates using persistence of vision to blend images from two consecutive frames into one final image.

In FIG. 2, the frames alternate with the low resolution frame n 201 displayed followed by high resolution frame n+1 202. With a sufficient refresh rate, the eye interprets the two as a single image 205. The low resolution portion of the combined screen 203 could have a neutral color (black) in the high resolution area 204. And the high resolution portion of the combined screen 204 could have a neutral color (black) in the low resolution area 203. A slight overlap between the two regions 203, 204 will prevent a noticeable seam or gaps by having a blend region where regions 203, 204 overlap. In another embodiment, the low resolution section 203 is not masked and blends with the high resolution portion 204 in the area where the high resolution resides.

Alternatively, to achieve a variable-resolution screen a single display technology such as a microdisplay or display is optically split into two or more parts 301, 302. This method allows one part 301 or parts to use more pixels on the final image by sacrificing the resolution of another part 302 or parts on the final image. See FIG. 3.

The two methods can also be combined to allow to create more parts on the final image or to allow to create two or more final images by sharing both the resolution and refresh rate of the microdisplay or display between the parts, such as for using a single microdisplay or display to create final images for both eyes in a head-mounted display.

Figure 3:
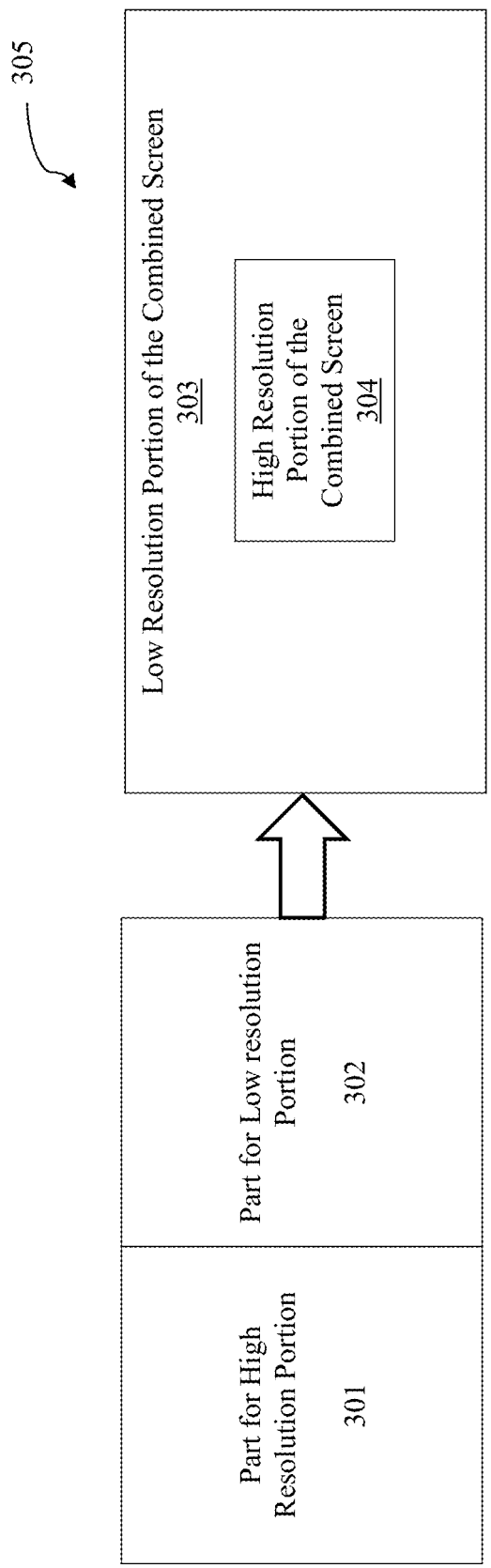
FIG. 3 shows splitting an image of a microdisplay, display or projector into two parts that are combined.

In FIG. 3, a 16:9 aspect ratio microdisplay or display split into two parts 301, 302 is shown, for example 1920×1080 pixel microdisplay or display split into a small 1080×1080 pixel high resolution part 301 and a large 840×1080 pixel low resolution part 302 (the latter may then be optically flipped 90 degrees for a better aspect ratio).

Using optical or optical and mechanical and also optionally digital methods, the parts 301 and 302 can be resized and superimposed on each other 305. The large low resolution part 303 can be masked where the small high resolution part is 304 and where they overlap.

The masking can further be made more seamless by blending the edges optically or digitally by making the transition less abrupt with a digital resolution falloff in the high resolution small image or dimming the pixels with a falloff on both images.

The brightness levels between the two parts may be balanced optically such as with neutral density filters or digitally.

Figure 4A:
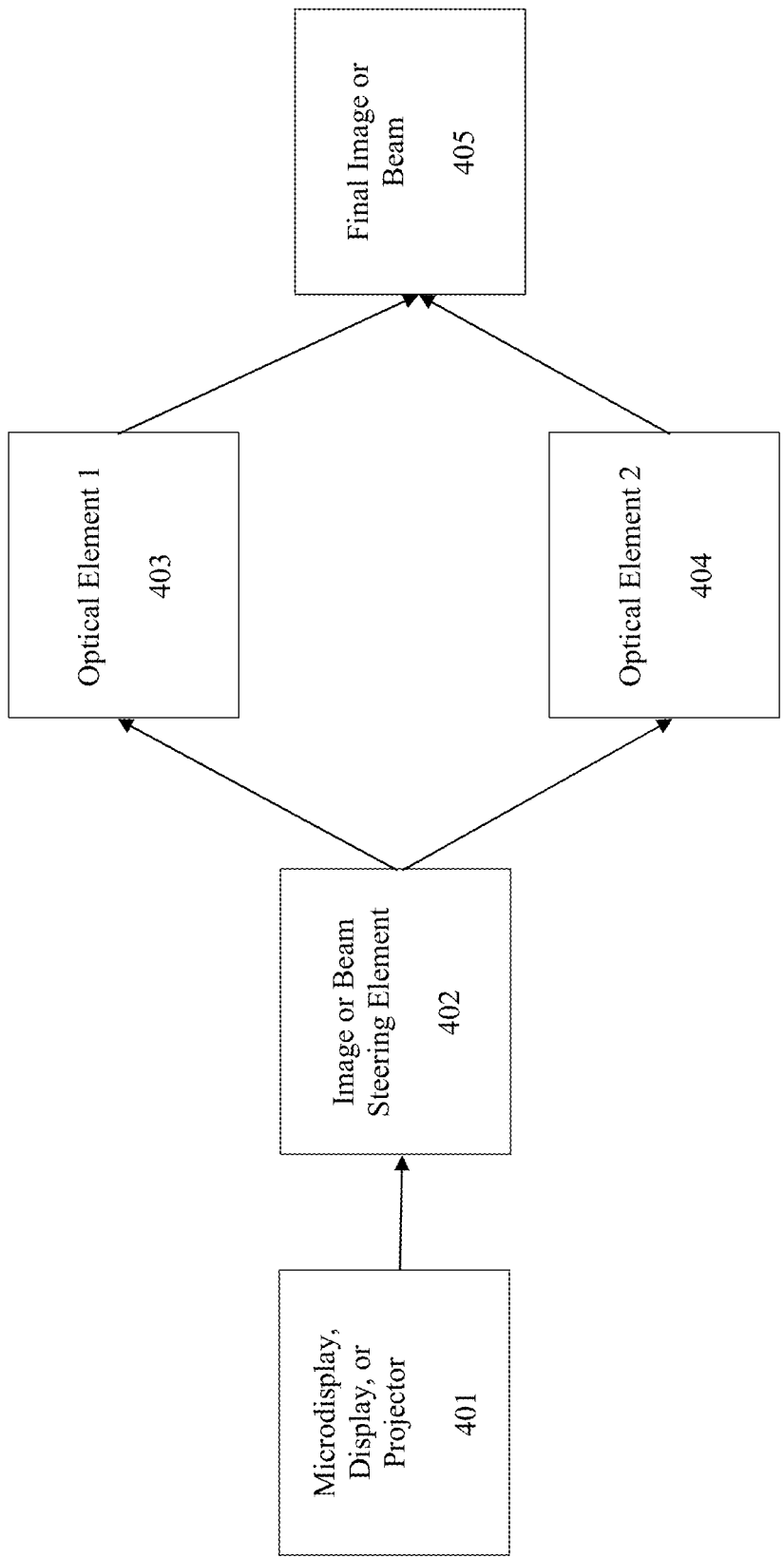
FIG. 4A is a functional flow of the light through the optical functions in the simplest embodiment.
Figure 4B:
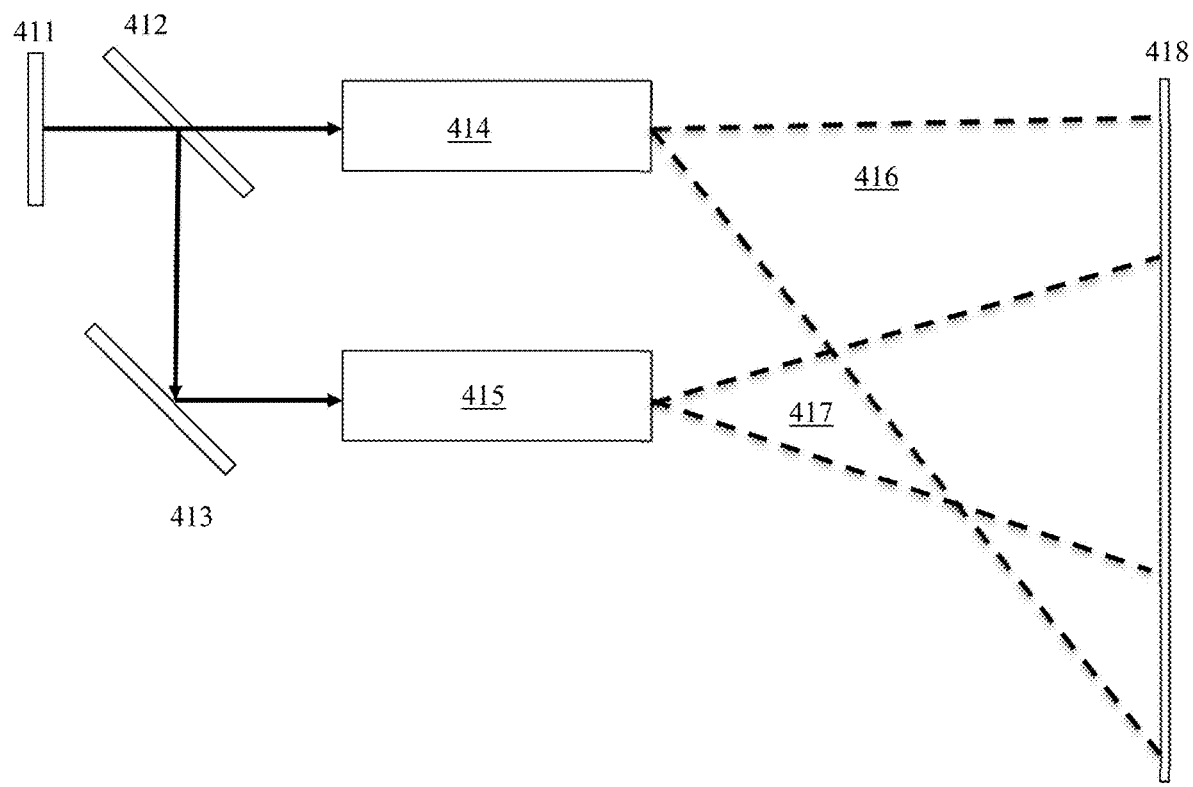
FIG. 4B is a hardware flow of the light through the optical elements in the simplest embodiment.

Look to FIGS. 4A and 4B. To be able to use the same microdisplay or display 401, 411 for each part which have a different size and position on the final image 405, with the first method from FIG. 2, the image of the microdisplay or display is steered with a steering element optomechanically or optically, such as, but not limited to, a rotating mirror or beam splitter 402, 412 and an optional mirror 413, to one of two optical elements 403, 404, 414, 415 for each frame. Other examples of image steering elements are a liquid crystal switchable mirror, an optical shutter, a wedge prism, a rotating optical slab, and optical masking elements. The image steering element may also function as an image separation element. Alternatively, a separate image separation element may be used in addition to the image steering element. Examples of image separation elements include optical masking elements, a beam splitter, an optical shutter, a liquid crystal switchable mirror, and so on. In case of using a beam splitter instead of a rotating mirror as the steering element, each image each frame may be blocked or let to pass accordingly before, inside or after the optical element 403, 404, 414, 415 with an optical or mechanical shutter such as an LCD shutter in order to prevent 403, 414 and 404, 415 from receiving the same image of every frame instead of the different images of different consecutive frames. This is of course not needed if a polarizer beam splitter or a reflective polarizer beam splitter is used and the polarization of the image can be controlled each frame before it reaches the beam splitter, such as with a switchable liquid crystal polarization rotator. Use of a reflective polarizer beam splitter may provide improved image contrast and/or light throughput as compared to a half-silvered beam splitter or an absorptive-type polarizer beam splitter.

To be able to use the same microdisplay or display 401, 411 for each part which have a different size and position on the final image 405, with the second method from FIG. 3, the image of the microdisplay or display 401, 411 is steered with a steering element such as, but not limited to, a beam splitter, a mirror, or any of the other aforementioned optical steering elements on an image plane 402, 412 and an optional mirror 413, to two optical elements 403, 404, 414, 415. In case of using a beam splitter and not a mirror on an image plane, each image is then masked accordingly before, inside or after the optical element 403, 404, 414, 415 with an optical masking element such as a stencil. The mirror or stencil may be on an image plane to create a sharp cut.

Steering element 402, 412 may be, but is not limited to, a mirror, mirrors, beam splitter and optical or mechanical shutter or shutters (e.g., a liquid crystal switchable mirror) combined with one of the above. The steering element 402, 412 may be configured to direct a first image component to a small image optical element and to direct a second image component to a large image optical element. In some embodiments, the large image optical element and the small image optical element are completely separate. In other embodiments, the small image optical element and large image optical element may share one or more of their constituents. For example the small image optical element and large image optical element may share most of their lenses, and the large image optical element may have extra lenses for making the beam wider which are unreachable to the narrow beam thanks to a reflective polarizer beam splitter. In some embodiments, a single optical element functions as the large image optical element (or a component of the large image optical element) and the small image optical element (or a component of the small image optical element). For example, the single optical element may include one or more electrically tunable lens (e.g., a liquid lens and/or a liquid crystal lens). An electrically tunable lens can change their focal length electrically, which means if properly integrated with other lenses, for time-sequential embodiments a single optical element can function as a large image optical element one frame, then as a small image optical element in the next frame. Thus, the single optical element can become at least a portion of the large image optical element at a first time and can become at least a portion of the small image optical element at a second time. Additionally, the steering element 402, 412 may function as an image separation element, and may separate the first image component from the second image component.

The optical element 403, 404, 414, 415 may be, but is not limited to, one of the following, or a combination of: lenses, mirrors, prisms, free-form mirrors.

One of the optical elements 404, 415 may create a small image 417 and the other optical element 403, 414 a comparably large image 416.

In FIG. 4A, the microdisplay or display 401 creates the image and optically sends it to the image or beam steering element 402. The image steering element 402 splits the image into two (or more) images, sending the images to optics creating the low resolution, large image 403 and a high resolution, small image 404. The optical output of the optics 403, 404 are sent to a screen 418 or onto the viewer's retina where the final image is created 405.

Looking to FIG. 4B, the microdisplay or display 411 creates an image that is split with a beam splitter (such as half silvered mirror or polarizer beam splitter) 412 into two identical images going in different directions. One is directed to optics which create a large image 414, while the other goes through a mirror 413 to another optics which creates a small image 415. The large image optics 414 create the lower resolution image 416. The small image optics 415 creates the higher resolution image 417. Both the lower 416 and higher 417 resolution images are projected on the screen 418 or on the viewer's retina as seen in FIG. 5B.

Masking of the area of the large image 416 where the small image 417 is can be achieved, again, digitally, by having black pixels displayed there, or optically, for example by having a stencil on an image plane somewhere inside, before or after the optics to physically (optically) mask off that part of the image.

Figure 5A:
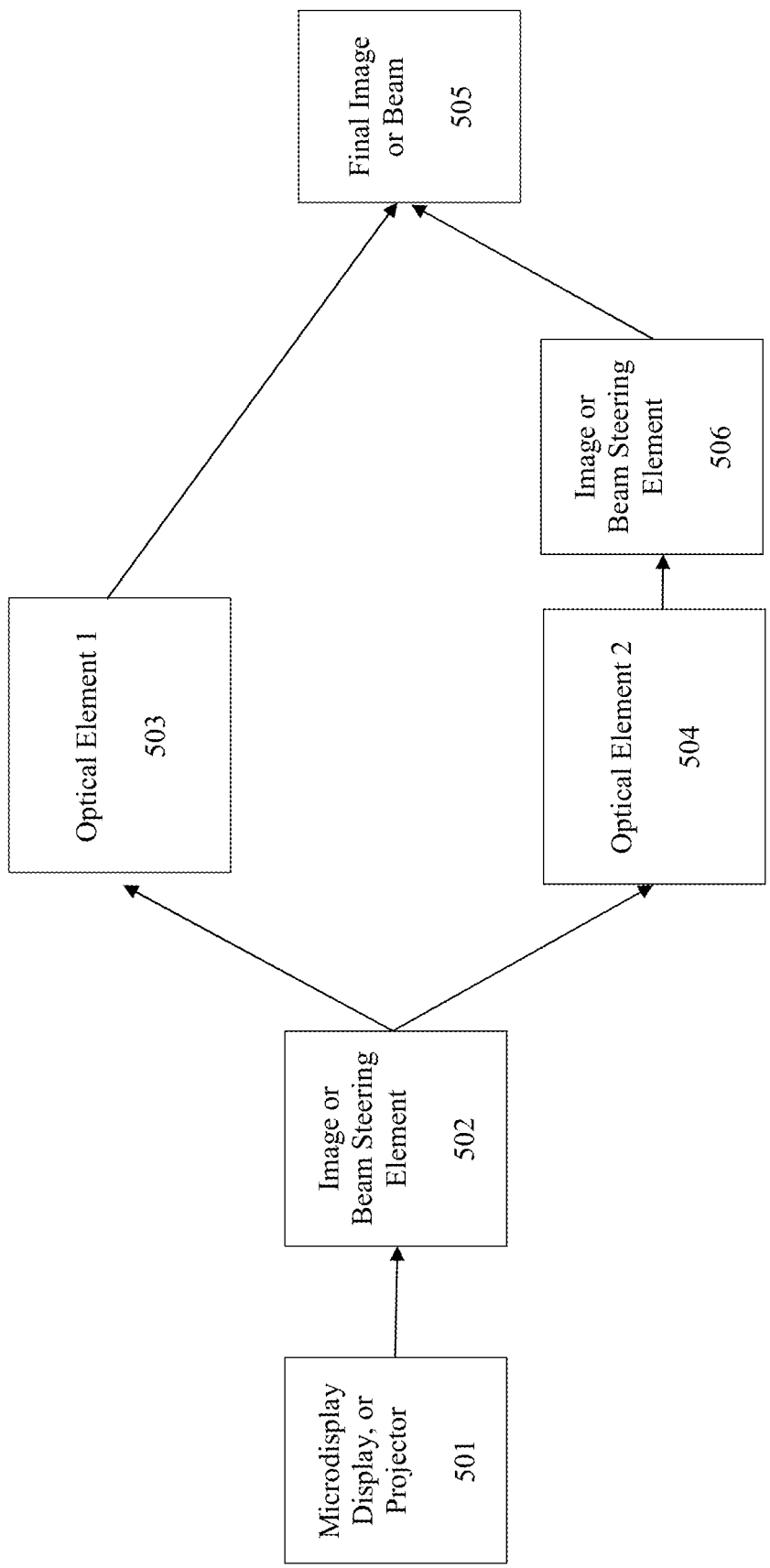
FIG. 5A is a functional flow of the light through the optical functions in a slightly more complex embodiment.
Figure 5B:
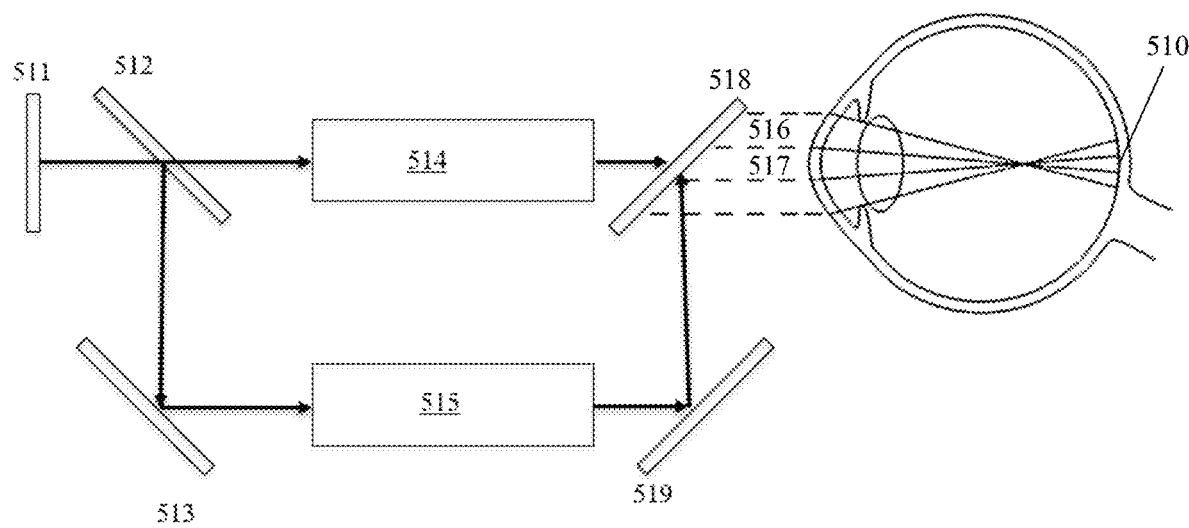
FIG. 5B is a hardware flow of the light through the optical elements in a slightly more complex embodiment.

Then, optionally, the positioning of the small image can be achieved with, but not limited to one or more of the following: actuators with mirrors, galvanometer scanners, actuators with wedge (Risley) prisms, actuators with tilting or shifting lenses, as seen in FIG. 5A.

FIG. 5A shows a microdisplay or display 501 creating an image that is sent to an image or beam steering element 502 (could be a beam splitter). One of the two identical images is sent to the large image optical element 503 and the other image is sent to the small image optical element 504. In some embodiments, the large image optical element 503 and the small image optical element 504 are completely separate. In other embodiments, the small image optical element 504 and large image optical element 503 may share one or more of their constituents. For example the small image optical element 504 and large image optical element 503 may share most of their lenses, and the large image optical element 503 may have extra lenses for making the beam wider which are unreachable to the narrow beam thanks to a reflective polarizer beam splitter. The small image optical element 504 sends the image to an image or beam steering element 506 (could be a mirror). The images are then combined into a final image 505 (e.g., into a superimposition of the two images).

In one embodiment, a single optical element functions as the large image optical element 503 (or as a component of the large image optical element 503) and the small image optical element 504 (or as a component of the small image optical element 504). For example, the single optical element may include one or more electrically tunable lens (e.g., a liquid lens and/or a liquid crystal lens). An electrically tunable lens can change its focal length electrically, which means if properly integrated with other lenses, for time-sequential embodiments a single optical element can function as large image optical element 503 one frame, then as small image optical element 504 in the next frame.

The two images are optically combined, such as with a beam splitter and viewed directly, or through, but not limited to, an eyepiece or waveguide. The optically combined images may be a superimposition of the two images.

Looking to FIG. 5B, the optical elements are shown. The microdisplay or display 511 sends the image to a beam splitter or a rotating mirror 512 that sends images to the large image optics 514 and to a mirror 513 that redirects the image to the small image optics 515. From the small image optics 515, the image is sent to a mirror 519 and then to a beam combiner 518 (e.g., beam splitter) to combine with the output of the large image optics 514. From the beam combiner 518, the large image 516 and the small image 517, are sent as a combined image to the viewer's retina 510 (e.g., a superimposition of the two images). In case of using a beam splitter instead of a rotating mirror as the steering element, each image each frame may be blocked or let to pass accordingly before, inside or after the optical element 514, 515 with an optical or mechanical shutter such as an LCD shutter in order to prevent 514 and 515 from receiving the same image of every frame instead of the different images of different consecutive frames. This is of course not needed if a polarizer beam splitter (e.g., a reflective polarizer beam splitter) is used and the polarization of the image can be controlled each frame before it reaches the beam splitter, such as with a switchable liquid crystal polarization rotator.

Figure 5C:
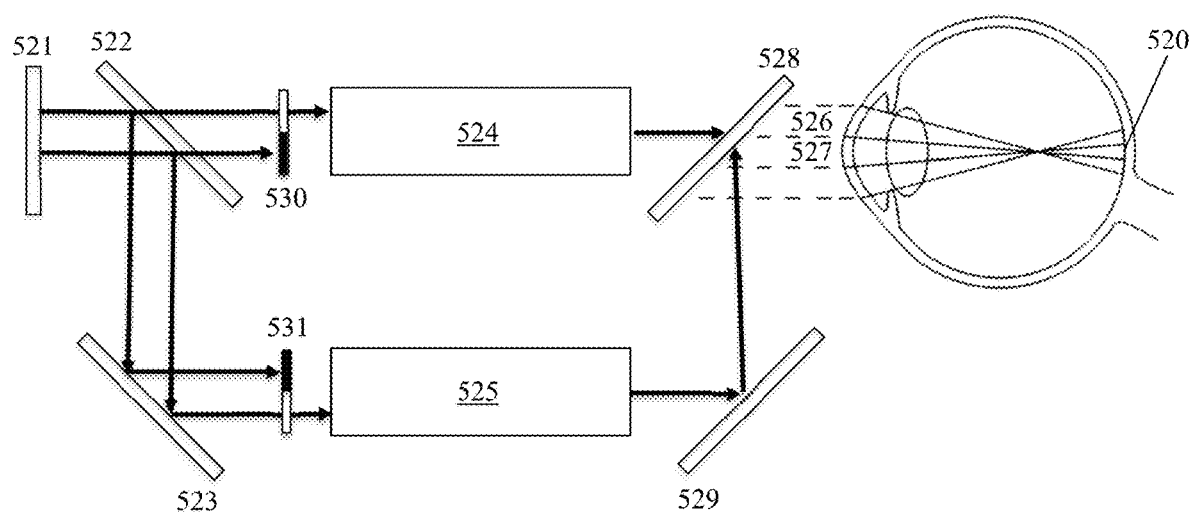
FIG. 5C is a hardware flow of the light through the optical elements as in the previous drawing with an optical mask (stencil).

One difference between FIGS. 5B and 5C is that images are illustrated as two lines rather than one before reaching the optical masking elements. This is done to illustrate how the image is masked/cropped by the optical masking elements 530, 531.

Looking to FIG. 5C, the optical elements are shown, for processing the image structure in FIG. 3. The microdisplay or display 521 sends the images to a beam splitter 522, that sends two identical images, one to a mirror 523 first, to optical masking elements (stencils, physical barriers to hide part of the image) 530, 531. The stencil may be on an image plane to create a sharp cut, so can also be inside the optics (524 and 525), or after the optics.

The images leave from the stencils 530, 531 to the large image optics 524 and to the small image optics 525. From the small image optics 525, the image is sent to a mirror 529 and then to a beam combiner 528 (e.g., beam splitter) to combine with the output of the large image optics 524. From the beam combiner 528, the large image 526 and the small image 527, are sent as a combined image to the viewer's retina 520.

Figure 5D:
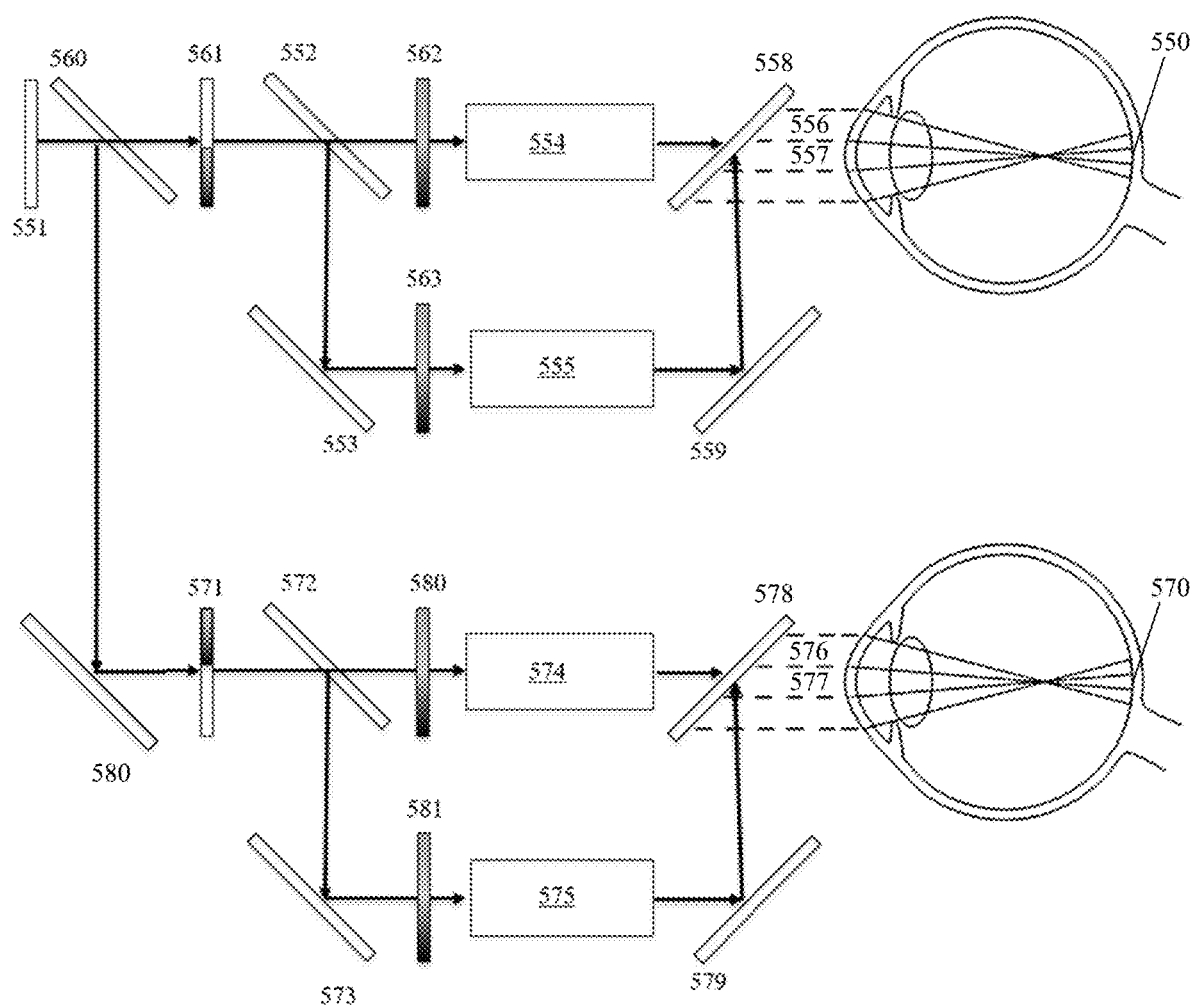
FIG. 5D is a hardware flow of the light through the optical elements as in the FIG. 5B for each eye in a head-mounted display.

Looking to FIG. 5D we see a head-mounted display embodiment which uses a single microdisplay or display 551 for both eyes. First the resolution of the microdisplay or display is split between eyes, then each frame may be used for one projection (large or small image). For example with a 240 Hz DLP microdisplay this provides 120 Hz refresh rate per image per eye.

The microdisplay or display 551 sends the image to a beam splitter 560 that sends two identical images, one to a mirror 580 first, to the stencils 561, 571 that mask off the portion of the image not destined for the specific eye. In one embodiment, the stencils 561, 571 could be shutters such as an LCD shutter or LCD pi-cell so each frame may be sent to one optics and blocked for the rest of the optics 554, 555, 574, 575, such as in the instance seen in FIG. 2. In another embodiment, the stencils 561, 571 could be removed so each frame the whole image may be sent to one optics and blocked for the rest of the optics 554, 555, 574, 575, such as in the instance seen in FIG. 2. For example with a 240 Hz DLP microdisplay this provides 60 Hz refresh rate per image per eye.

The left stencil (top in the diagram) 561 sends the image to a second beam splitter 552 which send two identical images, one to a mirror 553 first, to the two LCD shutters 562, 563 for the FIG. 2 embodiment. The shutters 562, 563 could be replaced with stencils (a physical barrier to hide part of the image) for the FIG. 3 embodiment. The stencils have to be on an image plane to create a sharp cut, so can also be inside the optics (554 and 555), or after the optics.

The images leave from the shutters (or stencils) 562, 563 to the large image optics 554 and to the small image optics 555. From the small image optics 555, the image is sent to a mirror 559 and then to a beam combiner 558 (e.g., beam splitter) to combine with the output of the large image optics 554. From the beam combiner 558, the large image 556 and the small image 557, are sent as a combined image to the viewer's retina 550.

The right stencil (bottom in the diagram) 571 sends the image to a second beam splitter 572 which sends two identical images, one to a mirror 573 first, to the two LCD shutters 580, 581 for the FIG. 2 embodiment. The shutters 580, 581 could be replaced with stencils for the FIG. 3 embodiment. The stencils may be on an image plane to create a sharp cut, so can also be inside the optics (574 and 575), or after the optics.

The images leave from the shutters (or stencils) 580, 581 to the large image optics 574 and to the small image optics 575. From the small image optics 575, the image is sent to a mirror 579 and then to a beam combiner 578 (e.g., beam splitter) to combine with the output of the large image optics 574. From the beam combiner 578, the large image 576 and the small image 577, are sent as a combined image to the viewer's retina 570.

Due to persistence of vision with the method in FIG. 2 and masking with the method in FIG. 3 the two parts appear as one uniform image 604 in FIG. 6B.

In FIG. 6A, the illustration shows rectangles representing individual pixels 601. FIG. 6B shows an illustration with individual pixels displaying an actual image 604.

Since the small high resolution part 603, 606 in the final image 601, 604 can be smaller than it could be without the use of these methods, the variable-resolution screen method and apparatus described here allows to achieve more resolution visible in one or more parts of the image than is possible with the display technology when used without the methods described here.

This allows to achieve a variable-resolution screen, such as a head-mounted display screen which uses one microdisplay or display or one per eye with a high pixel or scanline density in the center of the field of view of the viewer and less in the periphery.

Optionally, by adding eye tracking via, but not limited to, gaze tracking cameras or electrodes, the small high resolution part 603, 606 can be positioned on the final image 601, 604 on the large low resolution part 602, 605 where the viewer's foveal view is at any given point in time. This allows to always have more pixels or scanlines concentrated in the foveal and optionally also in the near peripheral view of the viewer at any given point in time.

Optionally the positioning of the large low resolution part 602, 605 can be achieved the same way the positioning of the small high resolution part 603, 606, for example to have pixels only in the field of view of the viewer's eye and not the total field of view of the viewer which takes into account eye rotations.

There can also be more than two parts, such as three, one for the foveal view, one for near peripheral and one for far peripheral and they can be combined and optionally positioned the same way as mentioned above.

Those skilled in the art will understand that the order of some elements can be changed and more can be added, such as steering both large and small images together after they are optically combined, or adding more elements for creating more small or large parts on the final image.

Positioning with Mirrors or Wedge Prisms of a High Resolution Narrow Projection Beam Over a Low Resolution Wide Projection Beam In another embodiment, a variable-resolution screen is achieved by positioning a high resolution narrow video projection over a low resolution wide video projection with mirrors or wedge (Risley) prisms.

To achieve a variable-resolution screen a single video projector such as a single illuminated microdisplay, display, LBS (Laser beam steering) projector or other type of video projector (from now on referred to as "projector") 401, 411, 501, 511, 521, 551, 5111, 5121, 5151 is operated at fast refresh rates. Each consecutive frame (frame n+1) the projector is used to either display a small high resolution part 204 or parts of the final image 205 or a large low resolution part 203 or parts of the final image 205 by sharing the refresh rate of the frames 201, 202 and final image 205 between the latter's two or more parts 203, 204. Persistence of vision blends the two parts 203, 204 into one final projected image 205.

Alternatively, in FIG. 3, to achieve a variable-resolution screen 305 a single video projector such as a single illuminated microdisplay, display, LBS (laser beam steering) projector or other type of video projector (from now on referred to as "projector") is optically split into two or more parts 301, 302. This method allows one part 301, 304 or parts to use more pixels on the final projected image 305 by sacrificing the resolution of another part 302, 303 or parts.

The two methods can also be combined to allow to create more parts on the final projected image or to allow to create two or more final projected images by sharing both the resolution and refresh rate of the projector between the parts, such as for using a single projector to create final projected images for both eyes in a head-mounted display.

There are several advantages to using projection beams rather than microdisplays and displays when viewed directly or through lens or other optics:

First of all, it is very challenging to design a wide field of view head-mounted display when using microdisplays while trying to keep the magnification lenses or other optics small and lightweight versus using much smaller projection lenses to project onto a screen larger than the microdisplay and viewing that screen through lenses or other optics instead.

Second, using video projections has the advantage of allowing to have all of the optical elements including steering elements be much smaller as they can be positioned in the optical design before, or somewhere in between the projection optics which create the large final image on a projection screen.

Third, due to the external illumination nature of reflective microdisplays such as LCoS, DLP and transmissive microdisplays such as LCD, the beam angle for each pixel can be narrower than with emissive microdisplays such as OLED or microLED which can allow to provide an optical system with less stray light and be more efficient while providing the same or higher brightness to the viewer.

Fourth, due to the external illumination nature of reflective and transmissive microdisplays much higher brightness is achievable than with emissive microdisplays which have the physical pixels emit the light themselves like OLEDs and microLEDs or with LCD displays which makes it challenging to have them provide enough brightness, especially as the field of view and magnification of the display increases, or for augmented reality head-mounted displays where there can be a lot of light loss in the optical system.

In FIG. 3, a single 16:9 aspect ratio microdisplay or display is split into two parts, for example 1920×1080 pixel microdisplay or display split into a small 1080×1080 pixel high resolution part 301 and a large 840×1080 pixel low resolution part 302 (the latter may then be optically flipped 90 degrees for a better aspect ratio).

Using optical or optical and mechanical and also optionally digital methods, the parts 301 and 302 can be resized and superimposed on each other 305 and the large low resolution part 303 can be masked where the small high resolution part 304 is and where they overlap.

The masking can further be made more seamless by blending the edges optically or digitally by making the transition less abrupt with a digital resolution falloff in the high resolution small image or dimming the pixels with a falloff on both images.

The brightness levels between the two parts may be balanced optically such as with neutral density filters or digitally.

Look to FIGS. 4A and 4B. To be able to use the same projector 401, 411 for each part which have a different size and position on the final projected image 405, with the first method from FIG. 2, the beam of the projector is steered with a steering element optomechanically or optically, such as, but not limited to, a rotating mirror or beam splitter 402, 412 and an optional mirror 413, to one of two optical elements 403, 404, 414, 415 for each frame. In case of using a beam splitter instead of a rotating mirror as the steering element, each beam each frame may be blocked or let to pass accordingly before, inside or after the optical element 403, 404, 414, 415 with an optical or mechanical shutter such as an LCD shutter in order to prevent 403, 414 and 404, 415 from receiving the same beam of every frame instead of the different beams of different consecutive frames. This is of course not needed if a polarizer beam splitter (e.g., reflective polarizer beam splitter) is used and the polarization of the beam can be controlled each frame before it reaches the beam splitter, such as with a switchable liquid crystal polarization rotator.

To be able to use the same projector 401, 411 for each part which have a different size and position on the final image 405 on the screen 418, with the second method from FIG. 3, the beam of the projector 401, 411 is steered with a steering element such as, but not limited to, a beam splitter or a mirror on an image plane 402, 412 and an optional mirror 413, to two optical elements 403, 404, 414, 415. In case of using a beam splitter and not a mirror on an image plane, each beam is then masked accordingly before, inside or after the optical element 403, 404, 414, 415 with an optical masking element such as a stencil. The mirror or stencil may be on an image plane to create a sharp cut.

Steering element 402, 412 may be, but is not limited to, a mirror, mirrors, beam splitter and optical or mechanical shutter or shutters combined with one of the above.

The optical element 403, 404, 414, 415 may be, but is not limited to, one of the following, or a combination of: lenses, mirrors, prisms, free-form mirrors.

One of the optical elements 404, 415 may create a narrow beam 417 and the other optical element 403, 414 a comparably wide beam 416.

Looking to FIG. 4B, the projector 411 creates a projection beam that is split with a beam splitter (such as half silvered mirror or polarizer beam splitter) 412 into two identical projection beams going in different directions. One is directed to optics 414 which create a wide beam, while the other goes through a mirror 413 to another optics 415 which creates a narrow beam. The wide beam optics 414 create the lower resolution image beam 416. The narrow beam optics 415 creates the higher resolution image beam 417. Both the lower 416 and higher 417 resolution beams are projected onto the viewer's retina or screen 418.

Masking of the area of the wide beam 416 where the narrow beam 417 is can be achieved, again, digitally by having black pixels displayed there, or optically, for example by having a stencil on an image plane somewhere inside, before or after the optics to physically (optically) mask off that part of the projection beam.

Then, optionally, the positioning of the small image of the narrow beam can be achieved with, but not limited to one or more of the following: actuators with mirrors, galvanometer scanners, actuators with wedge (Risley) prisms, actuators with tilting or shifting lenses, as seen in FIG. 5A.

The two beams are projected onto the same screen as seen in FIG. 4B or first optically combined, such as with a beam splitter, projected onto a screen and viewed directly, or through, but not limited to, an eyepiece or waveguide. This is seen in the beam steering elements 519 and 518 of FIG. 5B.

Figure 5E:
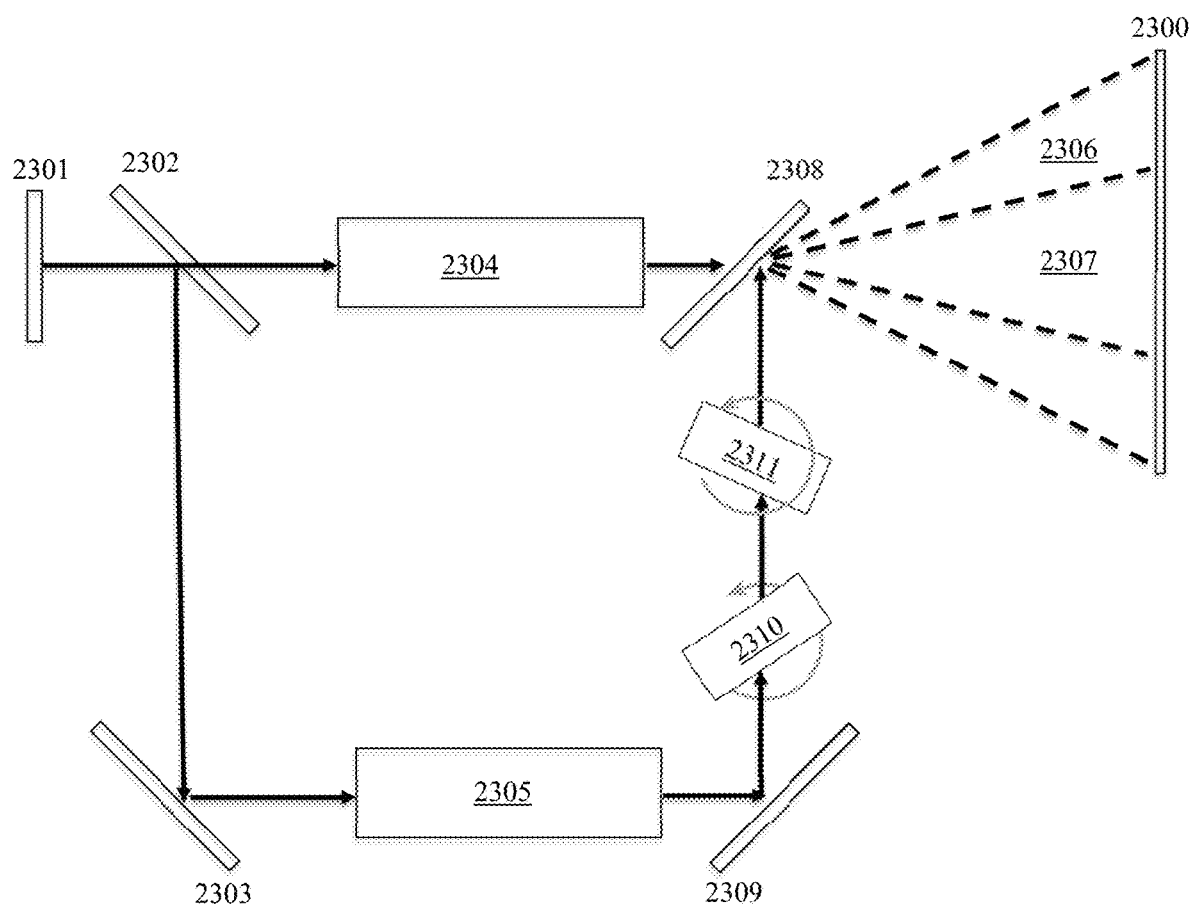
FIG. 5E illustrates an embodiment using optical slab elements.
Figure 5F:
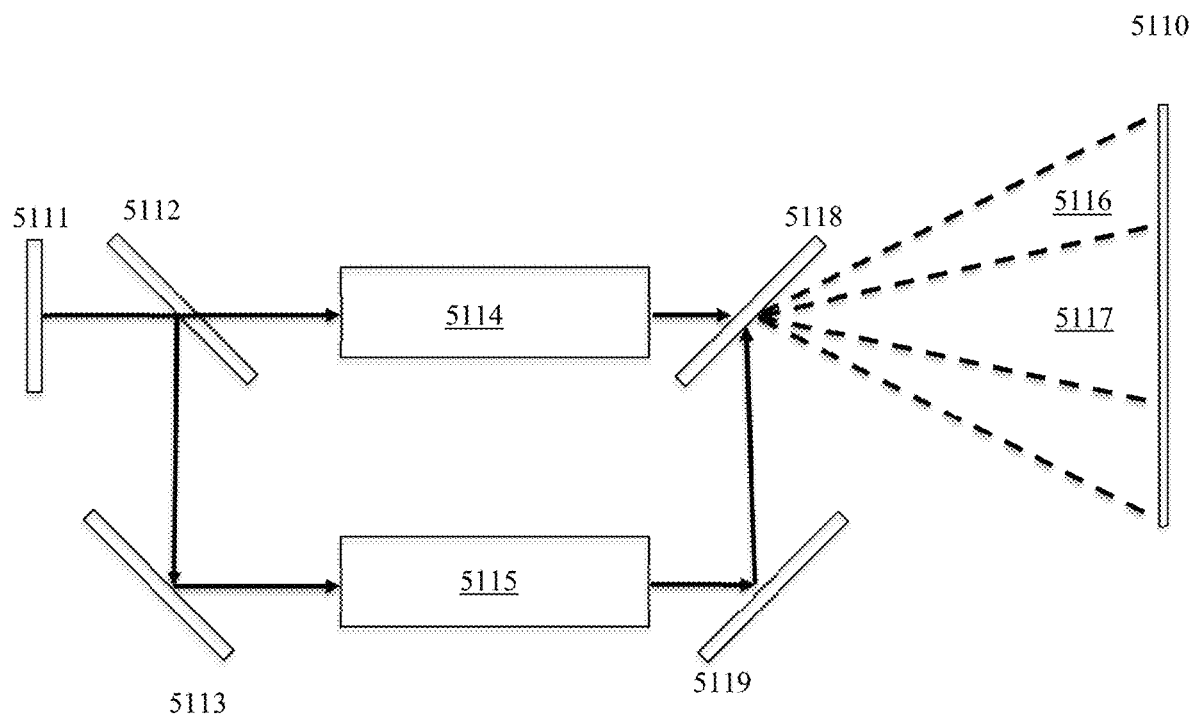
FIG. 5F is a hardware flow of the light through the optical elements in a slightly more complex embodiment, using a screen.

Looking to FIG. 5F, the optical elements are shown. The projector 5111 sends the projection beam to a beam splitter or a rotating mirror 5112 that sends projection beams to the wide beam optics 5114 and to a mirror 5113 that redirects the projection beam to the narrow beam optics 5115. From the narrow beam optics 5115, the beam is sent to a mirror 5119 and then to a beam combiner 5118 (e.g., beam splitter) to combine with the output of the wide beam optics 5114. From the beam combiner 5118, the wide beam 5116 and the narrow beam 5117, are sent as a combined projection beam to the viewer's retina or the screen 5110. In case of using a beam splitter instead of a rotating mirror as the steering element, each beam each frame may be blocked or let to pass accordingly before, inside or after the optical element 5114, 5115 with an optical or mechanical shutter such as an LCD shutter in order to prevent 5114 and 5115 from receiving the same beam of every frame instead of the different beams of different consecutive frames. This is of course not needed if a polarizer beam splitter is used and the polarization of the image can be controlled each frame before it reaches the beam splitter, such as with a switchable liquid crystal polarization rotator.

Figure 5G:
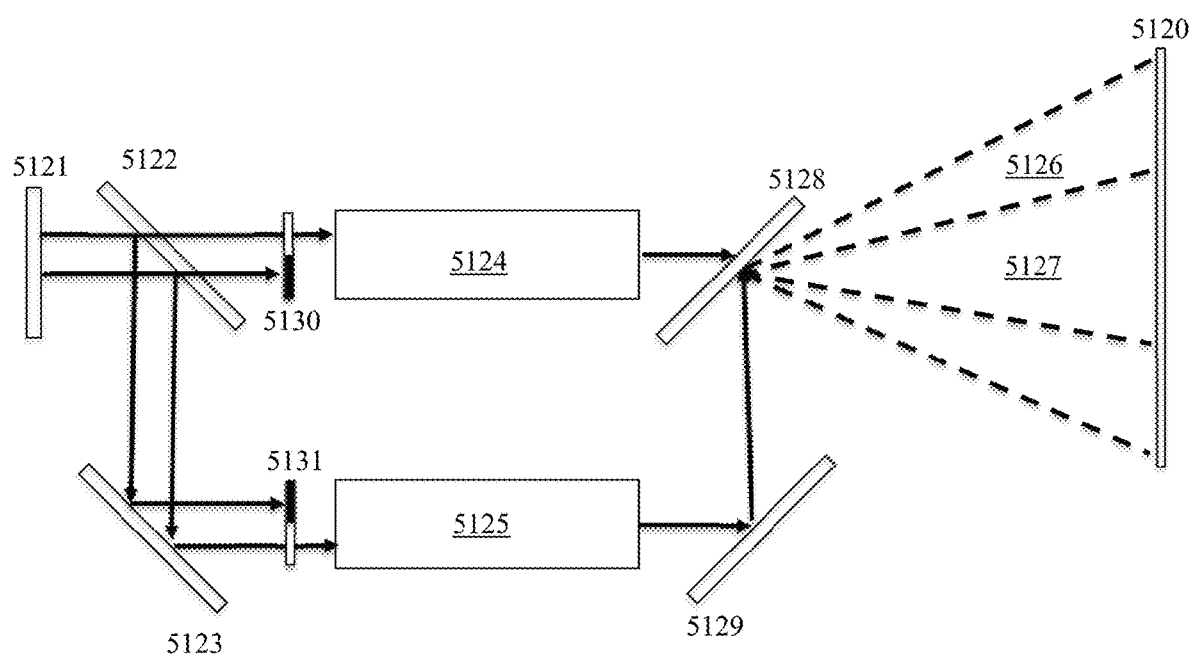
FIG. 5G is a hardware flow of the light through the optical elements as in the previous drawing with an optical mask, using a screen.

One difference between FIGS. 5F and 5G is that projection beams are illustrated as two lines rather than one before reaching the optical masking elements. This is done to illustrate how the projection beam is masked/cropped by the optical masking elements 5130, 5131.

Looking to FIG. 5G, the optical elements are shown, for processing the image structure in FIG. 3. The projector 5121 sends the projection beam to a beam splitter 5122 that sends two identical projection beams, one to a mirror 5123 first, to a stencil (a physical barrier to hide part of the image) 5130, 5131. The stencils may be on an image plane to create a sharp cut, so can also be inside the optics (5124 and 5125), or after the optics.

The beams leave from the stencils 5130, 5131 to the wide beam optics 5124 and to the narrow beam optics 5125. From the narrow beam optics 5125, the beam is sent to a mirror 5129 and then to a beam combiner 5128 (e.g., beam splitter) to combine with the output of the wide beam optics 5124. From the beam combiner 5128, the wide beam 5126 and the narrow beam 5127, are sent as a combined projection beam to the viewer's retina or screen 5120.

Figure 5H:
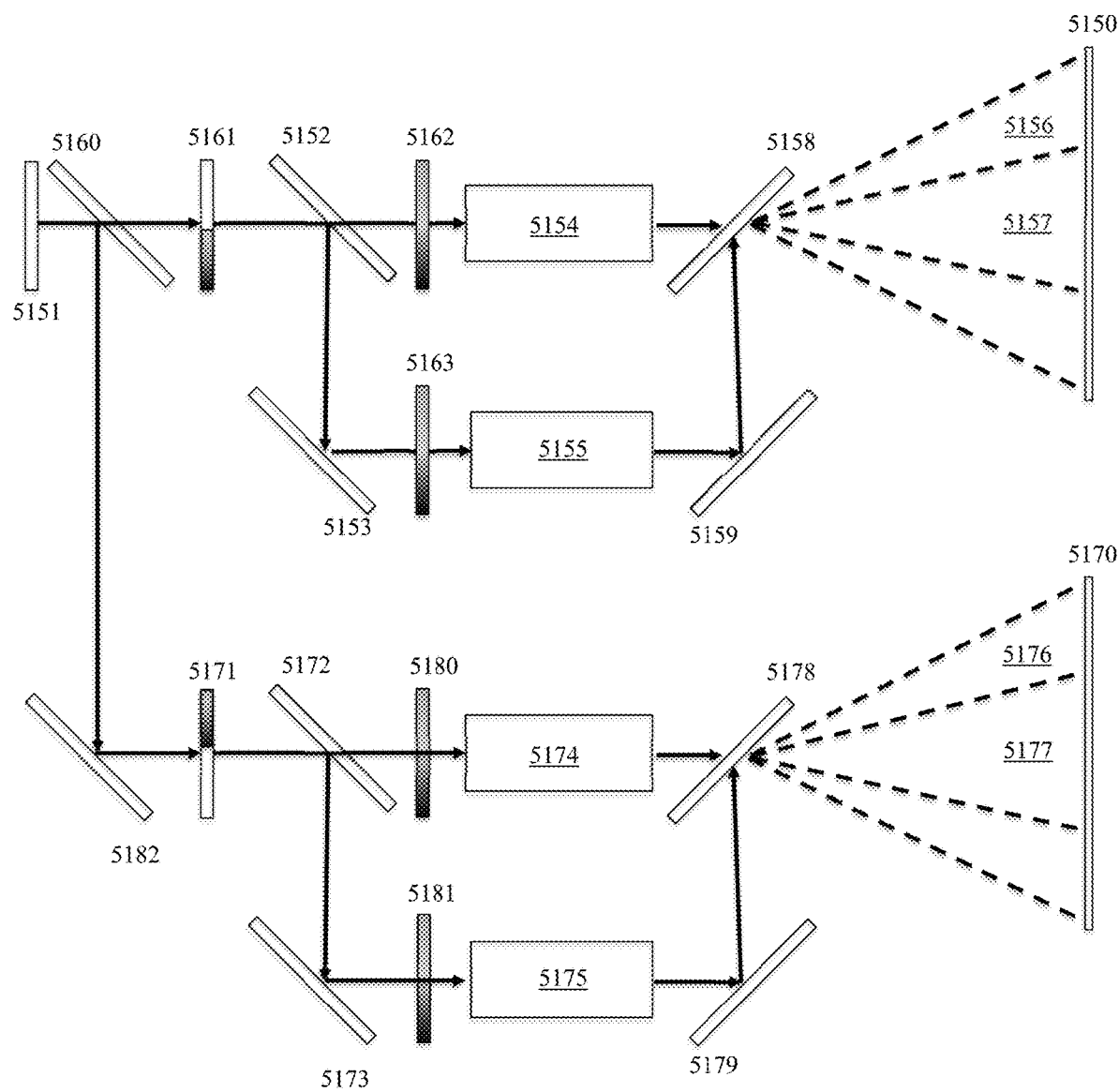
FIG. 5H is a hardware flow of the light through the optical elements as in the FIG. 5F for each screen in a head-mounted display.

Looking to FIG. 5H we see a head-mounted display embodiment which uses a single projector 5151 for both screens (for both eyes). First the resolution of the microdisplay or display is split between eyes, then each frame is used for one projection (large or small image). For example with a 240 Hz DLP projector this provides 120 Hz refresh rate per image per screen.

The projector 5151 sends the beam to a beam splitter 5160 that sends two identical beams, one reflected from a mirror 5182 first, to the stencils 5161, 5171 that mask off the portion of the image not destined for the specific eye. In one embodiment, the stencils 5161, 5171 could be shutters such as an LCD shutter or LCD pi-cell, so each frame will be sent to one optics and blocked for the rest of the optics 5154, 5155, 5174, 5175, such as in the instance seen in FIG. 2. In another embodiment, the stencils 5161, 5171 could be removed so each frame the whole image will be sent to one optics and blocked for the rest of the optics 5154, 5155, 5174, 5175, such as in the instance seen in FIG. 2. For example with a 240 Hz DLP projector this provides 60 Hz refresh rate per image per eye.

The left stencil (top in the diagram) 5161 sends the beam to a second beam splitter 5152 which send two identical beams, one to a mirror 5153 first, to the two LCD shutters 5162, 5163 for the FIG. 2 embodiment. The LCD shutters 5162, 5163 could be replaced with stencils (a physical barrier to hide part of the projection beam) for the FIG. 3 embodiment. The stencils may be on an image plane to create a sharp cut, so can also be inside the optics (5154 and 5155), or after the optics.

The beams leave from the shutters (or stencils) 5162, 5163 to the wide beam optics 5154 and narrow beam optics 5155. From the narrow beam optics 5155, the beam is sent to a mirror 5159 and then to a beam combiner 5158 (e.g., beam splitter) to combine with the output of the wide beam optics 5154. From the beam combiner 5158, the wide beam 5156 and the narrow beam 5157, are sent as a combined beam to the screen 5150 or viewer's retina.

The right stencil (bottom in the diagram) 5171 sends the beam to a second beam splitter 5172 which sends two identical beams, one to a mirror 5173 first, to the two LCD shutters 5180, 5181 for the FIG. 2 embodiment. The LCD shutters 5180, 5181 could be replaced with stencils (a physical barrier to hide part of the projection beam) for the FIG. 3 embodiment. This has to be in an image plane to create a sharp cut, so can also be inside the optics (5174 and 5175), or after the optics.

The beams leave from the LCD shutters (or stencils) 5180, 5181 to the wide beam optics 5174 and narrow beam optics 5175. From the narrow beam optics 5175, the beam is sent to a mirror 5179 and then to a beam combiner 5178 (e.g., beam splitter) to combine with the output of the wide beam optics 5174. From the beam combiner 5178, the wide beam 5176 and the narrow beam 5177, are sent as a combined beam to the screen 5170 or viewer's retina.

Due to persistence of vision with the method in FIG. 2 and masking with the method in FIG. 3 the two parts appear as one uniform projected image 604 in FIG. 6B.

In FIG. 6A, the illustration shows rectangles representing individual pixels 601. FIG. 6B shows an illustration with individual pixels displaying an actual image 604.

Since the small high resolution part 603, 606 in the final projected image 601, 604 can be smaller than it could be without the use of these methods, the variable-resolution screen method and apparatus described here allows to achieve more resolution visible in one or more parts of the projected image than is possible with the projector when used without the methods described here.

This allows to achieve a variable-resolution screen, such as a head-mounted display screen which uses one projector or one per eye with a high pixel or scanline density in the center of the field of view of the viewer and less in the periphery.

Optionally, by adding eye tracking via, but not limited to, gaze tracking cameras or electrodes, the small high resolution part 603, 606 can be positioned on the final projected image 601, 604 on the large low resolution part 602, 605 where the viewer's foveal view is at any given point in time. This allows to always have more pixels or scanlines concentrated in the foveal and optionally also in the near peripheral view of the viewer at any given point in time.

Optionally the positioning of the large low resolution part 602, 605 can be achieved the same way the positioning of the small high resolution part 603, 606, for example to have pixels only in the field of view of the viewer's eye and not the total field of view of the viewer which takes into account eye rotations.

There can also be more than two parts, such as three, one for the foveal view, one for near peripheral and one for far peripheral and they can be combined and optionally positioned the same way as mentioned above.

Those skilled in the art will understand that the order of some elements can be changed and more can be added, such as steering both large and small images together after they are optically combined, or adding more elements for creating more small or large parts on the final projected image.

Shifting with Optical Slabs or Mirrors a High Resolution Small Image or Narrow Projection Beam Over a Low Resolution Large Image or Wide Projection Beam In another embodiment, a variable-resolution screen is achieved by shifting/offsetting a small and high resolution image or projection beam over a large and low resolution image or projection beam with optical slabs or mirrors.

To achieve a variable-resolution screen a single display technology such as a microdisplay or display or a single video projector such as a single illuminated microdisplay, display, LBS (laser beam steering) projector or other type of video projector (from now on referred to as "projector") 401, 411, 501, 511, 521, 551, 2301, 5111, 5121, 5151 is operated at fast refresh rates. In FIG. 2, each consecutive frame (frame n+1) the microdisplay, display or projector is used to either display or project a small high resolution part 204 or parts of the final image 205 or a large low resolution part 203 or parts of the final image 205 by sharing the refresh rate of the frames 201, 202 and final image 205 between the latter's two or more parts 203, 204. Persistence of vision blends the two parts 203, 204 into one final image 205.

FIG. 3 shows an alternative embodiment, to achieve a variable-resolution screen a single display technology such as a microdisplay, display or a single video projector such as a single illuminated microdisplay, display, LBS (Laser beam steering) projector or other type of video projector (from now on referred to as "projector") is optically split into two or more parts 301, 302. This method allows a small high resolution part or parts 304 to use more pixels on the final image 305 by sacrificing the resolution of a large low resolution part 303 or parts.

The two methods can also be combined to allow to create more parts on the final image or to allow to create two or more final images by sharing both the resolution and refresh rate of the microdisplay, display or projector between the parts, such as for using a single microdisplay, display or projector to create final images for both eyes in a head-mounted display.

In FIG. 3, a single 16:9 aspect ratio microdisplay or display is split into two parts, for example 1920×1080 pixel microdisplay or display split into a small 1080×1080 pixel high resolution part 301 and a large 840×1080 pixel low resolution part 302 (the latter may then be optically flipped 90 degrees for a better aspect ratio).

Using optical or optical and mechanical and also optionally digital methods, the parts 301 and 302 can be resized and superimposed on each other and the large low resolution part 303 can be masked where the small high resolution part 304 is and where they overlap.

The masking can further be made more seamless by blending the edges optically or digitally by making the transition less abrupt with a digital resolution falloff in the high resolution small image 304 or narrow beam or dimming the pixels with a falloff on both images or beams.

The brightness levels between the two parts may be balanced optically such as with neutral density filters or digitally.

Look to FIGS. 4A and 4B. To be able to use the same microdisplay, display or projector 401, 411 for each part which have a different size and position on the final image 405, with the first method from FIG. 2, the image of the microdisplay or display or the beam of the projector is steered with a steering element optomechanically or optically, such as, but not limited to, a rotating mirror or beam splitter 402, 412 and an optional mirror 413, to one of two optical elements 403, 404, 414, 415 for each frame. In case of using a beam splitter instead of a rotating mirror as the steering element, each image or beam each frame may be blocked or let to pass accordingly before, inside or after the optical element 403, 404, 414, 415 with an optical or mechanical shutter such as an LCD shutter in order to prevent 403, 414 and 404, 415 from receiving the same image or beam of every frame instead of the different images or beams of different consecutive frames. This is of course not needed if a polarizer beam splitter is used and the polarization of the beam can be controlled each frame before it reaches the beam splitter, such as with a switchable liquid crystal polarization rotator.

To be able to use the same microdisplay, display or projector 401, 411 for each part which have a different size and position on the final image 405 with the second method from FIG. 3, the image of the microdisplay or display or the beam of the projector 401, 411 is steered with a steering element such as, but not limited to, a beam splitter or a mirror on an image plane 402, 412 and an optional mirror 413, to two optical elements 403, 404, 414, 415. In case of using a beam splitter and not a mirror on an image plane, each image or beam is then masked accordingly before, inside or after the optical element 403, 404, 414, 415 with an optical masking element such as a stencil. The mirror or stencil may be on an image plane to create a sharp cut.

Steering element 402, 412 may be, but is not limited to, a mirror, mirrors, beam splitter and optical or mechanical shutter or shutters combined with one of the above.

The optical element 403, 404, 414, 415 may be, but is not limited to, one of the following, or a combination of: lenses, mirrors, prisms, free-form mirrors.

One of the optical elements 404, 415 may create a small image or narrow beam 417 and the other optical element 403, 414 a comparably large image or wide beam 416.

In the embodiment in FIGS. 5A and 5B, the positioning of the small image or narrow beam can be achieved with, but not limited to one or more of the following: optical slabs or mirrors 506, 519, 529, 559, 579, 2310, 2311, 5119, 5129, 5159, 5179.

The two images or beams are optically combined, such as with a beam splitter and viewed directly, or through, but not limited to, an eyepiece or waveguide.

Due to persistence of vision with the method in FIG. 2 and masking with the method in FIG. 3 the two parts appear as one uniform image 604 in FIG. 6B.

Looking to FIG. 5E, we see a variant of FIG. 5B or 5F with two tilting optical slabs 2310 and 2311. The microdisplay, display or projector 2301 creates the image or beam and sends the image or beam through a beam splitter or a rotating mirror 2302. Two identical images or beams are sent from the beam splitter 2302. One image or beam is sent through the low resolution, large image or wide beam optics 2304, where the high resolution portion is masked off in case of using the method in FIG. 3, and then to the beam splitter 2308, used here as a beam combiner. The other image or beam is sent from the beam splitter 2302 to a mirror 2303 to the high resolution, small image or narrow beam optics 2305, where the low resolution image is masked off in case of using the method in FIG. 3. From the small image or narrow beam optics 2305, the image or beam is reflected off a mirror 2309 to two beam steering elements 2310, 2311, to offset the small image or narrow beam in the axis (after it will be combined with the beam combiner 2308) of the large image or wide beam. In this illustration the beam steering elements are two thick optical slabs 2310, 2311 that rotate in X and Y axis respectively to offset the image or beam in these two respective axis. The optical slabs 2310, 2311 may each be substituted with a single mirror that rotates in both axis or two rotating/tilting mirrors, to name a few possible alternative embodiments. From the second optical slab 2311, the shifted image or beam travels to the beam splitter 2308, used here as a beam combiner. From the beam splitter 2308, the low resolution, large image or wide beam 2306 and the high resolution, small image or narrow beam 2307 travel to the screen 2300 or viewer's retina.

In case of using a beam splitter instead of a rotating mirror as the steering element 2302 and using the method in FIG. 2, each image each frame may be blocked or let to pass accordingly before, inside or after the optical element 2304, 2305 with an optical or mechanical shutter such as an LCD shutter in order to prevent 2304 and 2305 from receiving the same image of every frame instead of the different images of different consecutive frames. This is of course not needed if a polarizer beam splitter is used and the polarization of the image can be controlled each frame before it reaches the beam splitter, such as with a switchable liquid crystal polarization rotator.

In FIG. 6A, the illustration shows rectangles representing individual pixels 601. FIG. 6B shows an illustration with individual pixels displaying an actual image 604.

With tilting/rotating mirrors and rotating wedge (Risley) prisms, the projection beam or image is steered and gets a perspective distortion, as seen in FIG. 7B, and some optical aberrations which get progressively worse as the image or beam is steered farther away from the center. To fix the perspective distortion the image 702 may be pre-distorted digitally which reduces the possible size of the high resolution small image and the number of utilized pixels significantly.

Figure 8A:
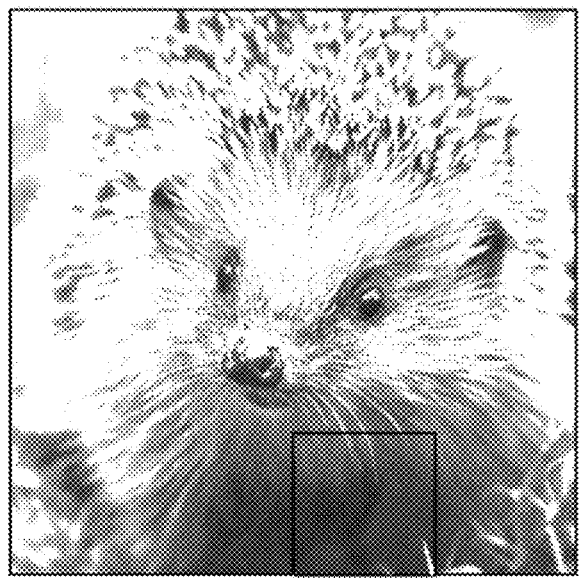
FIG. 8A shows the image with no distortion or distortion mismatch corrected.

Also, if there is any inaccuracy or precision issues during positioning, it is visible as a very apparent distortion and seam as the digital distortion and image or projection beam do not match the current positioning by the mirror, prism or other tilting element, as seen in FIG. 8A.

FIG. 7A is an original image 701, and FIG. 7B is a perspective distorted image 702.

Figure 8B:
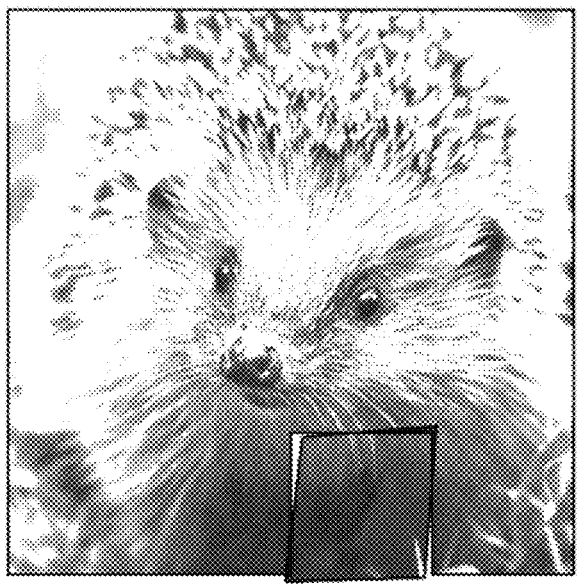
FIG. 8B shows the image with the distortion mismatch.

In FIG. 8A, the correct image 801 is seen. In the image on the right 802 (FIG. 8B) the digital imaging and image positioning and distortion mismatch which causes distortion and seam between the two image parts is seen.

With shifting/offsetting the image or beam instead, these issues do not happen.

The beam or image can be shifted by, but not limited to, two tilting/rotating optical slabs, one for each axis, two dual axis tilting/rotating mirrors such as Optotune™ MR-15-30-PS-25×25D or four tilting/rotating mirrors (two per axis).

In FIGS. 9A-D, an optical slab 902 is a glass slab or a plastic polymer slab clear in the visible spectrum which allows to shift/offset an image or projection beam 903.

Both an image as well as a projection beam 903 may be shifted with this method. The latter allows to have the slabs 902 relatively small which can direct the projection beam to projection optics which can produce a large projected image not requiring much more magnification by the eyepiece lens, waveguide or similar optics in a head-mounted display device.

However, an image may be shifted by this method as well when the magnification can be performed by the eyepiece optics, limited amount of shifting is needed or limited amount of magnification is needed by the eyepiece lens, waveguide or similar optics.

Figure 9A:
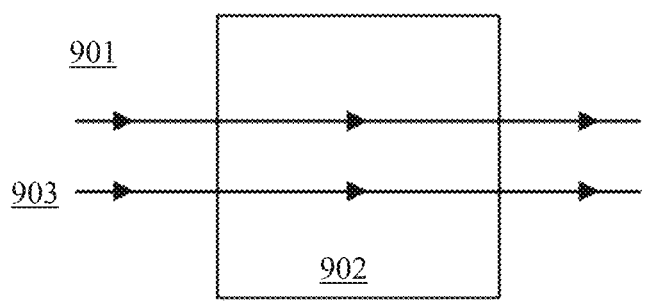
FIG. 9A shows light going through an optical slab.
Figure 9B:
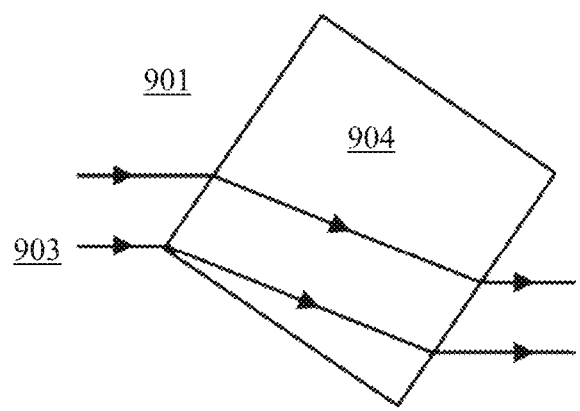
FIG. 9B shows light going through an optical slab at an angle.

In FIG. 9B we see a 20×20×20 mm PMMA (Poly(methyl methacrylate)) polymer optical slab 902 with a collimated 5 mm wide 638 nm wavelength beam 903 passing through it and being shifted. In this example the slab can tilt +34 degrees (the range is ±34 degrees) and offset the beam by up to 8.04 mm. Considering a situation where such a beam later goes through a projection lens and the 5 mm beam is meant to cover 20 degrees of the field of view when looking through the eyepiece or waveguide, a 16.08 mm shift would allow to move the high resolution image which the beam contains by over 64 degrees or more which is more than the average human can comfortably rotate their eyes.

In FIG. 9B the optical slab 904 is tilted −34 degrees to offset the beam 903 8.04 mm downwards.

Two of such slabs 902, 904 will be needed, as seen in FIG. 5E, rotating in different axis to allow to shift the beam 903 in both axis, or having an optical component such as a Dove prism or an identical mirror assembly between two slabs 902, 904 allowing them to rotate in the same axis.

The illustration is just for example purposes and different materials and sizes for the slabs 902, 904, dimensions for the beams 903 and rotation ranges are possible.

Slight dispersion of an RGB image or projection beam 903 caused by the optical slab 902, 904 can be compensated for by digitally offsetting each color channel by several pixels accordingly. Since offsetting may only be required to be done only to one or two color channels with higher refractive index, one or two color channels won't be able to reach the same offset on the edges of the image or projection beam 903 which may be resolved by digitally or optically cropping the image or projection beam 903 slightly on the edges so the pixels in each color channel can be offset as much as is required to undo the separation of the color channels caused by dispersion. This loss of pixels on the edges is still negligible compared to loss of pixels/detail due to correction of a perspective distortion from previous embodiments.

With the above example at the extreme ±34 degree slab tilt the angle of refraction at 445 nm wavelength is ±21.9 degrees and at 638 nm wavelength is ±22.1 degrees. This results in 0.06 mm dispersion between the red and blue color channel of the image or projection beam 903. Assuming the resolution of this 5 mm wide image or projection beam 903 is 1080 pixels by 1080 pixels, this amounts to 0.06×1080/5=12.96 pixels. Sacrificing 13 pixels on each edge of the beam 903 will allow to offset the color channels digitally to undo the effect of dispersion at any angle.

Specifically looking to FIG. 9A, we see the beam 903 moving through the air 901 to the slab 902. Since the slab 902 is perpendicular to the beam 903, the beam 903 goes straight through the slab 902.

In FIG. 9B, the slab 904 is tilted −34 degrees, causing the beam 903 to be offset 8.04 mm downwards.

Figure 9C:
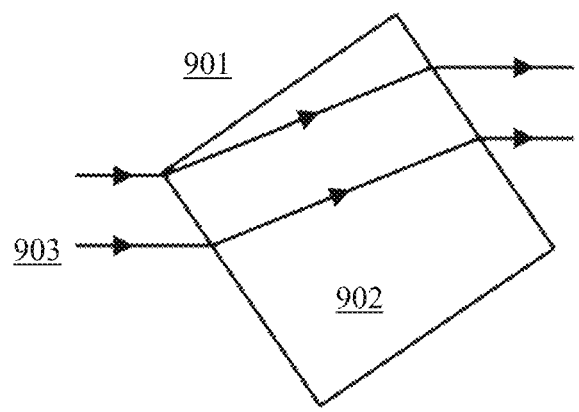
FIG. 9C shows light going through an optical slab at a different angle.

In FIG. 9C, the slab 902 is tilted +34 degrees, causing the beam 903 to be offset 8.04 mm upwards.

Figure 9D:
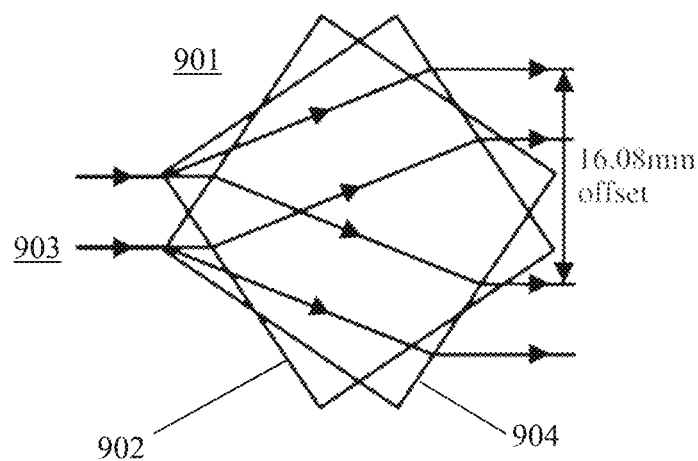
FIG. 9D shows a superimposition of light going through the same optical slab at two opposite maximum angles.

In FIG. 9D, there are two views of a single slab 902, 904 superimposed over each other to illustrate how much the beam offsets from one angle to the other. The slab view 904 is tilted −34 degrees, causing the beam 903 to be offset 8.04 mm downwards while slab view 902 is tilted +34 causing the beam 903 to be offset 8.04 mm upwards. Thus the beam 903 may be offset up and down, creating images or beams at most 16.08 mm apart.

As seen in FIG. 10A and FIG. 10B, the slabs 902, 904 can also be swapped with 2d mirrors (dual axis tilting/rotating mirrors such as Optotune™ MR-15-30-PS-25×25D) or two mirrors 1001, 1002 or 1003, 1004. This is a savings in cost traded off with bigger space requirements. On the other hand, dispersion is not an issue with mirrors.

In FIG. 10A the mirrors are tilted at 45 degrees 1001, 1002 and 40 degrees 1003, 1004 in FIG. 10B.

Figure 11:
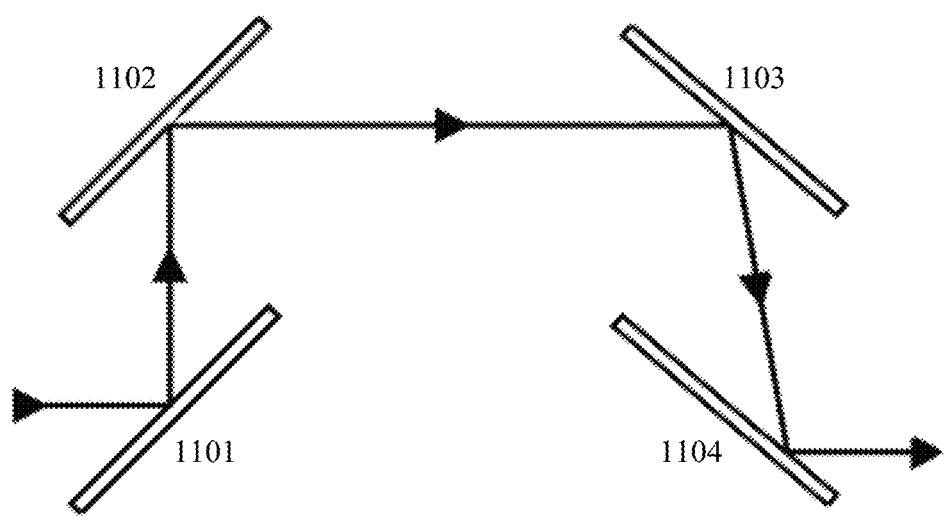
FIG. 11 illustrates offsetting the image or beam with a set of four mirrors.

Two 2D mirrors rotating in two axis or four mirrors 1101, 1102, 1103, 1104 may be used to shift the beam or image in two axis as seen in FIG. 11.

In FIG. 11, both mirrors 1101, 1102 have a top-down view purely for illustrative purposes, the second set of mirrors 1103, 1104 are in another axis.

Figure 12:
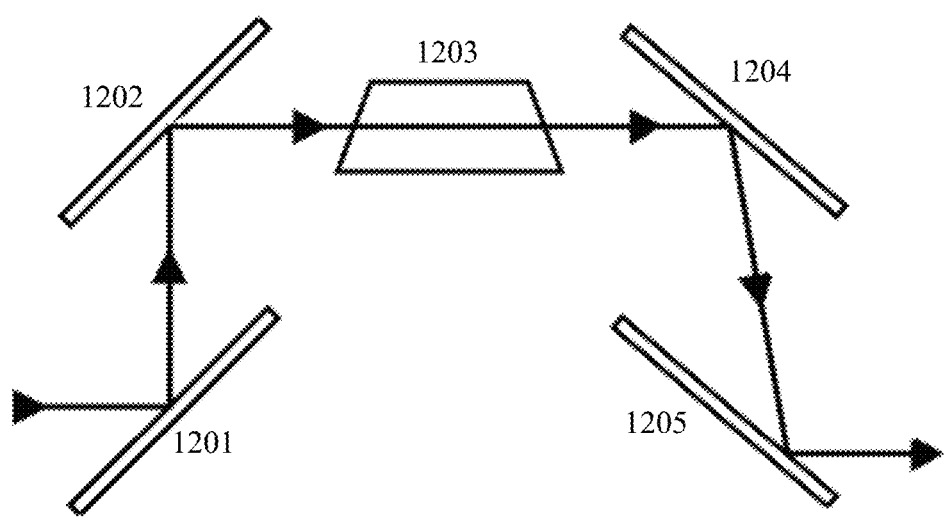
FIG. 12 illustrates offsetting the image or beam with a set of Dove prism and four mirrors.

FIG. 12 shows another embodiment. Either the second set of mirrors 1204, 1205 can be flipped and rotated in another axis or to save space in one axis a Dove prism 1203 or an equivalent mirror assembly may be placed between the two 2d mirrors or mirror pairs 1201, 1202 and 1204, 1205 to flip the axis of the offset performed by the previous set and have the mirrors and the components which shift/offset them in the same axis.

In FIG. 12 we see the path the ray travels when using the Dove prism 1203 (The Dove prism proportions and angle are not accurate in this drawing, nor is the path the ray travels inside the Dove prism itself).

Since the smaller high resolution part in the final image can be smaller than it could be without the use of these methods, the variable-resolution screen method and apparatus described here allows to achieve more resolution visible in one or more parts of the final image than is possible with the display, microdisplay or projector when used without the method described here.

This allows to achieve a variable-resolution screen, such as a head-mounted display screen which uses as little as one microdisplay, display or projector or one per eye with a high pixel or scanline density in the center of the field of view of the viewer and less in the periphery.

By adding eye tracking via, but not limited to, gaze tracking cameras or electrodes, the smaller high resolution part can be moved on the final image or screen on the bigger low resolution part where the viewer's foveal view is at any given point in time. This allows to always have more pixels or scanlines concentrated in the foveal and optionally also in the near peripheral view of the viewer at any given point in time.

Optionally the positioning of the bigger low resolution part can be achieved the same way the positioning of the smaller high resolution part, for example to have pixels only in the field of view of the viewer's eye and not the total field of view of the viewer which takes into account eye rotations.

There can also be more than two parts, such as three, one for the foveal view, one for near peripheral and one for far peripheral and they can be combined the same way as mentioned above.

Those skilled in the art will understand that the order of some elements in the diagrams can be changed and more can be added, such as shifting both large and small images or beams together after they are optically combined, or adding more elements for creating more smaller or bigger parts on the final image.

Variable-Resolution Screen with No Moving Parts

In a further embodiment, a variable-resolution screen is achieved by creating and digitally and optically positioning a small and high resolution image or projection over a large low resolution image or projection with no mechanically moving parts.

The image source for the at least one large low resolution part 201 and at least one small high resolution part 202 can be the same microdisplay, display or projector with consecutive frames (frame n and frame n+1) distributed between the two or more parts 203, 204 of the final image or beam (see FIG. 2). Or the parts of the images of the microdisplay, display or projector could be optically split into two 301, 302 or more and allocated between the at least one large low resolution part 303 and at least one small high resolution part 304, as in FIG. 3. Alternatively, the at least one large low resolution part and at least one small high resolution part can have a different microdisplay, display or projector as image source each as in FIG. 13.

See FIG. 3, where a single 16:9 aspect ratio microdisplay or display is split into two parts, for example 1920×1080 pixel microdisplay or display split into a small 1080×1080 pixel high resolution part 301 and a large 840×1080 pixel low resolution part 302 (the latter may then be optically flipped 90 degrees for a better aspect ratio).

The lack of mechanically moving parts provides several advantages:

First, eliminating moving parts eliminates the sensitivity to vibration, misalignment, mechanical failure, audible noise or any other issues associated with using mechanically moving parts.

Second, repositioning of the small high resolution part can take as low as a few microseconds to a few milliseconds, based on the speed of the optical masking element used as described below. By contrast it is difficult to get actuators to rotate a mirror, prism or slab as fast as the saccadic movement of the human eye while keeping such a motor as small as possible for a wearable device.

Third, positioning takes equal amounts of time irrespective of the new position the small high resolution part has to be positioned to.

At first, an image or projection beam is optically duplicated across the whole or most of the screen or the viewer's retina or part of the screen the human eye can rotate and focus at.

This can be achieved by, for example, the use of lens arrays. For illustrative and purposes of showing an example a single or double sided lens array is used, however a multi-element lens and/or lens array setup may be used to reduce optical aberrations in the duplicated images or video projections.

Figure 13:
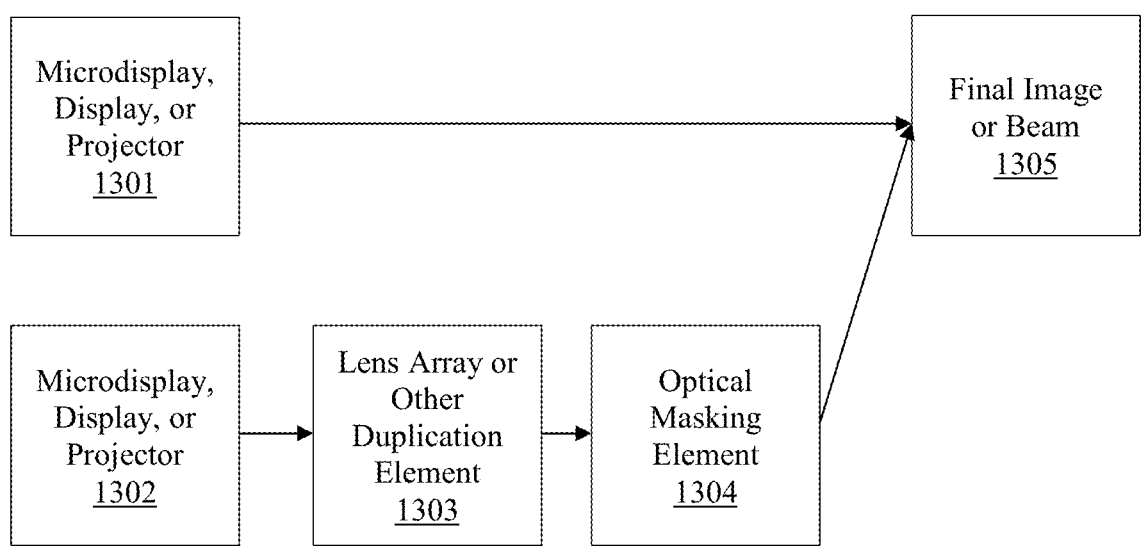
FIG. 13 shows a functional flow of light through the optical functions in a lens array embodiment.

FIG. 13 shows a two microdisplays, displays or projectors 1301, 1302 embodiment using a lens array. The large image or wide beam is created by the first microdisplay, display or projector 1301 and sent directly (or through a large image or wide beam optics) to the final image 1305. The second microdisplay, display or projector 1302 creates the small image or narrow beam, sending it to the lens array (or other duplication element) 1303 and then to an optical masking element 1304 to mask off (hide) the duplicates in the area outside of the one duplicate image to be shown. The image or beam then proceeds to the final image 1305 where it is combined with the large image or wide beam from the first microdisplay, display or projector 1301.

Figure 14:
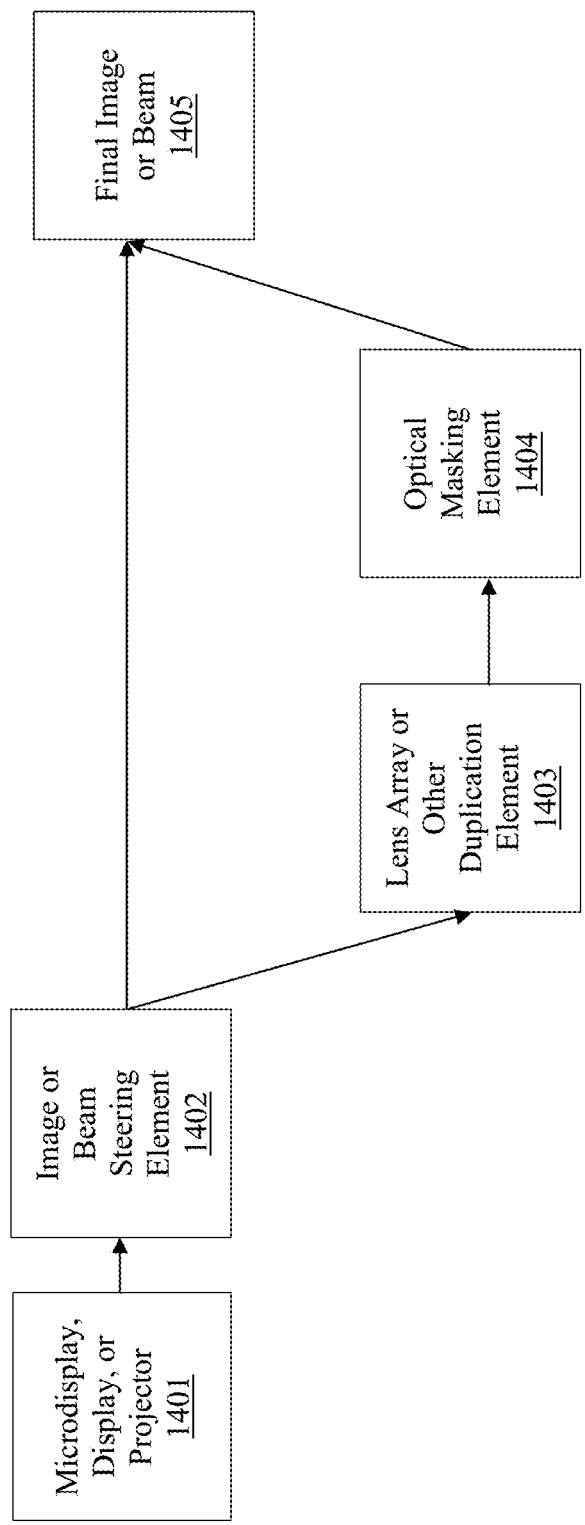
FIG. 14 shows a functional flow of light through the optical functions in a second lens array embodiment.

FIG. 14 shows a similar embodiment, using a single microdisplay, display or projector 1401. The image or beam proceeds from the microdisplay, display or projector 1401 to an image or beam steering element 1402. The steering element 1402 splits the image or beam, with the large image portion of the final image or beam sent directly (or through a large image or wide beam optics) to the final image 1405 (in some embodiments, such as in FIG. 3, the image is masked to extract small and large image portions accordingly first). The small image portion of the final image or beam is sent to the lens array (or other duplication element) 1403, and then to the optical masking element 1404 to mask off (hide) the duplicates in the area outside of the one duplicate image to be shown. This small image or narrow beam is then combined with the large image or wide beam from the steering element 1402 to form the final image 1405.

Figure 15:
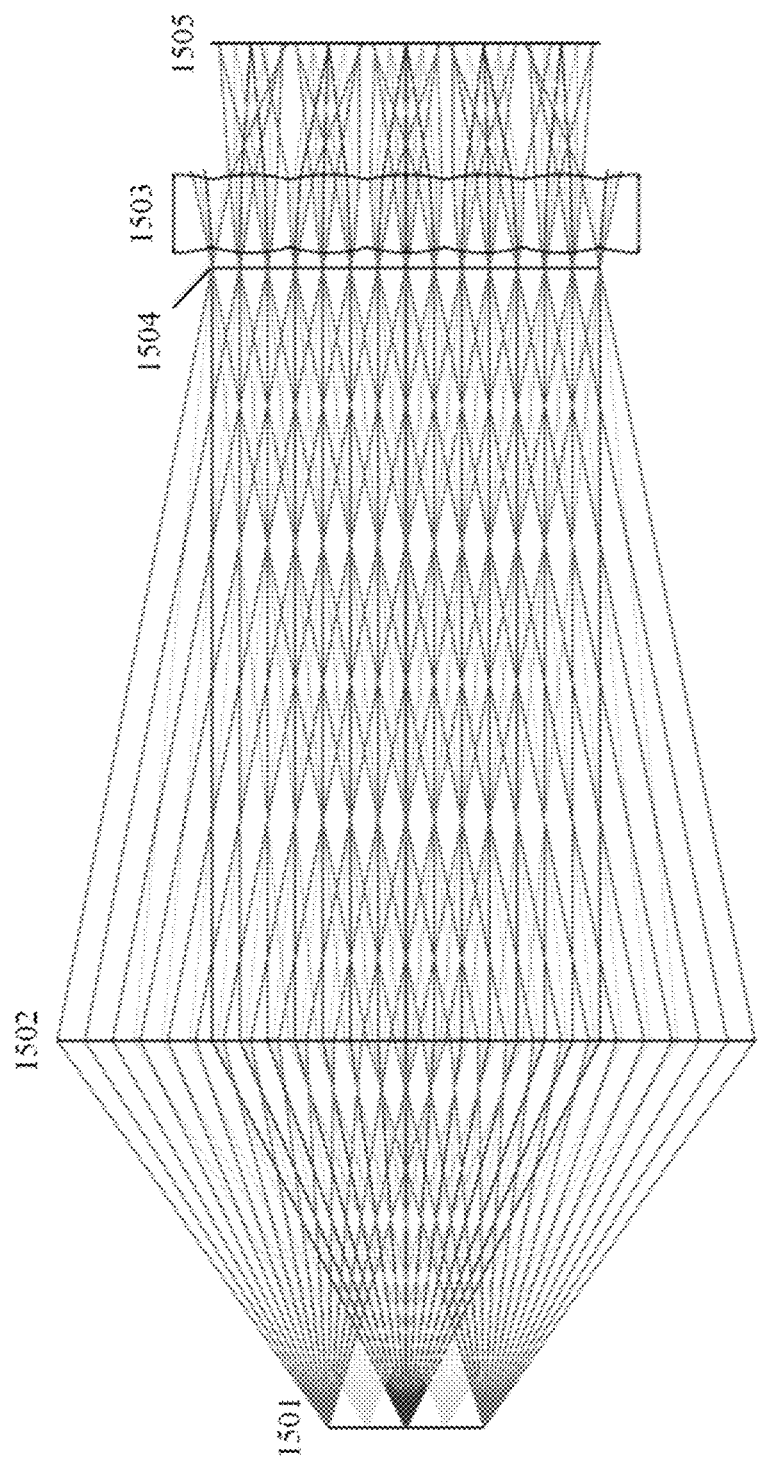
FIG. 15 shows the light flow through the elements of one lens array embodiment.

FIG. 15 shows the simplest setup of how display, microdisplay or projection beam can be duplicated this way and FIGS. 16A and 16B show the simulated result.

In FIG. 15, the image source (display, microdisplay or projector) 1501 sends the image to a lens 1502 which sends it to the aperture stop 1504. The image or beam then proceeds to the lens array 1503 and then to the screen 1505 or viewer's retina.

FIGS. 16A and 16B show the simulated result. FIG. 16A is the original image from the display, microdisplay or projector 1601 and FIG. 16B is the resulting image on the screen or viewer's retina 1602.

Figure 17A:
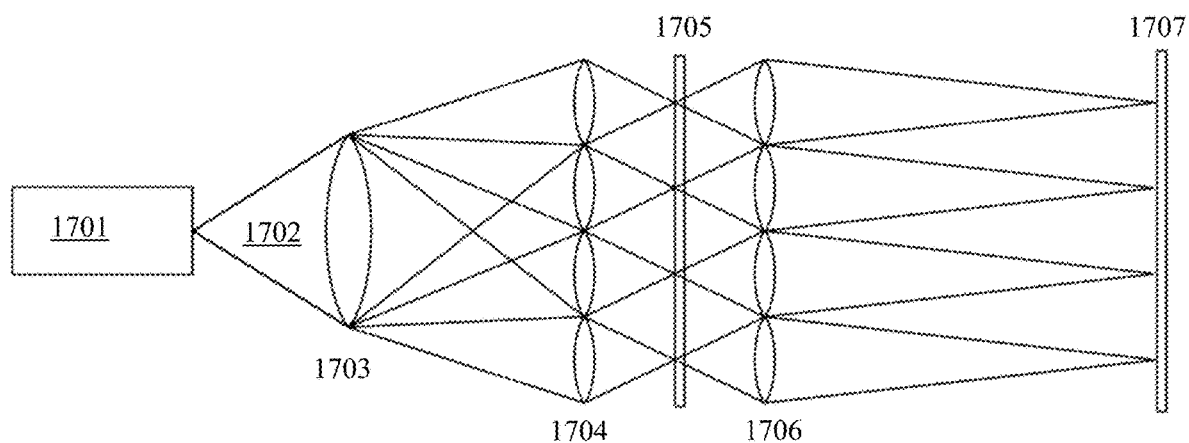
FIG. 17A shows an embodiment using a matched set of lens arrays and an optical masking element.

FIG. 17A shows a simple setup with one possible position of the optical masking element. 1701 is a microdisplay, display or projector, 1702 is the light cone (beam) of a single pixel from 1701. 1703 is a simplified illustration of a multi-element lens. 1704 is the first lens array which focuses the pixel light cones (beams) to pixels on a LCD microdisplay optical masking element 1705 on an intermediate image plane and 1706 is the second lens array which again focuses the pixel light cones on the final image plane on a projection screen 1707 or the viewer's retina. The second lens array 1706 can also be replaced with other optics such as an ordinary projection lens or eyepiece lens.

Figure 17B:
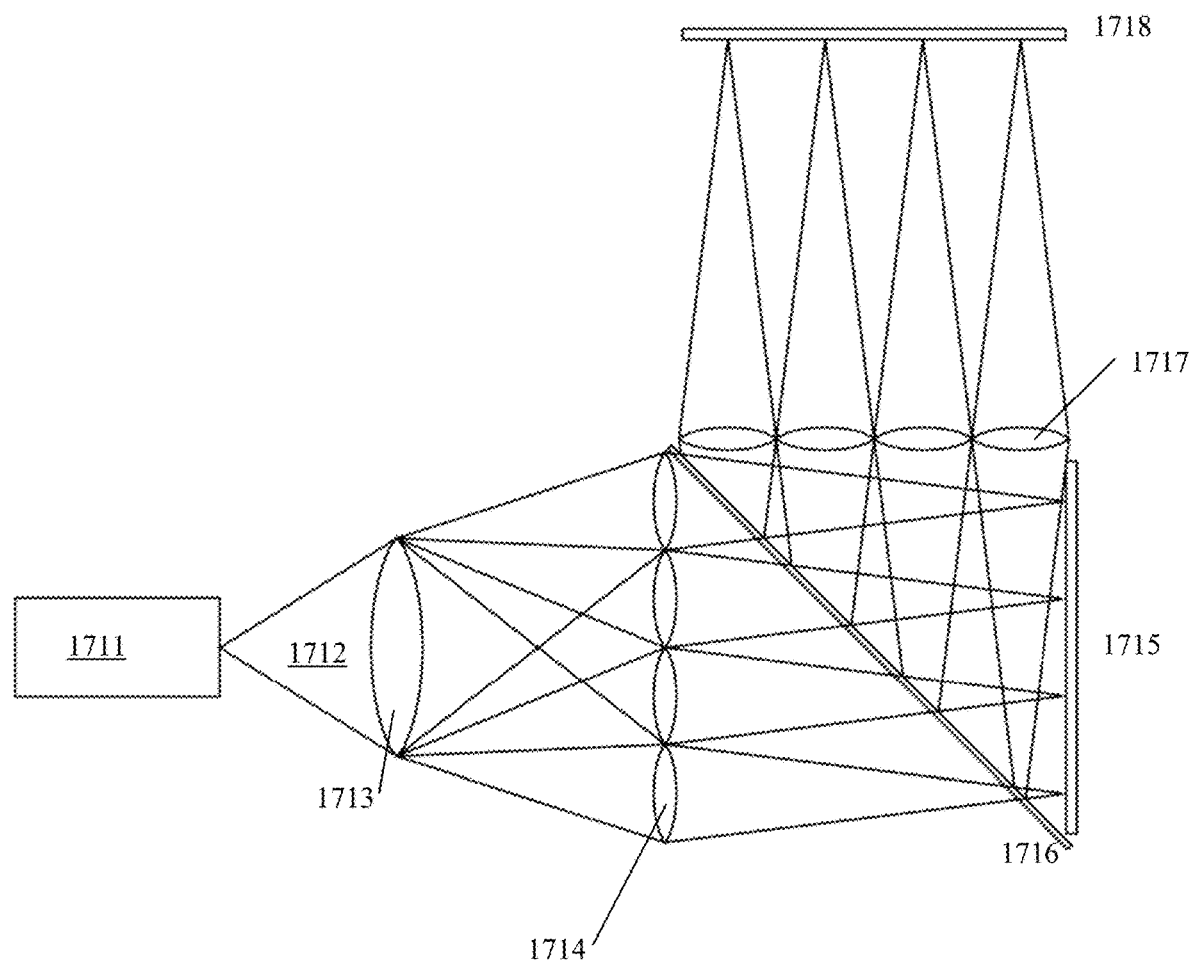
FIG. 17B demonstrates reflective microdisplay used for the optical masking element.

FIG. 17B shows a reflective microdisplay such as LCoS or DLP used for the optical masking element. 1711 is a microdisplay, display or projector generating the image or beam, 1712 is a light cone (beam) of a single pixel from 1711, 1713 is a simplified illustration of a multi-element lens, 1714 is the first lens array which focuses the pixel light cones (beams) to pixels on a LCoS microdisplay optical masking element 1715 on an intermediate image plane and 1717 is the second lens array which again focuses the pixel light cones (beams) on the final image plane on a projection screen 1718 or the viewer's retina. A polarizer beam splitter or a PBS (polarizer beam splitter) cube 1716 is used to redirect the image or beam reflected off the LCoS microdisplay optical masking element 1715 90 degrees to the side rather than back to the first lens array. The second lens array 1717 can also be replaced with other optics such as an ordinary projection lens or eyepiece lens. With DLP microdisplay a TIR or RTIR (total internal reflection) prism can be used in place of the polarizer beam splitter or PBS (polarizer beam splitter) cube 1716.

Figure 17C:
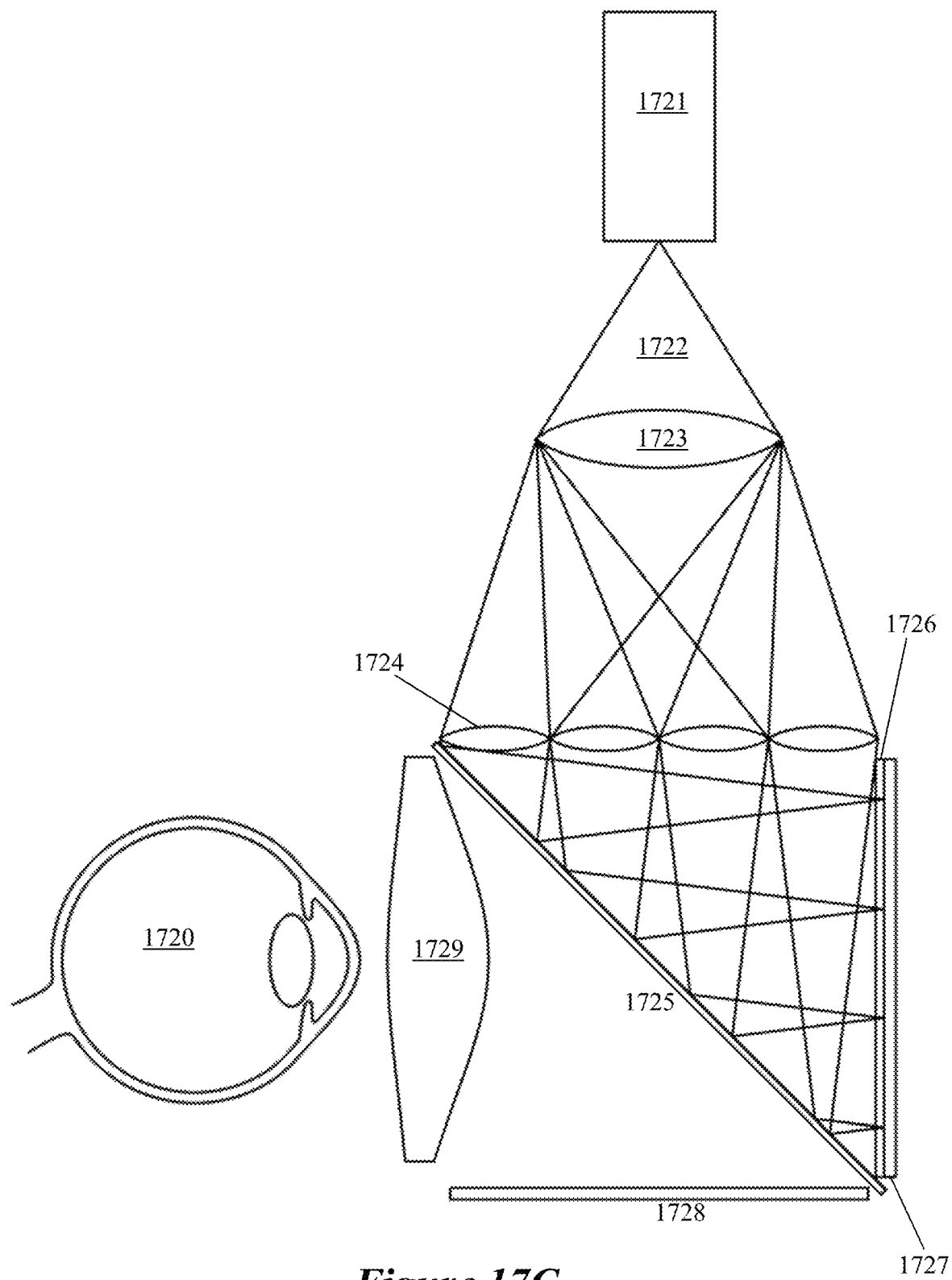
FIG. 17C shows the use of a display, such as an LCD display with its reflective and backlight layers removed as the optical masking element.

FIG. 17C shows that it is also possible to use a display, not microdisplay, such as an LCD display with its reflective and backlight layers removed as the optical masking element. 1721 is a microdisplay, display or projector generating the image or beam, 1722 is a light cone (beam) of a single pixel from 1721, 1723 is a simplified illustration of a multi-element lens, 1724 is the lens array which focuses the pixel light cones (beams) to pixels on a screen 1727 on an image plane behind a LCD display optical masking element 1726 by reflecting the beam with a beam splitter 1725. The image from second display 1728 also reflects from the beam splitter thus both the second display and the screen are seen by the eye 1720 directly or through an eyepiece or waveguide 1729. Here the screen 1727 is used to display the small high resolution image and the display 1728 is used to display the large low resolution image of the final combined image combined by the beam splitter 1725.

Figure 17D:
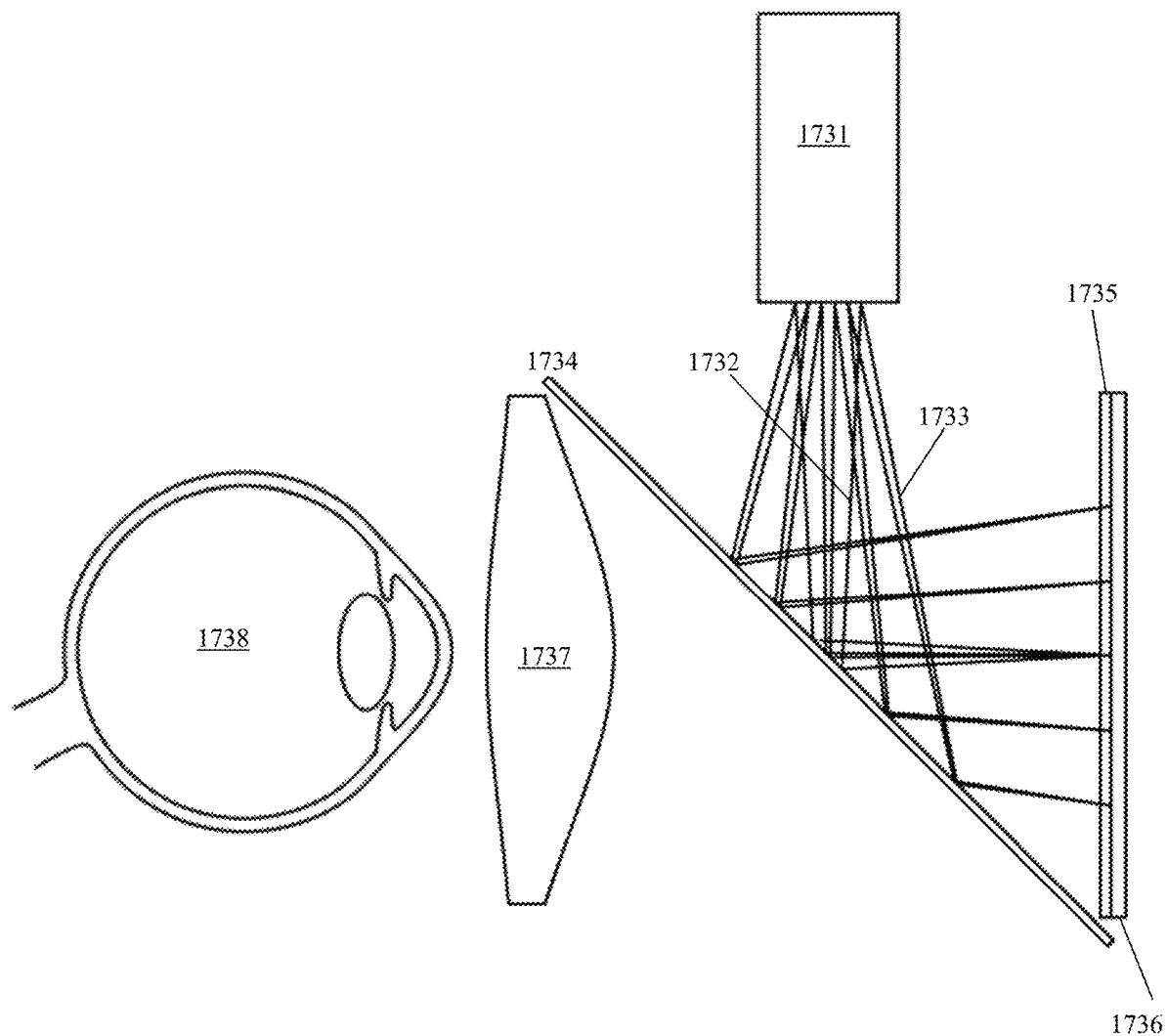
FIG. 17D illustrates the elements for generating an image with large and small parts that are already optically combined, with the ability to hide the duplicated images of the small part and show one of them.
Figure 20:
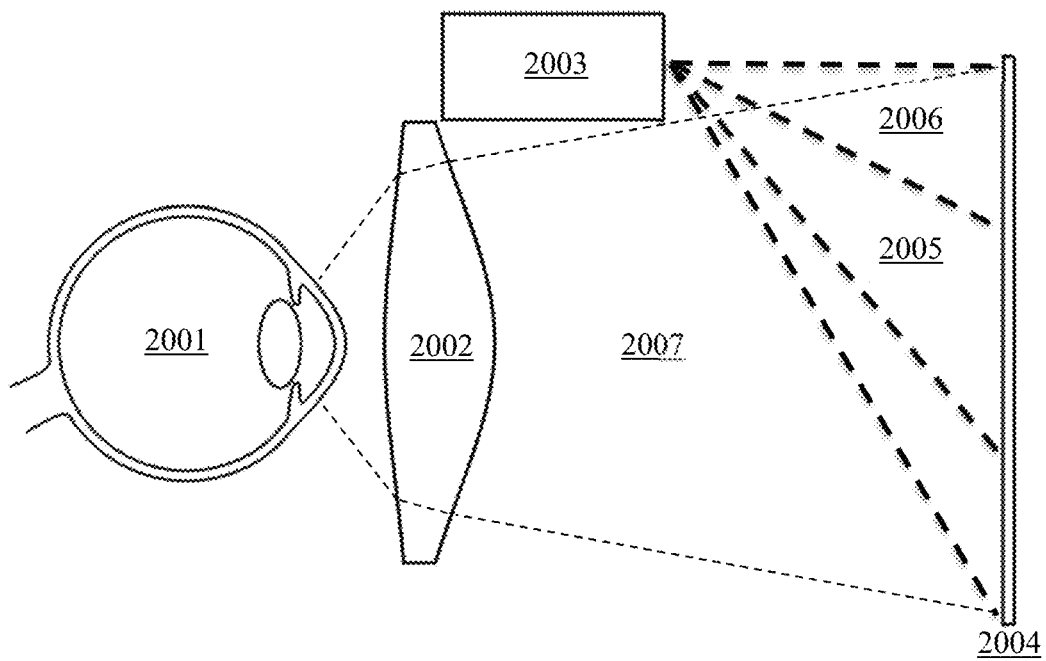
FIG. 20 shows an embodiment of the mounting of the present inventions in a head-mounted display where the physical size is reduced.
Figure 21:
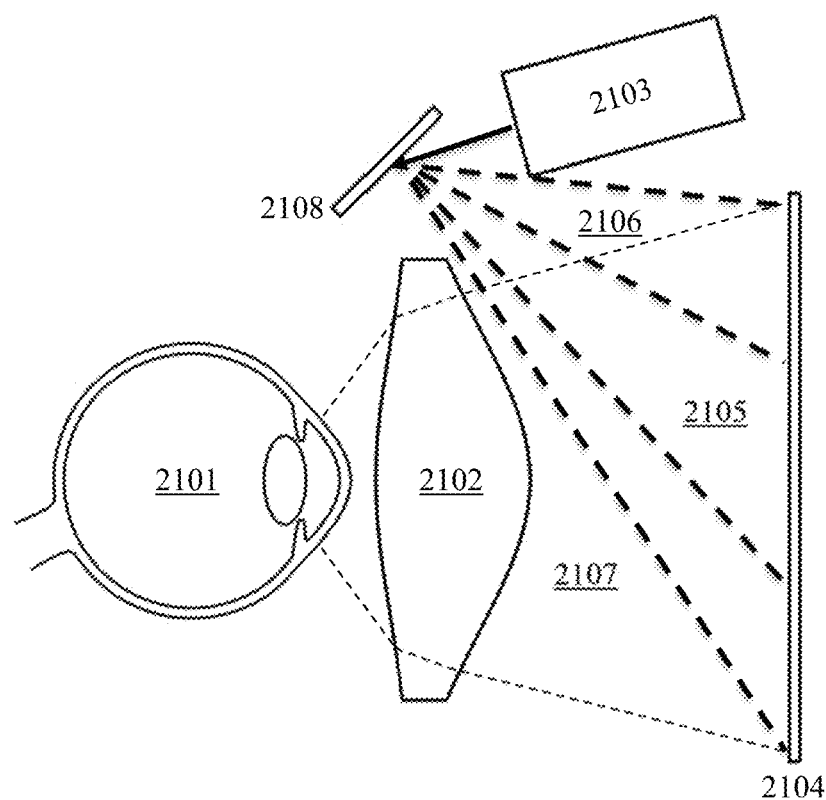
FIG. 21 shows an embodiment of the mounting of the present inventions in a head-mounted display using a mirror to reduce the physical size of the unit.

Alternatively, it is also possible to use a LCD display with its reflective and backlight layers removed as an optical masking element with a single microdisplay, display or projector (or two, as seen in FIG. 13) generating the image or beam without a second display 1728, as illustrated in FIG. 17D. In case of time-multiplexed approach as described in FIG. 2 a beam splitter 1725 is also not necessary as illustrated in FIG. 20 and FIG. 21.

In one embodiment, the beam splitter 1725 is a reflective polarizer beam splitter. In one embodiment, a first quarter wave plate (not shown) may be positioned between beam splitter 1725 and screen 1728 and/or a second quarter wave plate (not shown) may be positioned between beam splitter 1725 and screen 1727. The quarter wave plates may rotate the polarization of light reflecting off of the screen 1728 and screen 1727, respectively.

In the FIG. 17D illustration, the elements for generating a duplicated image or beam are not illustrated and are in 1731 which represents a microdisplay, display or projector or two microdisplays, displays or projectors with the wide beam and duplicated beam already optically combined as described in FIG. 13 and FIG. 14. Light cone (beam) of a single pixel of the wide beam 1732 and light cone (beam) of single pixel of a duplicate beam 1733 both focus to pixels on a screen 1736 on an image plane behind a LCD display optical masking element 1735 by being reflected from a beam splitter 1734. The screen 1736 is seen by the eye 1738 directly or through an eyepiece or waveguide 1737.

In one embodiment, the beam splitter 1734 is a reflective polarizer beam splitter. A first quarter wave plate (not shown) may be positioned between beam splitter 1734 and screen 1736. The quarter wave plate may rotate the polarization of light reflecting off of the screen 1736.

Figure 17E:
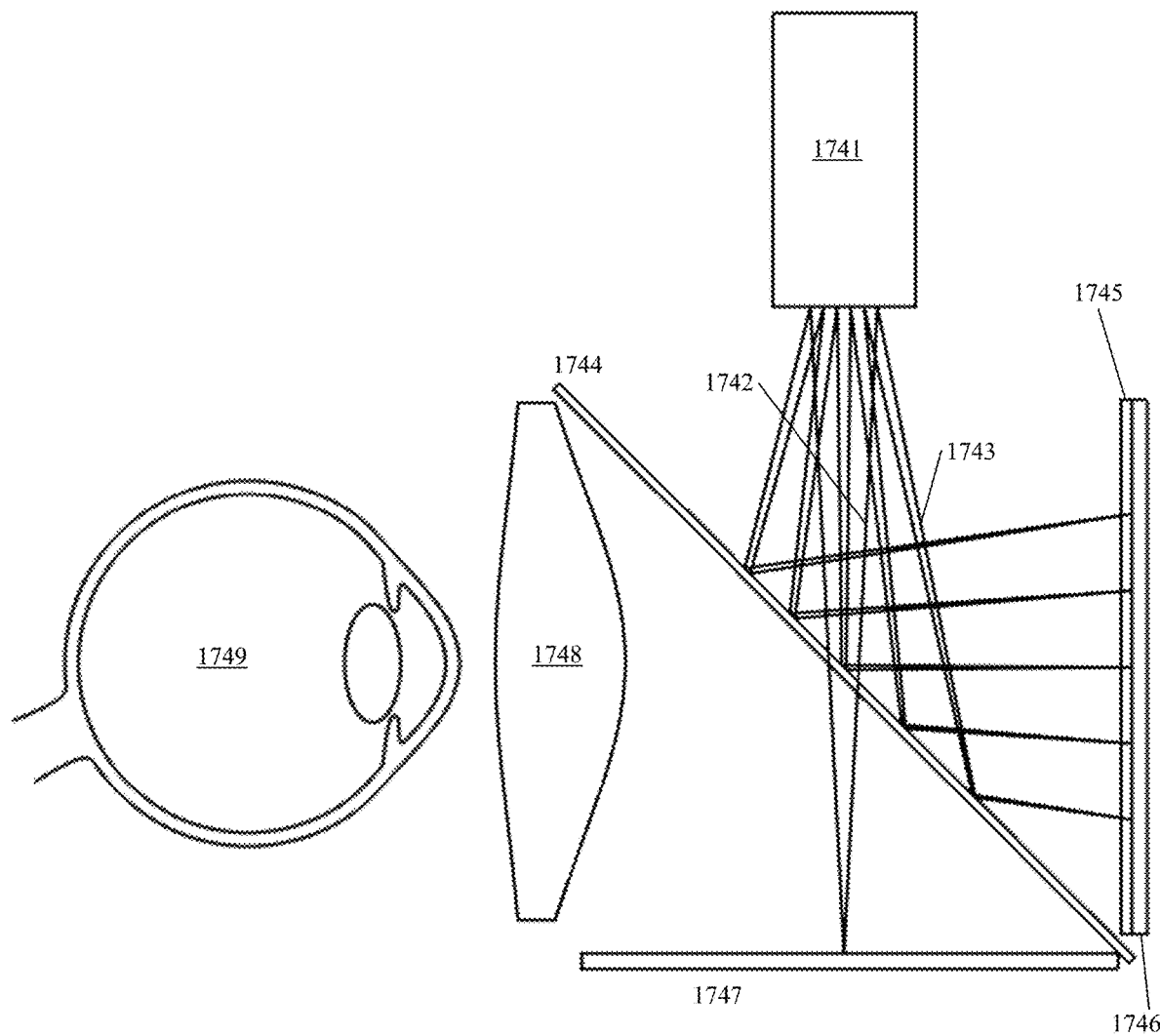
FIG. 17E shows the elements for generating an image with large and small parts that are already optically combined, with the ability to hide the duplicated images of the small part and show one of them.

In case of splitting a microdisplay, display or projector into two or more parts as illustrated in FIG. 3 a beam splitter may be used and also a second screen may be used as illustrated in FIG. 17E.

In the next illustration, FIG. 17E, the elements for generating a duplicated image or beam are not illustrated and are in optical system 1741 which represents one or more of a microdisplay, display or projector or two microdisplays, displays or projectors, an image steering element, small and/or large image optical elements, an image separation element, and/or a beam combiner. In one embodiment, the optical system 1741 includes one or more image source, an image steering element, a small image optical element, a large image optical element, and a beam combiner. The image steering element may be configured to separate an image into a first image component and a second image component as well as to direct the first image component to a first destination and to direct the second image component to a second destination. The wide beam (e.g., representing a low resolution, large image) and duplicated beam (e.g., representing a plurality of duplicates of a high resolution, small image) may already be optically combined as described in FIG. 13 and FIG. 14 at the output of the optical system 1741. The wide beam may be or represent a low resolution, large image, and the duplicated beam may be or represent a plurality of duplicates of a high resolution, small image. The low resolution, large image and the plurality of duplicates of the high resolution, small image may have been optically combined into a combined image as described in FIG. 13 and FIG. 14.

Light cone (beam) of a single pixel of the wide beam 1742 and light cone (beam) of a single pixel of a duplicate beam 1743 may focus to pixels on a second screen 1747 and screen 1746 respectively, the latter on an image plane behind an optical masking element 1745 (e.g., which may be an LCD display optical masking element or another type of optical masking element) by being reflected from a beam splitter 1744. The wide beam 1742 passes through the beam splitter 1744 and the duplicate beam gets reflected from the beam splitter 1744 instead due to these beams having different polarization (or in the case the beam splitter is a band pass filter or dichroic filter, having different light wavelengths). In an example, the low resolution, large image may pass through the beam splitter 1744 onto screen 1747, and the plurality of duplicates of the high resolution, small image may be reflected off of the beam splitter 1744 and onto screen 1746. The optical masking element 1745 may be positioned between the screen 1746 and the beam splitter 1744, and may mask off one or more of the plurality of duplicates of the high resolution, small image such that a single duplicate of the high resolution, small image remains, as described above. The screens 1746 and 1747 are optically combined by the beam splitter 1744 and seen by the eye 1749 directly or through the eyepiece or waveguide 1748. Accordingly, beam splitter 1744 may recombine the single duplicate of the high resolution, small image with the low resolution, large image to produce a variable resolution image that may be directed to the eyepiece or waveguide 1748 or focused directly onto the eye 1749 of a viewer.

In one embodiment, the beam splitter 1744 is a reflective polarizer beam splitter. In one embodiment, a first quarter wave plate (not shown) may be positioned between beam splitter 1744 and screen 1747 and/or a second quarter wave plate (not shown) may be positioned between beam splitter 1744 and screen 1746. The quarter wave plates may rotate the polarization of light reflecting off of the screen 1747 and screen 1746, respectively, to permit the reflected light from the screen 1747 to reflect off of the beam splitter 1744 (reflective polarizer beam splitter) and to permit the reflected light from the screen 1746 to pass through the beam splitter 1744 (reflective polarizer beam splitter) and arrive at eye 1749 and/or eyepiece or waveguide 1748.

Figure 17F:
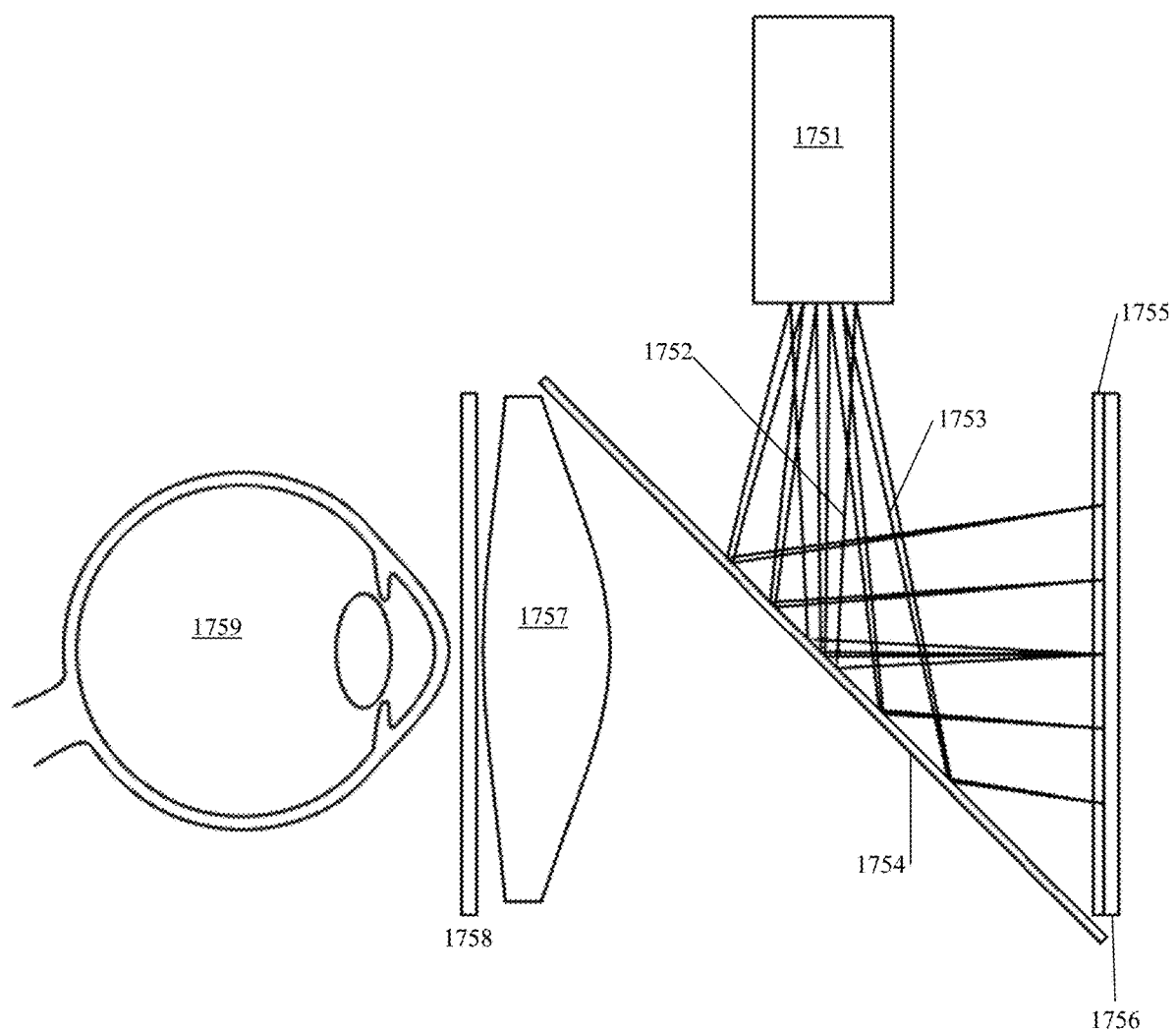
FIG. 17F demonstrates the elements for another embodiments for generating an image with large and small parts that are already optically combined, with the ability to hide the duplicated images of the small part and show one of them.
Figure 17G:
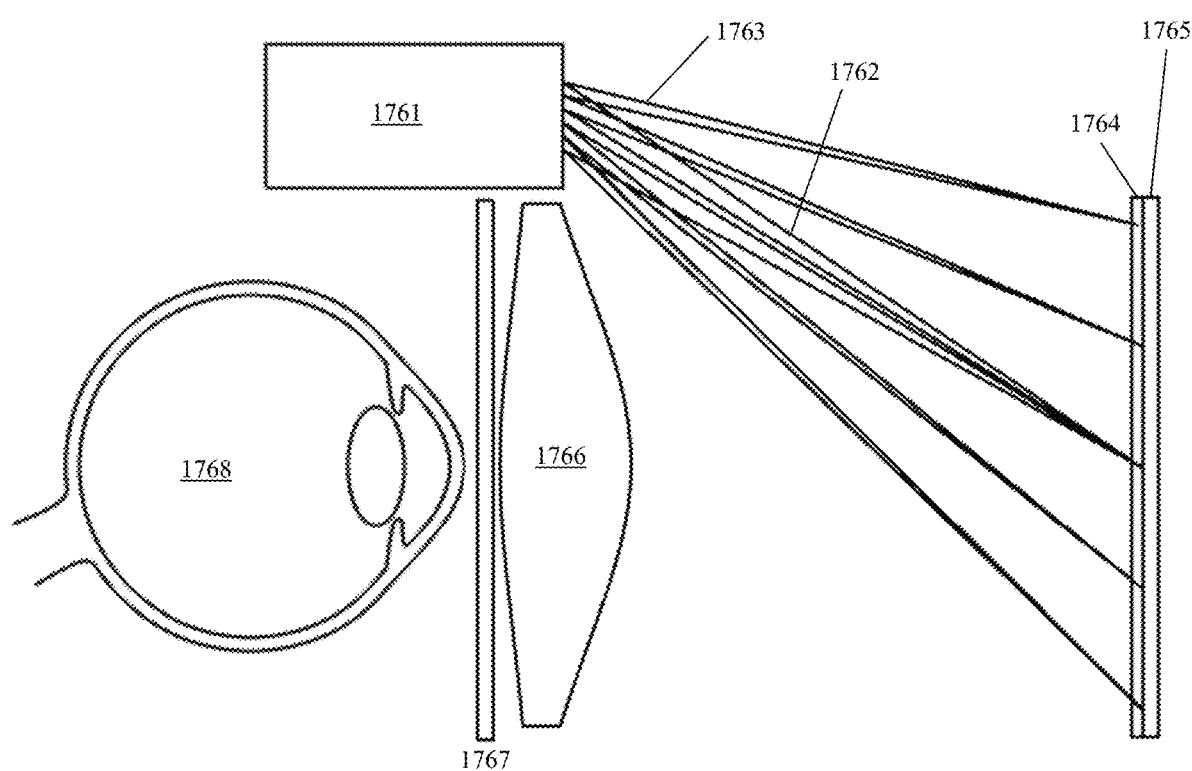
FIG. 17G presents another embodiments of the elements for generating an image with large and small parts that are already optically combined, with the ability to hide the duplicated images of the small part and show one of them.

Alternatively, in case of splitting a microdisplay, display or projector into two or more parts as illustrated in FIG. 3 both a beam splitter and also a second screen are not needed similarly to the case of time-multiplexing as illustrated in FIG. 2, as illustrated in FIGS. 17F and 17G.

In FIG. 17F the elements for generating a duplicated image or beam are not illustrated and are in 1751 which represents a microdisplay, display or projector or two microdisplays, displays or projectors with the wide beam and duplicated beam already optically combined as described in FIG. 13 and FIG. 14.

Light cone (beam) of a single pixel of the wide beam 1752 and light cone (beam) of single pixel of a duplicate beam 1753 both focus to pixels on a screen 1756 on an image plane behind a LCD display optical masking element 1755 by being reflected from a beam splitter 1754. The screen 1756 is seen by the eye 1759 directly or through the eyepiece or waveguide 1757.

To be able to pass both the wide and duplicated beams through the same LCD display optical masking element but use the optical masking element for blocking the duplicated beams, instead of a traditional LCD display optical masking element a switchable liquid crystal polarization rotator display is used which is an LCD display optical masking element without polarizers. A single polarizer 1758, not two as on LCD display optical masking elements and displays, is placed before the viewer's eye 1759 and in front of the eyepiece or waveguide 1757 or somewhere before it or left on the LCD display optical masking element 1755.

The wide beam in this instance is not polarized or in the polarization state the polarizer 1758 is not going to filter out after the wide beam passes through the switchable liquid crystal polarization rotator/LCD display optical masking element 1755. The duplicated beam gets masked as expected by the LCD display optical masking element 1755 and the polarizer 1758 while the wide beam does not or gets masked where the duplicated beam is not masked.

In one embodiment, the beam splitter 1754 is a reflective polarizer beam splitter. In one embodiment, a first quarter wave plate (not shown) may be positioned between beam splitter 1754 and screen 1756. The quarter wave plate may rotate the polarization of light reflecting off of the screen 1756.

As mentioned previously the beam splitter 1754 is not necessary and used for reasons such as decreasing the physical dimensions of the apparatus. FIG. 17G illustrates the same system as FIG. 17F sans the beam splitter 1754.

In FIG. 17G the elements for generating a duplicated image or beam are not illustrated and are in 1761 which represents a microdisplay, display or projector or two microdisplays, displays or projectors with the wide beam and duplicated beam already optically combined as described in FIG. 13 and FIG. 14.

Light cone (beam) of a single pixel of the wide beam 1762 and light cone (beam) of single pixel of a duplicate beam 1763 both focus to pixels on a screen 1765 on an image plane behind a LCD display optical masking element 1764. The screen 1765 is seen by the eye 1768 directly or through the eyepiece or waveguide 1766.

To be able to pass the wide and duplicated beams through the same LCD display optical masking element but use the optical masking element for blocking the duplicated beams, instead of a traditional LCD display optical masking element a switchable liquid crystal polarization rotator display is used which is an LCD display optical masking element without polarizers. A single polarizer 1767, not two as on LCD display optical masking element and displays, is placed before the viewer's eye 1768 and in front of the eyepiece or waveguide 1766 or somewhere before it or left on the LCD display optical masking element 1764.

The wide beam in this instance is not polarized or in the polarization state the polarizer 1767 is not going to filter out after the wide beam passes through the switchable liquid crystal polarization rotator/LCD display optical masking element without the polarizers 1764. The duplicated beam gets masked as expected by the LCD display optical masking element without the polarizers 1764 and the polarizer 1767 while the wide beam does not or gets masked where the duplicated beam is not masked.

With the optical masking element it is possible to show one of the duplicate images at a time, however with digital manipulation of the source frame it is possible to have a digital and optical reconstruction of the original image visible anywhere on the duplicated image array area while hiding everything else with a positional accuracy up to the pixel resolution of the optical masking element and positioning speed equal to the few microsecond to millisecond pixel switching speed of the optical masking element.

Figure 18:
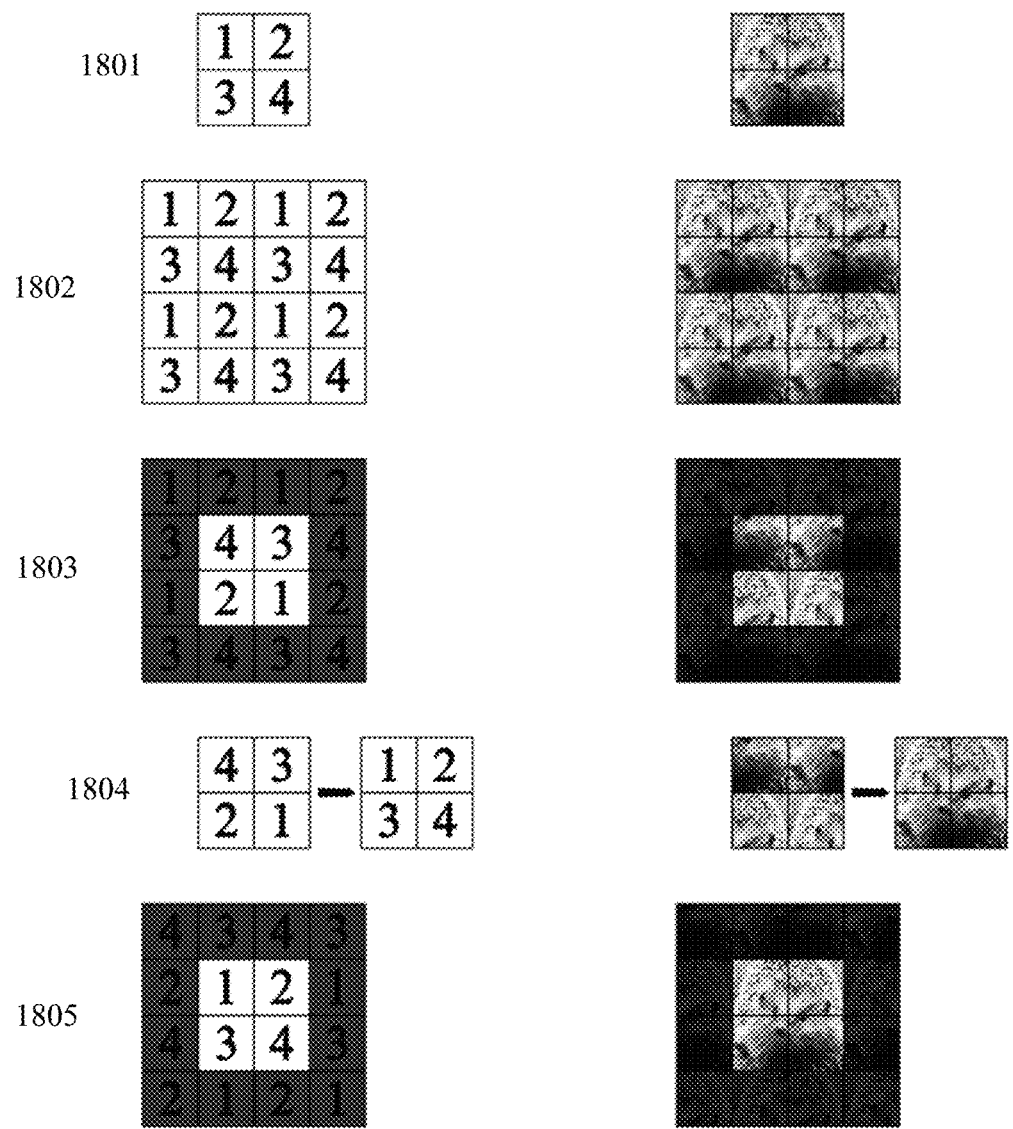
FIG. 18 illustrates digitally and optically rearranging portions of an image.

As an example, let's consider each duplicated image being made up for 4 parts, 1, 2, 3 and 4, as illustrated in FIG. 18, item 1801. In FIG. 18, the items on the left column illustrate these parts as squares with numbers while the right column uses actual image parts.

In FIG. 18, 4 of such duplicate images are stacked 1802. If we wanted to display one duplicate in the middle of this array 1802, we wouldn't be able to as illustrated in item 1803.

However, if we take the original image 1801, partition it into 4 pieces digitally and reposition those pieces digitally as in 1804, then we will get the result we want even though we are displaying parts of 4 duplicates at once.

The duplicates are then masked and the original image 1801 properly reconstructed by optical and digital methods as seen in 1805.

Figure 19:
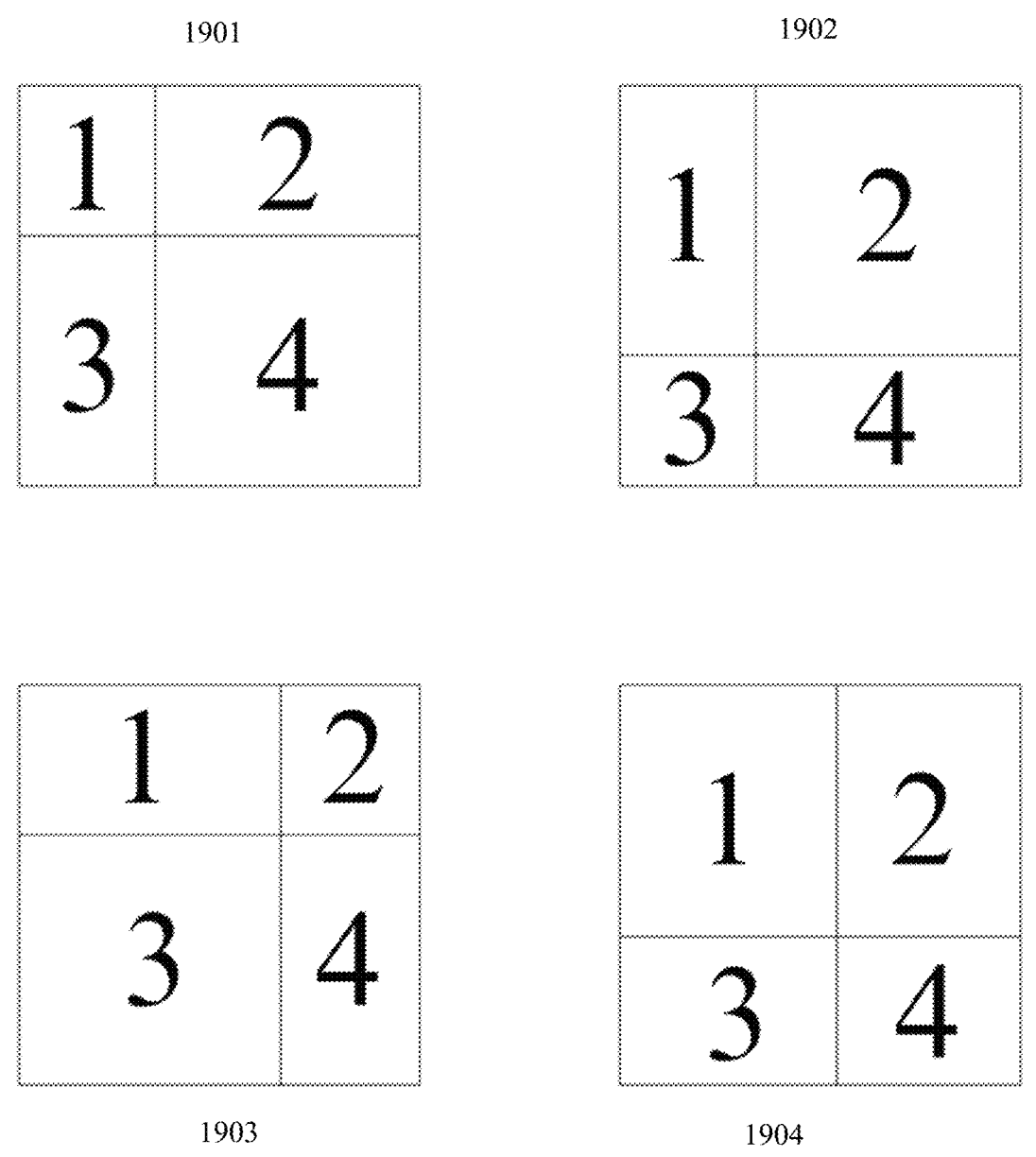

Since the optical masking elements discussed such as DLP, LCoS or LCD microdisplays or LCD displays are usually not double the resolution of the lens array but much more, the images can be partitioned into 4 rectangles and rearranged digitally not only at the middle of the image but at any desired location on the image as seen in 1901, 1902, 1903, 1904 in FIG. 19 with a possible limitation being the resolution of the source image display, microdisplay or projector and the resolution of the optical masking element.

Of course the visible portion from the optical masking element cannot be larger than the size of a single duplicate image from the array.

Head-Mounted Display Embodiments

In some embodiments, a head-mounted display includes an image source configured to output one or more image components and one or more optical element configured to receive the one or more image components and output one or more images onto a projection screen. In some embodiments, as described in greater detail herein above and below, the one or more image components comprise a high resolution, small image component and a low resolution, large image component and the one or more optical element is configured to receive the high resolution, small image component and output a high resolution, small image and to receive the low resolution, large image component and output a low resolution, large image. The high resolution, small image and the low resolution, large image may appear as a variable resolution image on the projection screen. In other embodiments, the one or more image components do not include a high resolution, small image component and a low resolution, large image component. For example, the image source may only output a single image component or type of image component, or the image source may output other combinations of image components than a high resolution, small image component and a low resolution, large image component. In such embodiments, the image that appears on the projection screen may not be a variable resolution image.

For embodiments in which the one or more image components include a high resolution, small image component and a low resolution, large image component, the one or more optical element may comprise a small image optical element configured to receive the high resolution, small image component and a large image optical element configured to receive the low resolution, large image component. The small image optical element and the large image optical element may share one or more of their constituents.

In some embodiments, the small image optical element includes a duplication element and an optical masking element, as described in further detail herein above and below. The duplication element receives the high resolution, small image and outputs a plurality of duplicates of the high resolution, small image. The optical masking element masks off one or more of the plurality of duplicates of the high resolution, small image such that at least portions of one or more duplicates of the high resolution, small image remain, wherein at least the portions of the one or more duplicates of the high resolution, small image form (together or alone) a complete single duplicate of the high resolution, small image that is focused onto a target position on the projection screen.

In some embodiments, the duplication element comprises a beam splitter and a lens or a lens array. In some embodiments, the duplication element comprises a beam splitter array and a lens or a lens array. In some embodiments, the duplication element comprises at least one of a multi-element lens or a lens array configured to reduce optical aberrations in the plurality of duplicates of the high resolution, small image.

In some embodiments, the head-mounted display further includes an image steering element configured to control a placement of the high resolution, small image on the projection screen. In some embodiments, the head-mounted display comprises a liquid crystal prism. In some embodiments, the liquid crystal prism is a polarization or diffraction grating with a liquid crystal polarization rotator. In some embodiments, the image steering element comprises a birefringent element and liquid crystal polarization rotator.

In some embodiments, at least one of the high resolution, small image or the low resolution, large image is a light field image.

In some embodiments, pixel information displayed by the high resolution, small image and a region of the low resolution, large image that corresponds to the high resolution, small image may be used together to enhance a contrast or bit depth of the high resolution, small image as it appears in the variable resolution image on the projection screen. For example, the high resolution, small image may be superimposed over the region of the low resolution, large image that matches the high resolution, small image, but at a lower resolution. The combination of data from the high resolution, small image and the low resolution, large image at the region of the superimposition can provide an increased contrast and/or an increased bit depth (e.g., increased color depth).

In some embodiments, the image source comprises a separate display or microdisplay panel for each color channel of a plurality of color channels. In such an embodiment, the head-mounted display may further include at least one of a trichroic prism, an X-cube prism or a dichroic filter to optically combine the plurality of color channels.

In some embodiments, the projection screen is a viewer's retina. In some embodiments, the head-mounted display comprises the projection screen. The projection screen may be a rear projection screen in front of or part of an emissive or transmissive display panel of the head-mounted display. The projection screen may be configured to scatter light from the emissive or transmissive display panel to cause a visible image from the projection screen and the emissive or transmissive display panel to be on a same focal plane. In some embodiments, the emissive or transmissive display panel is a liquid crystal display (LCD) panel, an organic light emitting diode (OLED) display panel, or a micro-LED display panel.

In some embodiments, the head-mounted display further includes an emissive or transmissive display panel configured to provide increased contrast or color depth for the one or more images. The head-mounted display further includes the projection screen, wherein the projection screen is a rear projection screen in front of or part of the emissive or transmissive display panel. The emissive or transmissive display panel may be a liquid crystal display (LCD) panel, an organic light emitting diode (OLED) display panel, or a micro-LED display panel.

In some embodiments, the projection screen is a component of the head-mounted display. In other embodiments, the projection screen is not part of the head-mounted display, and is an external screen viewed by a wearer of the head-mounted display through the head-mounted display. In some embodiments, the projection screen associated with the head-mounted display is a rear projection screen. In some embodiments, the projection screen is biaxially curved.

In some embodiments, the head-mounted display further includes an eyepiece configured to view the projection screen, wherein the eyepiece comprises a liquid crystal lens to provide variable image focus based on eye tracking data.

In some embodiments, the head-mounted display further includes a liquid crystal display, a liquid crystal microdisplay, or a liquid crystal shutter array configured to phase modulate at least one image of the one or more images.

In some embodiments, the head-mounted display is configured to increase a resolution of at least one image of the one or more images with intentional image distortion.

In some embodiments, the head-mounted display further includes a pixel shifting element configured to perform pixel shifting to increase a resolution of at least one image of the one or more images output by the image source(s). The pixel shifting element may be a liquid prism, a liquid crystal prism, or a liquid crystal microprism array. The pixel shifting element may also be or include a liquid crystal polarization rotator and a birefringent optical element before or after the liquid crystal polarization rotator.

In some embodiments, the head-mounted display further includes an optical masking element configured to display a copy of at least one image of the one or more images to provide at least one of an increased contrast or an increased color depth for the at least one image.

In some embodiments, a resolution of the one or more images is increased based on changing an aspect ratio of the one or more images.

In some embodiments, the projection screen is biaxially curved and both steers and scatters a projection beam comprising the one or more images.

In some embodiments, the one or more image components comprises a plurality of consecutive frames. The head-mounted display may use the plurality of consecutive frames to enhance a contrast or a bit depth of the one or more images.

In some embodiments, the head-mounted display is a head-mounted projective display. In such embodiments, the image source may comprise a separate display or microdisplay panel for each color channel of a plurality of color channels. The head-mounted display may further include at least one of a trichroic prism, an X-cube prism or a dichroic filter to optically combine the plurality of color channels.

The above optical designs can work for many different types of image and video displays. In head-mounted displays, the small space requirements present additional challenges.

FIG. 20 shows a direct embodiment of the mounting of the present inventions in a head-mounted display. The variable-resolution optics 2003 as shown in FIGS. 4A, 4B, 5, 13, 14, 17 produces the high resolution small image 2005 and the low resolution large image 2006 that are sent directly to the screen 2004. A human eye 2001 looks through a lens 2002 or other optics that collects the light 2007 from the image on the screen 2004.

FIG. 21 shows an indirect embodiment of the mounting of the present inventions in a head-mounted display. The variable-resolution optics 2103 as shown in FIGS. 4A, 4B, 5, 13, 14, 17 produces an image that is reflected off of a mirror 2108. The high resolution small image 2105 and the low resolution large image 2106 from the mirror 2108 are sent to the screen 2104. A human eye 2101 looks through a lens 2102 or other optics that collects the light 2107 from the image on the screen 2104.

Figure 22:
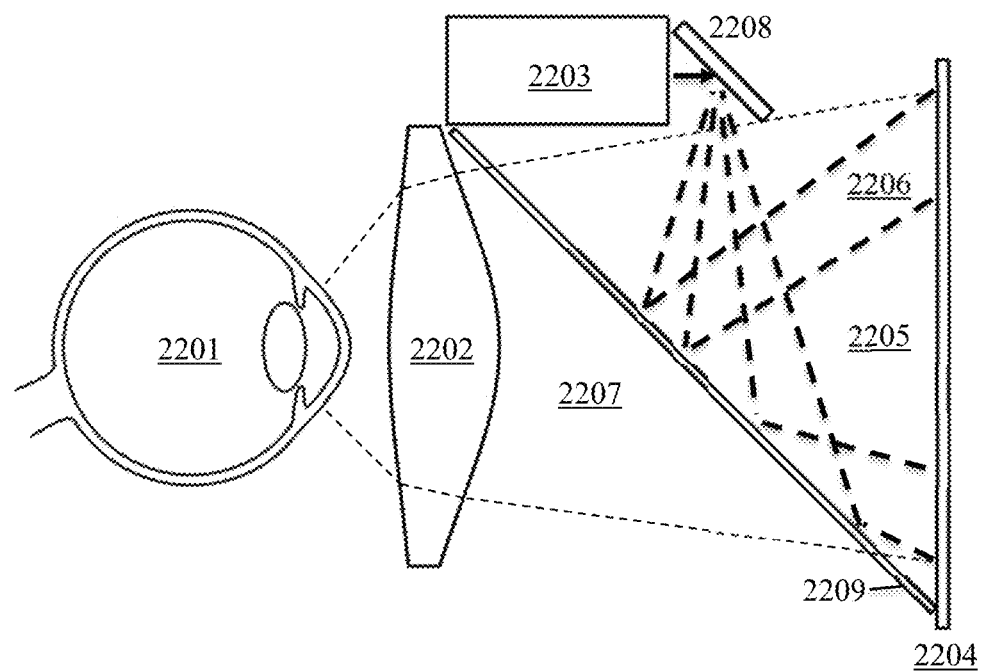
FIG. 22 shows an embodiment of the mounting of the present inventions in a head-mounted display using a mirror and a beam splitter to reduce the physical size of the unit.

FIG. 22 shows an indirect embodiment with a beam splitter of the mounting of the present inventions in a head-mounted display. The variable-resolution optics 2203 as shown in FIGS. 4A, 4B, 5, 13, 14, 17 produces an image that is reflected off of a mirror 2208. The mirror 2208 reflects the light to a beam splitter 2209 which reflects the high resolution small image 2205 and the low resolution large image 2206 onto the screen 2204. A human eye 2201 looks through a lens 2202 or other optics and through the beam splitter 2209 to see the light 2207 from the image on the screen 2204.

In one embodiment, the beam splitter 2209 is a reflective polarizer beam splitter. In one embodiment, a quarter wave plate (not shown) may be positioned between beam splitter 2209 and screen 2204. The quarter wave plate may rotate the polarization of light reflecting off of the screen 2204 to permit the reflected light from the screen 2204 to pass through the beam splitter 2209 (reflective polarizer beam splitter) and arrive at eye 2201 and/or eyepiece or waveguide 2202.

Figure 23:
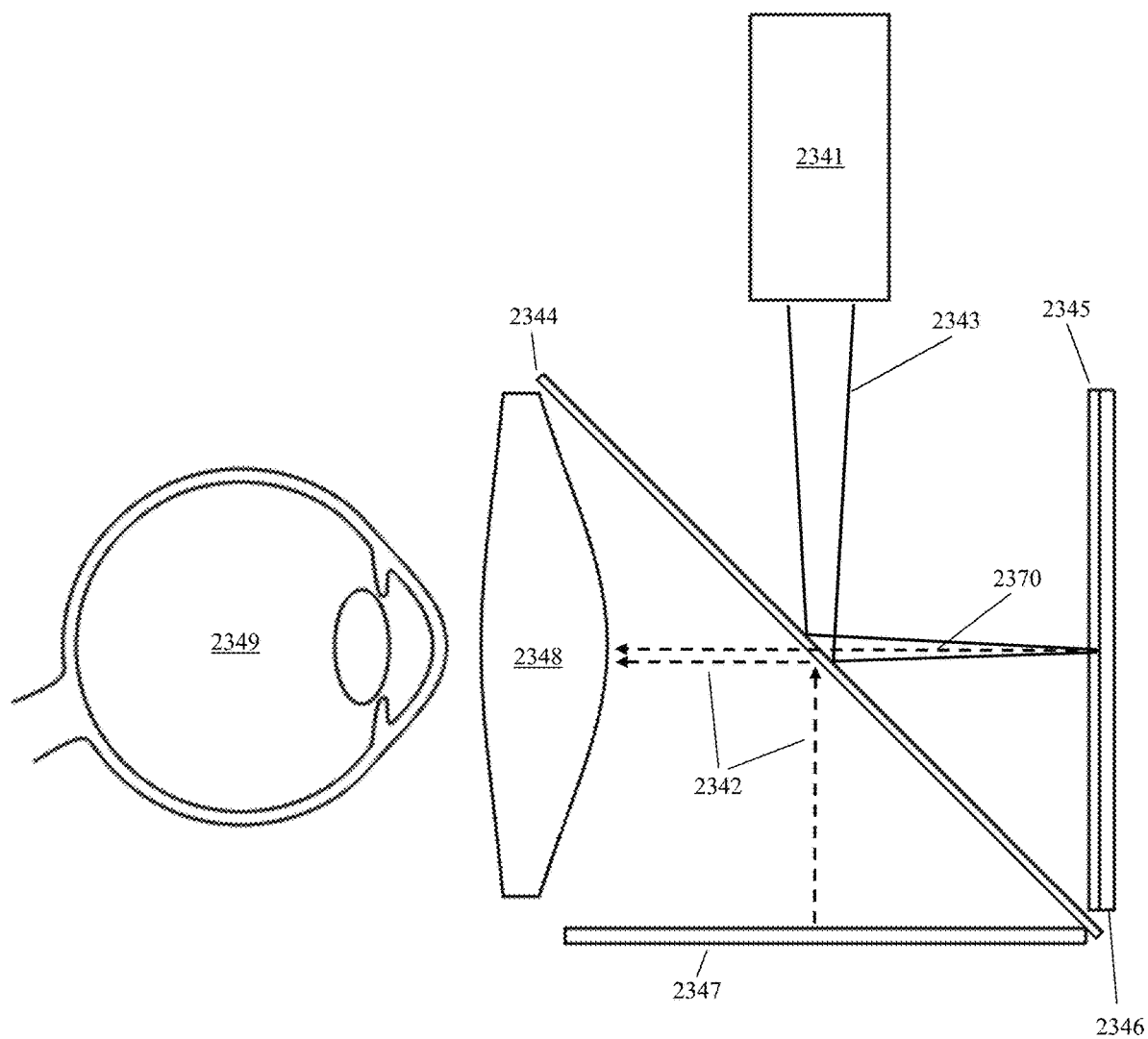
FIG. 23 illustrates an embodiment that uses a combination of a first optical source that outputs an image onto a screen to show a first portion of a variable resolution image and second optical source to show a second portion of the variable resolution image.

FIG. 23 illustrates an embodiment that uses a combination of a first optical source that outputs an image onto a screen to show a first portion of a variable resolution image and second optical source to show a second portion of the variable resolution image. In one embodiment, the first optical source is a projector that projects the image onto a projection screen, and the second optical source is a display or microdisplay.

An optical system 2341 may include the elements for generating a duplicated image or beam, as discussed above. The optical system may include, for example, an image source such as a microdisplay, display or projector, and may further include a lens array that produces a duplicated beam (e.g., duplicates of a high resolution, small image).

A light cone (beam) of a single pixel of a duplicate beam 2343 may focus to pixels on a screen 2346. The screen 2346 may be on an image plane behind an optical masking element 2345 (e.g., which may be an LCD display optical masking element or another type of optical masking element) by being reflected from a beam splitter 2344. Accordingly, a plurality of duplicates of a high resolution, small image may be reflected off of the beam splitter 2344 onto screen 2346. The optical masking element 2345 may be positioned between the screen 2346 and the beam splitter 2344, and may mask off one or more of the plurality of duplicates of the high resolution, small image such that a single duplicate of the high resolution, small image remains, as described above.

A second image source 2347 may be a display or microdisplay, such as an organic light emitting diode (OLED) display, a liquid crystal display (LCD), or other screen display.

The second image source 2347 may output a low resolution, large image (represented by a single beam 2342), which may reflect off of the beam splitter 2344 toward an eye 2349, eyepiece and/or waveguide 2348. The single remaining duplicate of the high resolution, small image (represented by a single beam 2370) may pass through the beam splitter 2344 toward the 2349, eyepiece and/or waveguide 2348. The single remaining duplicate of the high resolution, small image may merge with (e.g., be superimposed onto) the low resolution, large image to form a variable resolution image that may be directed to the eyepiece or waveguide 2348 or focused directly onto the eye 2349 of a viewer.

Reflective and transmissive microdisplays or displays such as DLP, LCoS and LCD have opaque or non-reflective gaps between each individual pixel or subpixel. If such a microdisplay or display is used as an optical masking element and is placed exactly on an intermediate image plane and the pixel size of the image projected onto it is smaller or close to the size of the pixel gap, resolution will be lost due to some pixels being completely or partially projected on these opaque or non-reflective gaps. This can cause a "screen-door effect," in which a grid of horizontal and vertical black lines may appear between pixels. Furthermore, if resolution is added, any screen-door effect from the optical masking element microdisplay or display will remain. One possible solution to this problem is having the optical masking element slightly offset to the intermediate image plane. For example, the optical masking element may be offset from the focal plane of the small image optical element, may be offset from a focal plane of a large image optical element, or may be offset from a focal plane of an optical system described herein. This does have the side effect of de-focusing the mask and mask edges. However, as has been mentioned previously, the defocusing of the mask and/or mask edges may actually be a desired effect in some embodiments.

Figure 24C:
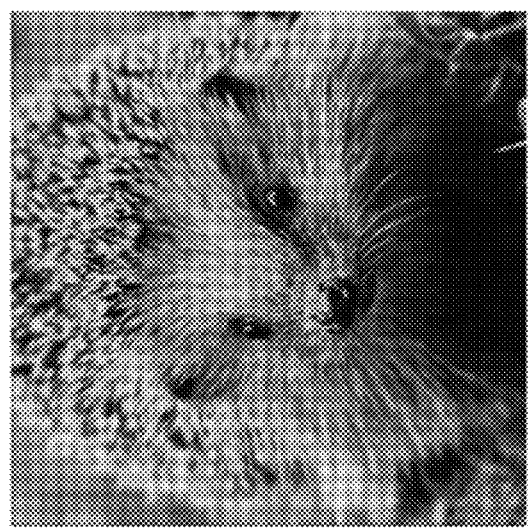
FIG. 24C illustrates the source image of FIG. 24A on an optical masking element that is slightly offset from the intermediate image plane, in accordance with an embodiment.
Figure 24B:
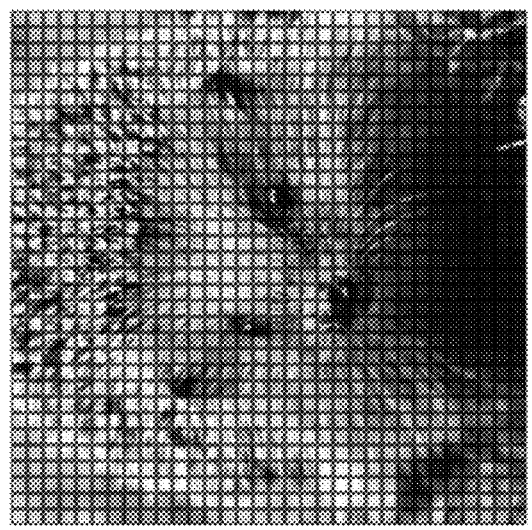
FIG. 24B illustrates the source image of FIG. 24A on an optical masking element that is on an intermediate image plane, in accordance with an embodiment.
Figure 24A:
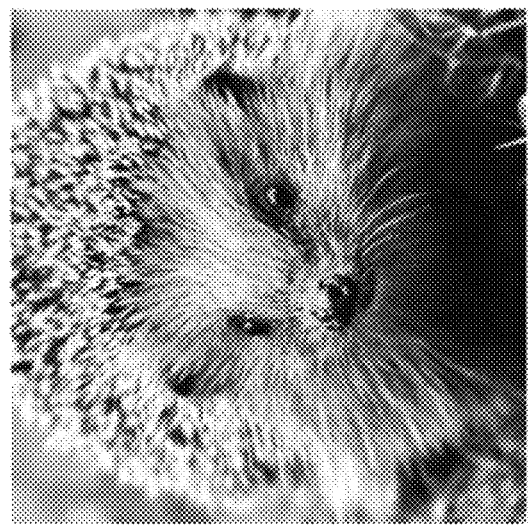
FIG. 24A illustrates a source image, in accordance with an embodiment.

FIG. 24A illustrates a source image, in accordance with an embodiment. FIG. 24B illustrates the source image of FIG. 24A on an optical masking element that is on an intermediate image plane, in accordance with an embodiment. As shown, there are gaps between pixels that show up as a grid of horizontal and vertical black lines. FIG. 24C illustrates the source image of FIG. 24A on an optical masking element that is slightly offset from the intermediate image plane (focal plane), in accordance with an embodiment. As shown, the screen-door effect is minimized.

Instead of having the plurality of duplicates of a high resolution, small image on the optical masking element simply be masked to only reflect or transmit one duplicate, the duplicate or duplicates which are to be reflected and transmitted can have their corresponding pixels on the optical masking element also be displaying the same image, albeit at a lower resolution. Similarly, the optical masking element (or a different optical masking element) may not simply fully transmit or reflect the low resolution, large image but may also display the same low resolution, large image. This may serve two purposes:

1. By having the same image spatially modulated twice, albeit on the optical masking element microdisplay or display at a possibly lower resolution, the contrast of the final image can be enhanced. If the optical masking element is slightly offset to the intermediate image plane, the low resolution version of the image displayed by the optical masking element will become blurred but also benefit from not having sharp corners on its pixels. The resulting effect is very similar to one achieved by a technology in LCD TVs and monitors called "full-array local dimming". This may be used both for the high resolution, small image as well as low resolution, large image.
2. Since the resolution of the optical masking element may be significantly higher than the LED array inside full-array local dimming LCD TVs and monitors, and also since the resolution of the low resolution, large image and the resolution of the optical masking element may be the same, and also since human vision has lower acuity for chroma (color) than for luminance (brightness), the optical masking element may also be used not only for enhancing contrast but also enhancing color depth (bit depth) of the final image. The resulting effect is very similar to one achieved by a video encoding and decoding technique of having lower resolution for chroma (color) than luminance (brightness) called "chroma sub sampling."

This may be used both for the high resolution small image as well as low resolution large image.

Figure 25:
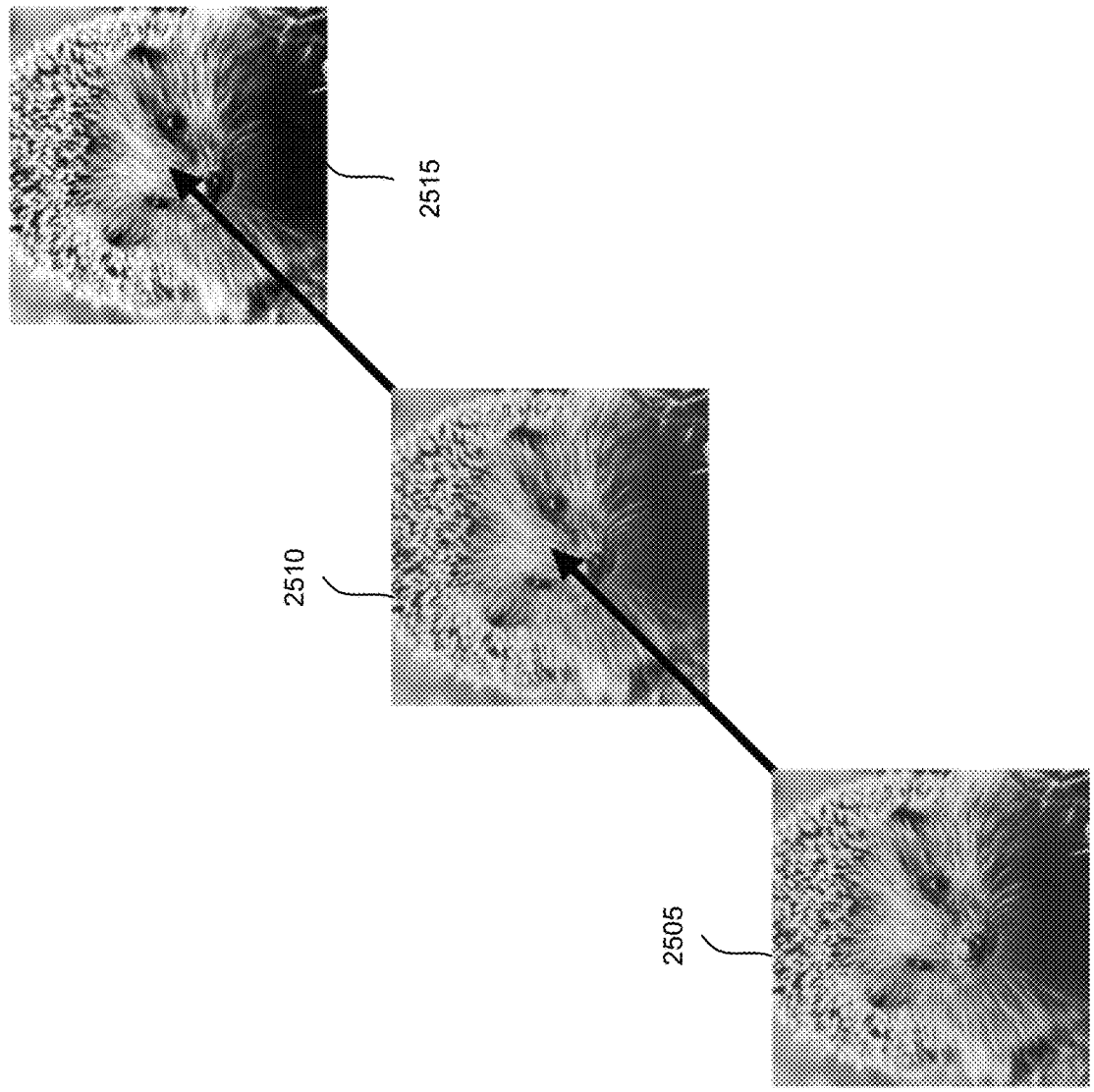
FIG. 25 shows how spatially modulating an image twice or spatially modulating two images which store different bit depth (color depth) information of an original image, from left to right, produces a higher contrast and/or higher bit depth (color depth) image on the right.
Figure 26:
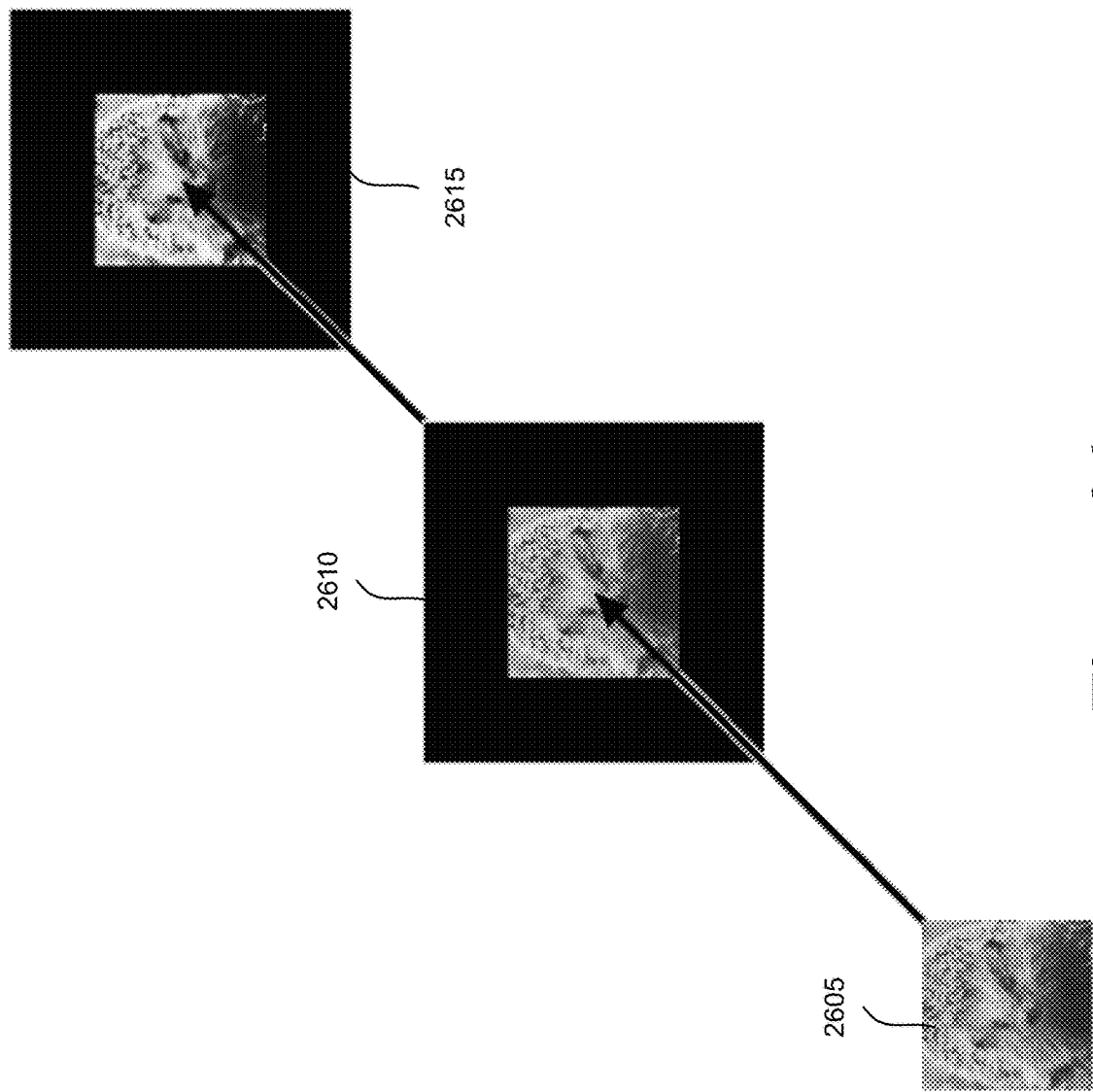
FIG. 26 shows, from left to right, how spatially modulating a high resolution, small image again or spatially modulating a different bit depth (color depth) information of the high resolution, small image on the optical masking element, where it is displayed at a lower resolution, produces a higher contrast and/or higher bit depth (color depth) image on the right.

FIG. 25 shows how spatially modulating an image twice or spatially modulating two images which store different bit depth (color depth) information of an original image, from left to right, produces a higher contrast and/or higher bit depth (color depth) image on the right. In FIG. 25, an original image 2505 is passed through an optical mask. The optical mask may be a display or microdisplay that displays a copy of the image 2510. The original image 2505 and the copy of the image 2510 may be combined to form merged image 2515, which may have an improved contrast and/or an improved color depth (bit depth) as compared to the original image 2505. FIG. 26 shows, from left to right, how spatially modulating a high resolution, small image again or spatially modulating a different bit depth (color depth) information of the high resolution, small image on the optical masking element, where it is displayed at a lower resolution, produces a higher contrast and/or higher bit depth (color depth) image on the right. As shown, a single duplicate of a high resolution, small image 2605 may be output by a lens array. An optical masking element may mask off other duplicates of the high resolution, small image, and may also display a copy of the high resolution, small image 2610. The copy of the high resolution, small image 2610 may have a lower resolution than the duplicate of the high resolution, small image 2605. The single duplicate of the high resolution, small image 2605 may be combined with the copy of the high resolution, small image 2610 to form a merged high resolution, small image 2615, which may have an improved contrast and/or an improved color depth (bit depth) as compared to the single duplicate of the high resolution, small image 2605 alone.

If the microdisplay, display or projector has subpixels then it may store first set of bit depth (color depth) of the final image and the optical masking element microdisplay or display may display the remainder. For example an OLED microdisplay may display 8 bit pixels and then the optical masking element LCoS, LCD or DLP microdisplay may be used to modulate the pixels again to reach 10 bit or more bit depth (color depth) on the final image.

If the microdisplay, display or projector operates color-sequentially, then it may store first set of bit depth (color depth) of the final image and the optical masking element microdisplay or display may again display the remainder. For example an LCoS microdisplay may display 8 bit pixels and then the optical masking element LCoS, LCD or DLP microdisplay may be used to modulate the pixels again to reach 10 bit or more bit depth (color depth) on the final image.

Furthermore, as has been mentioned previously, a single microdisplay, display or projector can also refer to microdisplays, displays or projectors where a separate display or microdisplay panel is used for each color channel and they are optically combined such as with a trichroic prism, X-cube prism or dichroic filters. In this instance, for example three LCoS microdisplays may display 8 bit pixels each and then an optical masking element LCoS, LCD or DLP microdisplay may be used to modulate the optically combined 24 (8×3) bit pixels again to reach 30 bit or more bit depth (color depth) on the final image.

Having at least one high resolution, small optical element and at least one low resolution, large optical element may serve more purposes in addition to creating a final variable resolution image, as a variable-resolution screen may also be useful for allowing the user to switch between these optical elements for controlling the field of view of the screen. For example, if the variable-resolution screen apparatus is to be used as a wearable display, the different small or large optics can be switched between to optically adjust the size of the virtual display. Doing so by digital means instead degrades resolution. Furthermore, one of the optical elements may include a user-controlled zoom lens to adjust the size of the virtual display to any desired size within a range.

A scanned pixel strip (one-dimensional array) or scanned pixel strips (group of one-dimensional arrays) are each a specific type of microdisplay, display or projector image source that may be used in embodiments. A scanned pixel strip has been used as an image source in the Nintendo Virtual Boy video game console and is described in U.S. Pat. No. 5,682,171. Pixels for different color channels in such an image source may be arranged on one strip, different strips per color and/or several strips to allow a lower scanning angle. The pixels may be emissive (such as LED, micro-OLED, micro-LED), transmissive (such as LCD) or reflective (such as LCoS, ferroelectric LCoS or DLP). The pixel strip may be scanned with one or more mirror, prism, or other image or beam steering element. A scanned pixel strip requires less physical pixels than a microdisplay, display or projector of same resolution and may have a lower production cost.

As illustrated in FIGS. 25 and 26, an optical masking element may be used to increase the contrast or bit depth (color depth) of the high resolution small image and/or the low resolution large image also in embodiments that do not involve a duplication element. For a transmissive or reflective microdisplay or display image source, the optical masking element may be positioned in the optical system before the image source to minimize the physical space requirements of the system and may be optionally slightly offset to an intermediate image plane to reduce a screen-door effect generated by the optical masking element. The optical masking element may display a much lower resolution and lower bit depth (color depth) copy of the source image.

Projection lenses may be designed to produce intentional chromatic aberration on the projected image in order to correct the chromatic aberration caused by a single element eyepiece lens.

Figure 32A:
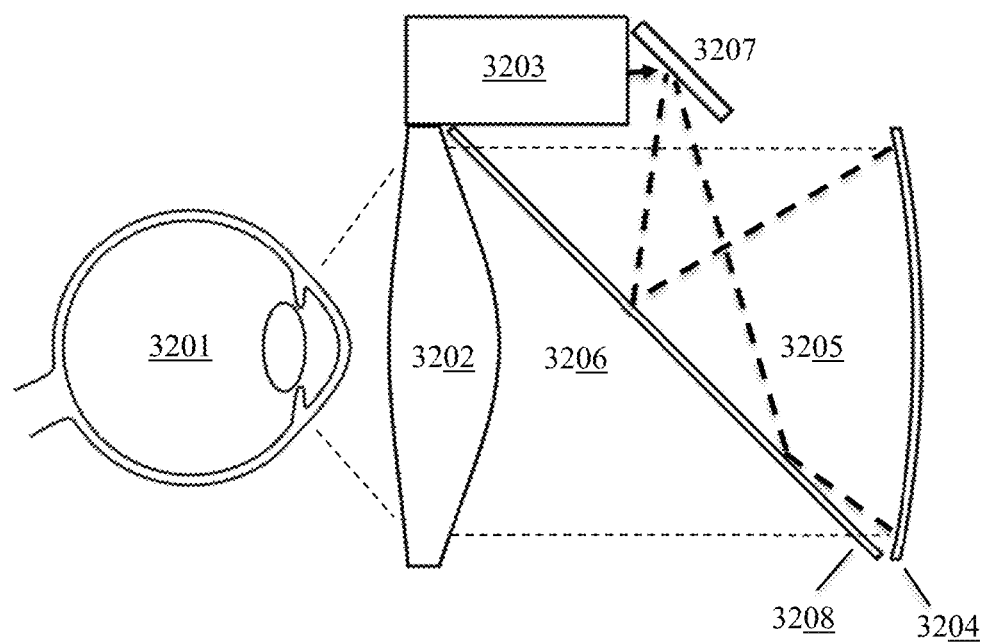
FIG. 32A illustrates how a curved projection screen with engineered reflective and scattering properties may be used to both steer the projection beam as well as scatter it by a specific amount to achieve a very high gain projection screen, in accordance with an embodiment.

In embodiments with a large beam splitter, as in FIGS. 22, 23, 32A, the beam splitter 2209 and/or an optional quarter wave plate (not shown) placed between the beam splitter 2209 and the projection screen 2204 may be slightly tilted, for example to the side of the head-mounted display, to prevent reflection of the projection lens and stray light from reaching the viewer's eye 2201 through the eyepiece 2202. Tilting the beam splitter 2209 may require the projection lens and optionally the optics before it to be tilted accordingly as well.

FIG. 22 illustrates an embodiment using a mirror 2208 and a beam splitter 2209 for reducing the physical size of the unit, however there are additional advantages to using a beam splitter. Video projection beams require a certain distance to generate a large enough image on a projection screen, however the available distance between the eyepiece 2202 and projection screen is 2204 determined by the focal length of the eyepiece. For wide field of view eyepiece and small screen dimensions necessary for a virtual reality headset, the distance may be quite short. Short throw or ultrashort throw projection lenses may be too large and heavy for a head-mounted display. When using a beam splitter 2209 the optical path of the projection beam is folded, thus allowing a projection lens designed for longer distance to produce the image of required size, while still allowing the eyepiece to be positioned close to the projection screen.

Unlike in FIG. 22, the beam splitter 2209 may have a different angle to allow the eyepiece and screen to be positioned closer, as long as the mirror 2208 or projector 2203 is rotated accordingly as well. An alternative solution may be the use of a rear projection screen, however the projection beam path behind the screen may still need to be folded with a mirror to reduce the size of the unit.

A wide projection screen in a head-mounted display is possible not only by using a wide angle projection lens but also by using two or more projection lenses with each projecting only part of a horizontal section of an image and then optically and/or digitally blending the overlapping edges of the projected images. There is a similar technique used with video projectors for blending projection images projected next to each other known as "edge blending", although it involves using two separate video projectors. Two projection lenses with each only projecting a horizontal portion the image may be achieved by splitting the image beam with, but not limited to, a half-silvered mirror beam splitter, a half-silvered mirror beam splitter and stencil, a reflective polarizer beam splitter or a reflective polarizer beam splitter and stencil. The two projection lenses may have different image offsets.

A projection screen may be curved, including curved biaxially, to match the curvature of the eyepiece lens. The projection screen may be a rear projection screen in front of or part of an LCD, OLED, micro-LED or other emissive or transmissive display panel. Such a display panel may serve as the large image source by generating the large image or it may be used with a projector image source projecting onto it to provide increased contrast or color depth for both the high resolution small image and low resolution large image generated by the projector by generating a copy of the small image, large image or both. The screen may scatter the light from the display panel, thus making the visible image from both the projector and display panel be on the same focal plane of the eyepiece or eye. Such a projection screen may also be made of a fiber optic taper or faceplate, which may be curved on the side facing the eyepiece to match the field curvature of the eyepiece.

A transmissive LCD panel may be placed in front of, behind or inside an eyepiece lens, or in front of or behind a large display panel or rear-projection screen for improving contrast or bit depth (color depth). The eyepiece lens may be a liquid crystal lens, for example as described in U.S. Pat. No. 10,379,419, or an extra liquid crystal lens may be added to the head-mounted display either before or after the eyepiece lens to provide variable image focus based on eye tracking data.

An image may further be phase modulated by a liquid crystal display, liquid crystal microdisplay or liquid crystal shutter array before the eyepiece, inside the eyepiece, after the eyepiece or before the eye of the viewer to provide variable focus across the final image without the need of eye tracking data.

The small image, large image or both may be a light field image to provide correct accommodation and vergence to the viewer. Light fields have higher processing requirements to provide a similar quality image in terms of resolution and bit depth (color depth), so eye tracking and foveated content generation may still be performed. Such a light field image may be generated with a lens array or other duplication element before or after a microdisplay, display or projector, as has been demonstrated by Nvidia with their near-eye light field display which has a lens array in front of a micro-OLED microdisplay, similarly to how light field cameras have a lens array in front of an image sensor. With this approach the final image resolution is quite low, however with the high resolution small image and the low resolution large image it may be increased.

Alternatively the small image may be a light field image while the large image is not, or vice versa. Additionally an electrically tunable lens in the small image or large image optics may be used to adjust the focus of the non-light field high resolution small image based on eye tracking data or the low resolution large image, thus providing correct accommodation for a non-light field high resolution small image or large image. When the small and large images are consecutive frames, the electrically tunable lens may also be a liquid crystal lens before, inside or after the eyepiece, or be the eyepiece itself and it may be set to switch based on the current frame.

The large image may be a non-light field image by being outside of the center of the viewer's field of view and therefore always out of focus. Light fields may also be generated with a microdisplay with high refresh rate without use of lens arrays as has been demonstrated, for example, by the Institute for Creative Technologies (ICT) of the University of Southern California.

A masking or steering element may be used for an illumination beam of a fast refresh rate reflective or transmissive microdisplay to control the angle of the light field image beams for each consecutive frame. After a light field image or beam is generated by a microdisplay, display or projector it may be used to produce a final image for a variable resolution screen the same way a non-light field image or beam may be used, as illustrated in FIGS. 2, 3, 4A, 4B, 5A, 5B, 5C, 5D, 5E, 5F, 5G, 511, 13, 14, 17C, 17D, 17E, 17F, 17G, 20, 21, 22, 23, 32A, 32B, 32C. Unlike in some of these figures, an ordinary projection screen may not be usable in such embodiments, as the screen may diffuse the light. In some embodiments, a mirror projection screen, mirror or curved mirror may be used rather than an ordinary projection screen, or the screen may be the viewer's retina.

Non-Mechanical Beam Steering and Shifting Elements

Instead of mechanical mirrors or optical slabs or non-mechanical image duplication and masking elements, one or more non-mechanical liquid prism, liquid crystal prism, liquid lens, liquid crystal lens, liquid crystal microprism array, liquid crystal polarization rotator, birefringent element such as calcite, birefringent element such as calcite with liquid crystal polarization rotator, electrically or magnetically controllable birefringent element, and/or electrically or magnetically controllable birefringent element with liquid crystal polarization rotator may be used. A liquid crystal prism may refer to a polarization or diffraction grating with a liquid crystal polarization rotator and/or a spatial light modulator such as a transmissive LCD microdisplay functioning as polarization or diffraction grating with or without a liquid crystal polarization rotator. These elements may be stacked to increase possible beam steering angles or beam shifting ranges. The incoming beam may be a polarized beam in embodiments. Dispersion introduced by these elements may be corrected digitally.

Positioning the high resolution small image on the final image in a wide range of positions with these non-mechanical elements is possible when used with a projector image source as the system, and the image beam is relatively small before and inside the projection lens and requires relatively small steering angles and shifting distances as well.

Figure 27A:
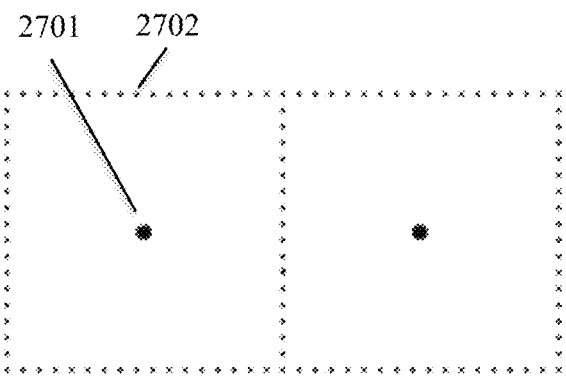
FIGS. 27A-27D illustrate how non-mechanical elements may shift an image beam and position an image, in accordance with an embodiment.
Figure 27B:
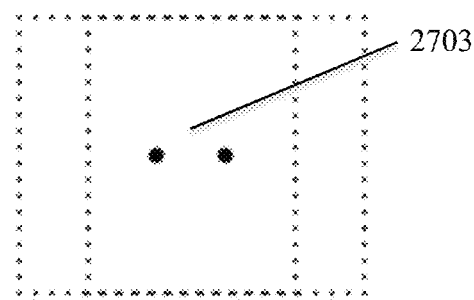
Figure 27C:
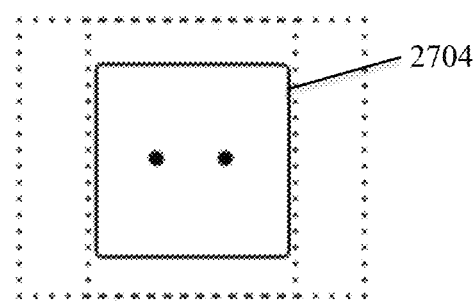

FIGS. 27A-27D illustrate how non-mechanical elements may shift an image beam and position an image, in accordance with an embodiment. FIGS. 27A-27D illustrate that the distance between the positions of the small image, which may be positioned by non-mechanical elements, may be as long as the size of the small image in each axis or may be shorter than the size of the small image in one or more axis. FIGS. 27A-27C further illustrate how much smaller the viewable area of the small image may be for the viewer to not experience a noticeable visual jump when switching between two or more positions. FIGS. 27A-27C further illustrate an amount of viewable area for nine positions of the small image.

FIG. 27A shows two possible image positions marked with black circles 2701 with a distance between each other matching the size of the image in each axis, with the sizes of the image when positioned illustrated by dotted line squares 2702. This kind of positioning may be impractical as the viewer will notice a jump when the position is changed between the two illustrated positions. Most of the listed non-mechanical beam steering and shifting elements cannot position the image in an arbitrary position between the two illustrated positions in FIG. 27A in each frame and can only position the image in two positions. The elements may be stacked to provide more possible positions. However, there is a limit to how many elements may fit in a small system. There is a solution to this problem which involves using a smaller visible portion of the whole image with such positioning.

FIG. 27B shows a different distance between two possible positions, where the distance between the two positions is smaller than the size of the image in each axis. FIG. 27C illustrates what size the visible portion of the image may be, the visible portion illustrated as a solid square 2704, for the desired result. In FIG. 27C the visible portion is small enough that it may be displayed both when the whole image is positioned on the left position as well as the right position, as the size of the image in each axis is larger than the distance between these positions. In an example where the visible portion has to smoothly move from a leftmost position to a rightmost position possible by two such positions, the image may first be positioned on the left position and the visible portion may be digitally positioned on the image to occupy the leftmost part of the image. Then the positioning of the visible portion may be performed digitally until the visible portion reaches a location illustrated in FIG. 27C which is either the rightmost part of the image when the image is positioned to the left position or the leftmost part of the image when the image is positioned to the right position. To move the visible portion of the image 2704 even more right the image may be positioned to the right position and the visible portion may immediately be shifted to cover the leftmost portion of the image rather than the rightmost, and from there on the positioning of the visible portion will again only be performed digitally by positioning the visible portion on the image until the visible portion reaches the rightmost part of the image.

Figure 27D:
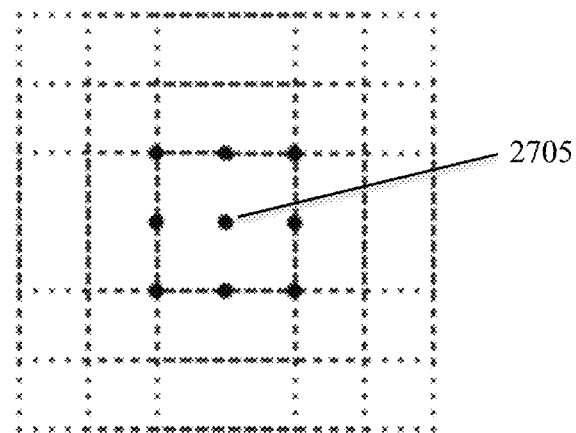

FIG. 27D shows 9 such positions 2705 of the image which illustrates how much area the visible portion of the image may be positioned in, where a single dotted rectangle from 2701 may be used as reference for the size of the area. As may be seen, while the visible portion is smaller than the image itself, the area it may be positioned in is larger. Nine such positions may be achieved with, for example, 6 liquid crystal prisms (3 for each axis) or 4 birefringent elements such as calcite with liquid crystal polarization rotators (2 for each axis), where each element is configured to shift a beam in only one axis. Such a positioning method may also be used for duplication and masking elements where the duplicate small images partially overlap on an intermediate image plane or on the final image.

Figure 28A:
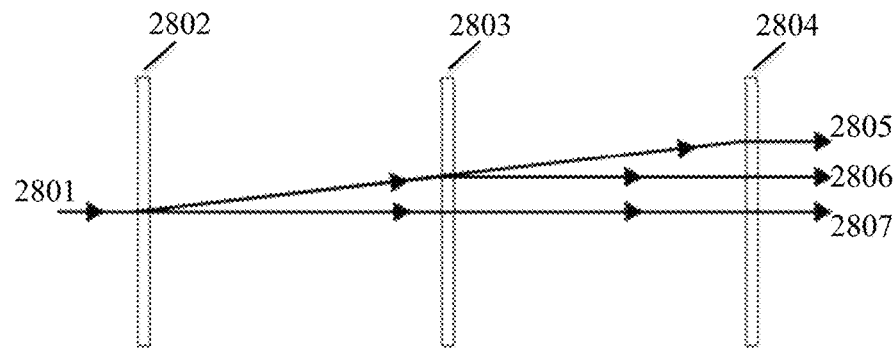
FIGS. 28A-28C illustrate various non-mechanical beam steering elements and how the beam may be shifted with each, in accordance with an embodiment.
Figure 28B:
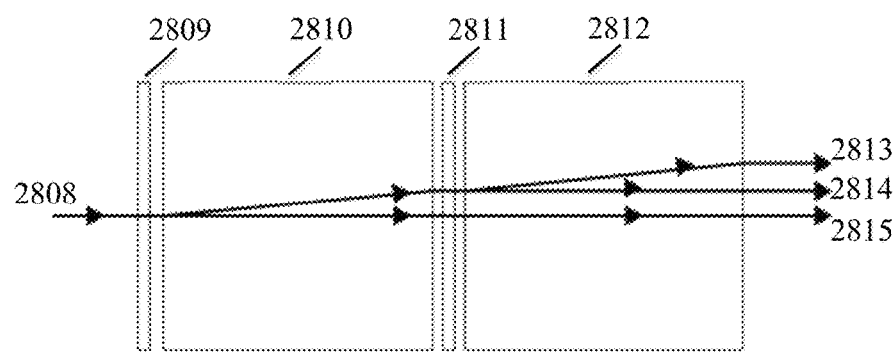
Figure 28C:
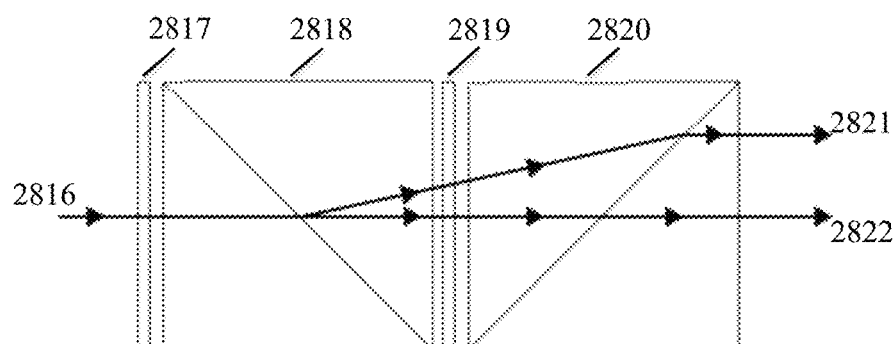

FIGS. 28A-28C illustrate various non-mechanical beam steering elements and how the beam may be shifted with each, in accordance with an embodiment. FIG. 28A illustrates 3 possible parallel beam paths of a beam going through 3 liquid crystal prisms. FIG. 28B illustrates 3 possible parallel beam paths of a beam going through 2 birefringent elements such as calcite and 2 liquid crystal polarization rotators. FIG. 28C illustrates 2 possible parallel beam paths of a beam going through 2 birefringent elements such as Rochon prisms and 2 liquid crystal polarization rotators.

In FIG. 28A three liquid crystal prisms 2802, 2803, 2804 are illustrated, which may be set to steer the incoming beam 2801 by a specific angle or let the beam pass through. The first liquid crystal prism 2802 is able to steer the incoming beam by a specific angle while the other two 2803, 2804 may steer the beam coming from first prism 2802 in the opposite angle, thus causing the beam leaving them 2805, 2806, 2807 to be parallel to the incoming beam 2801, but optionally shifted. Such liquid crystal prisms have two or three electrically adjustable states. In this example two states are assumed and the first state lets the beam pass through without being steered while the second state steers the beam. The liquid crystal prisms may also be not electrically tunable and let the beam pass through or steer it based on the polarization state of the beam, in which case a liquid crystal polarization rotator or other electrically tunable polarization rotator may be used between the liquid crystal prisms (not illustrated) for controlling the polarization state of the beam.

In FIG. 28B birefringent elements 2810, 2812 such as calcite with liquid crystal polarization rotators 2809, 2811 may shift the incoming beam 2808 by a specific amount or let the beam pass through depending on the state of the liquid crystal polarization rotators 2809, 2811 before them, with the beam leaving them 2813, 2814, 2815 being parallel to the incoming beam 2808 angle, but optionally shifted.

In FIG. 28C a specific type of birefringent elements, known as Rochon or Senarmont prisms 2818, 2820, with liquid crystal polarization rotators 2817, 2820 are shown. Due to the optical function of these prisms, only two possible beam paths 2821, 2822 parallel to the incoming beam 2816 may be achieved with two of such prisms.

The above figures illustrate the beam shifting only in one axis, but the other axis may be shifted as well, for example by stacking more of such elements one after the other.

More Duplication Elements

While a lens array may the most straightforward duplication element for creating duplicated beams with minimal amount of optical aberrations and required physical space, there are also other optical elements that may serve as a duplication element, such as, but not limited to, a pinhole array, diffractive optical element ("DOE"), holographic optical element ("HOE"), optical element based on fiber optics such as fiber optics taper or fiber optic faceplate, array of beam splitters, array of beam splitters combined with lens arrays, freeform prisms combined with lens arrays or a single beam splitter, PBS cube or wire-grid polarizer X-Cube prism combined with lens arrays. A pinhole array is a simple alternative to a lens array but may suffer from much lower light throughput and worse optical aberrations. A diffractive optical element or diffraction grating may duplicate images. A disadvantage with DOEs may be that they work well with monochromatic laser light, so may only be practical when used with separate microdisplays for each color channel and in situations where there is enough physical space. A crossed fiber grating is a specific type of diffraction grating that may be used. A holographic optical element may be used, which also works by diffraction and may have similar disadvantages as DOEs.

FIG. 29 illustrates a fiber optic taper or faceplate from four different angles, with each optical fiber of the taper or faceplate branching out into 4 fibers and thus each pixel going through 4 fibers and producing 4 duplicate pixels, in accordance with an embodiment. A fiber optic taper or faceplate may function as a duplication element by having each optical fiber branch out into two or more fibers, and thus each pixel going through one or several fibers may produce two or more duplicate pixels, as illustrated in FIG. 29, where the fibers are illustrated as 4 extruded squares 1, 2, 3, 4. Depending on the size of the fiber optic taper or faceplate face on the opposite side, the optical masking element, for example a transmissive LCD display panel, may be placed right in front of the faceplate or taper face.

An array of beam splitters may be used to split the beam into two or more duplicate beams. The beam splitters may be half-silvered mirror beam splitters or reflective polarizer beam splitters. In place of beam splitters, a freeform prism may alternatively be used. An extra lens array after the freeform prism may be used to undo any geometric distortion or other optical aberrations imposed on the image by the freeform prism.

When using a beam splitter or beam splitter array (stacked or a group of beam splitters) as a duplication element by itself, beams coming out of such a beam splitter or beam splitter array may have different length optical paths that should be accounted for, for example by using a lens or lens array after or before each beam splitter where each lenslet on the lens array meant for a specific duplicate beam may have a different lens profile. The lens array may have more than one lens element for correcting optical aberrations. Alternatively, a fiber optic faceplate or taper may be placed after each beam splitter with each having a different length.

A single beam splitter, PBS cube or wire-grid polarizer X-Cube, optionally combined with lenses and/or lens arrays after it, may make sense where the small image covers a significant field of view of the viewer. Such a configuration also makes sense where, for example, the field of view should only be doubled horizontally. Although for LCoS illumination rather than imaging, such beam splitter diagrams are provided in U.S. patent 20130063671A1.

With an image source with a fast refresh rate such as OLED, micro-OLED, micro-LED or ferroelectric LCoS (FLCoS) microdisplay, it is possible to use a very low resolution but high refresh rate optical masking element, such as Pi-cell shutter array or ferroelectric liquid crystal shutter array, with the resolution of the optical masking element, such as the amount of optical shutters, matching the amount of duplicate beams produced by the duplication element.

Figure 30:
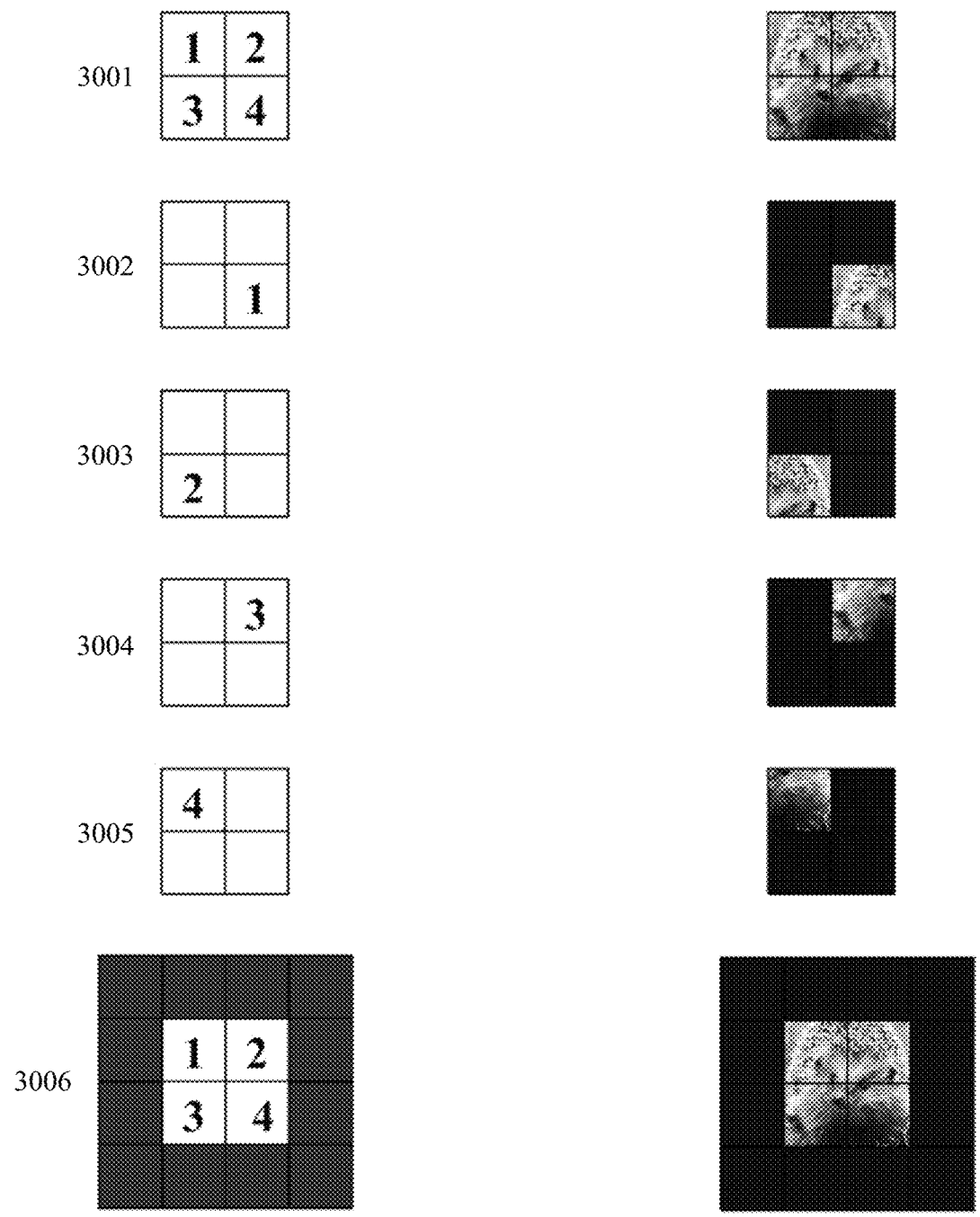
FIG. 30 illustrates how a fast refresh rate image source may be used with a low resolution high refresh rate optical masking element for positioning of the small image on the final image.

FIG. 30 illustrates how a fast refresh rate image source may be used with a low resolution high refresh rate optical masking element for positioning of the small image on the final image. In FIG. 30 there is a source image 3001, with portions 1, 2, 3 and 4. Frames 3002, 3003, 3004, 3005 are consecutive frames displayed by the fast refresh rate image source. For the first consecutive frame 3002, only the bottom-right shutter of the optical masking element is set to transmit the beam. For the consecutive frame 3003 only the bottom-left shutter of the optical masking element is set to transmit the beam. For the consecutive frame 3004, only the top-right shutter of the optical masking element is set to transmit the beam. For the consecutive frame 3005, only the top-left shutter of the optical masking element is set to transmit the beam. Persistence of vision blends the 4 consecutive frames 3002, 3003, 3004, 3005 into a single optically and digitally reconstructed small image 3006. A different configuration of displayed source image portion and shutter visibility in each consecutive frame is also possible.

If the optical masking element is larger than 2×2, then a 2×2 portion of the optical masking element may be used in the consecutive frames described above and the shutters outside of that portion may remain non-transmitting in those consecutive frames. A 5×5 or 3×3 or other small size optical shutter array optical masking element may be a more cost effective solution than using a high resolution reflective or transmissive display or microdisplay for the optical masking element. Another advantage with this approach is the ability to have the optical masking element not on an image plane 1505 but also right before or right after the duplication element 1503, thus allowing to minimize the physical space requirements of the system. With such a fast refresh rate image source and low resolution high refresh rate optical masking element, the positioning precision is only limited by the resolution of the image source. There may be no need for an intermediate image plane 1505 with these embodiments and the image may be formed directly on the screen.

Instead of blocking all but one duplicate beam in each consecutive frame, it is possible to direct the source image beam to only one direction at a time with, for example, switchable liquid crystal polarization rotators and reflective polarizer beam splitters, for increasing light efficiency. A disadvantage with this approach may be the physical space required.

With any duplication element, an extra LCD shutter or polarizer in front of or after each duplication element may be used for reducing stray light.

Increasing Resolution with Intentional Image Distortion

Fixed foveation or static foveation are terms that are used to refer to an image with higher pixel density in its middle portion and field of view which is not repositioned based on the viewer's gaze direction. In some VR headsets this is performed on the image digitally to reduce CPU and GPU usage. With fixed foveation the resolution in any part of the image cannot be higher than the pixel density the screen allows. In some VR headsets, fixed foveation is also a result of using a single element lens which produces pincushion distortion and more pixels get concentrated on the middle of the final image. The amount of distortion from single element lenses is not high and is not considered a significant increase to the resolution of the middle portion of the final image.

It is possible to have actual significant variable resolution while using an ordinary eyepiece lens or even other optical elements when using projection lenses and screens. The solution involves applying intentional image distortion to the image or beam before it reaches the projection screen or on the projection screen, such as inside the projection lens or before the projection lens. In one embodiment, image distortion is applied inside the small or large image optical element. Thus the image that is projected on the projection screen already has the image distortion applied, and the distortion does not depend on the eyepiece which is facing the projection screen. This allows the use of an ordinary eyepiece lens with the screen. This is another advantage with using projection beams and projection screens rather than display panels.

Figure 31:
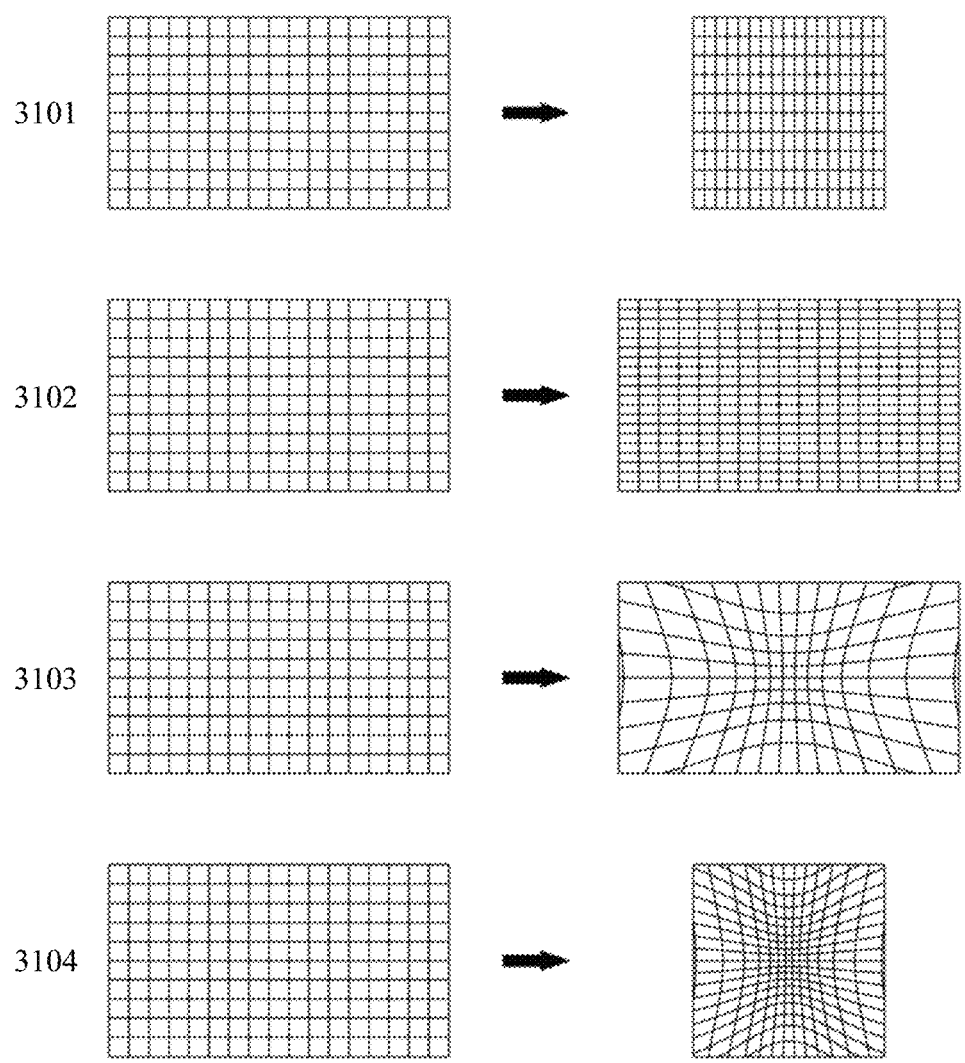
FIG. 31 illustrates various methods of increasing the resolution of an image, in accordance with an embodiment.

FIG. 31 illustrates various methods of increasing the resolution of an image, in accordance with an embodiment. In FIG. 31, intentional image distortion 3103 is illustrated. Intentional image distortion may also be combined with a high resolution small image and a low resolution large image. One purpose may be to ensure somewhat high resolution when the eye tracking is turned off, when eye tracking malfunctions or when the eye tracking falls behind due to a lower refresh rate than the eye saccadic movement.

In embodiments where the position of the high resolution small image on the low resolution large image is not changed and is in the middle portion of the low resolution large image, pincushion or similar distortion may be applied to the high resolution small image while barrel or similar distortion is applied to the low resolution large image, to ensure the pixels which are in the middle of the low resolution large image are not wasted by being optically or digitally masked and rather higher pixel density is provided to the visible portion of the low resolution large image as well as to the high resolution small image.

In embodiments with a rear projection screen or a separate LCD, OLED or micro-LED low resolution large image source, the distortion on the low resolution large image may be achieved with a fiber optic faceplate or taper adhered or attached to the rear projection screen or low resolution large image source where the size and/or arrangement of the fiber tips on one surface of the faceplate or taper do not match with the other surface.

Increasing Resolution with Pixel Shifting

Pixel shifting or beam shifting refers to a technique used in digital cameras and video projectors for increasing the capture or display resolution by optically shifting or offsetting the capture or projected beam after each consecutive frame. With digital cameras the sensor pixels may be physically shifted and a high resolution image generated digitally by digitally combining the offset frames while with video projectors an actuator with a rotating/tilting optical slab in front of a DLP or LCoS microdisplay is employed, such as Optotune© XPR-9-2P, and each frame the microdisplay generates several consecutive frames which the actuator slab shifts to have pixels fill the pixel gaps of the pixels from the previous position. Persistence of vision blends the consecutive frames into a single higher resolution frame. The actuator may shift 2 to 4 or more consecutive frames for each complete frame to increase the resolution 2 to 4 or more times. This technique is how many video projectors achieve 3840×2160 pixels resolution from a microdisplay with only 1920×1080 pixels resolution. The technique helps keep microdisplays small, and helps meet higher resolution requirements without reaching the diffraction limit in the optical system. The actuator may also be used to only shift the same frame pixels just enough to fill the pixel gaps and reduce the screen-door effect without increasing the resolution.

With LCoS, pixel shifting may not be practical due to the relatively slower liquid crystal pixel switching speeds of LCoS and since consecutive frames are already used to display separate color channels of a frame with "color-sequential" operation which is the method used for AR. Color-sequential operation suffers from an image artifact known as the "rainbow artifact". As described already the rainbow artifact may be eliminated by using a separate LCoS microdisplay per color channel and combining the different color channel beams with dichroic filters, an X-Cube prism and/or a trichoric prism. When doing this the refresh rate of the LCoS microdisplay is increased by 3, 4 or more times since the same LCoS microdisplay does not need to display the different color channels of each frame. The frame rate may then be used for displaying more consecutive frames together with pixel shifting to increase the resolution of the final image.

FIG. 31 illustrates various methods of increasing the resolution of an image, in accordance with an embodiment. FIG. 31 shows how a pixel grid looks 3102 before and after pixel shifting, in accordance with an embodiment.

Pixel shifting may also be performed by mirrors attached to actuators. Pixel shifting may also be achieved without mechanically moving parts, such as with a liquid or liquid crystal prism or microprism array or liquid crystal polarization rotator before or after a birefringent optical element such as a calcite or quartz plate. With a non-mechanical component pixel shifting may also be performed for a larger LCD, OLED or micro-LED display panel and may also be placed before, inside or after an eyepiece, although the pixel shifting optical element may be fragile in such an embodiment.

With video projectors the 4 consecutive frames are generated from one higher resolution frame, however with VR headsets the frame is updated based on head rotation and position so rendering all of the 2, 3, 4 or more consecutive frames in advance may result in visual artifacts. A solution is not shifting 2, 3, 4 or more consecutive frames of a single high resolution frame rendered in advance but having the consecutive frames rendered in real time and/or the consecutive frames digitally warped in real-time for the correct pixel data to match the new head rotation and position.

Besides pixel shifting per consecutive frame, pixel shifting may also be performed per frame, for example for the low resolution large image, provided the refresh rate is fast enough to not introduce noticeable flicker.

A pixel shifting pattern may be intentionally not synced for the images for each eye to reduce possible noticeable flicker.

Pixel shifting has some similarities to interlaced video and displaying, a difference being that the refresh rate is higher. Additionally, since there isn't a complete black pixel row displayed for each frame with pixel shifting but rather the pixel rows of the consecutive frames partially overlap, and since the consecutive frames may be rendered in real time rather than in advance, visual artifacts such as "combing" are less noticeable. Additionally, due to the real time nature of VR and AR content, pixel shifting may be turned off during rapid head or eye movement or turned off for objects displayed in the frames with rapid motion, by not rendering pixel information for them in a consecutive frame, to reduce any possible remaining visual artifacts.

Increasing Resolution by Changing the Aspect Ratio of the Source Image

A typical aspect ratio of a VR head-mounted display image is about 1:1 per eye. Using a 16:9 aspect ratio microdisplay as an image source for such a VR headset may result in very underutilized pixel count with nearly half of the pixels unused. However with a projector 2003, 2103, 2203 inside a VR headset there may be enough physical space for relatively small projection lenses. By using cylindrical, freeform or anamorphic lens elements or anamorphic prisms it is possible to change the aspect ratio of the source image from 16:9 to something like 1:1. While pixels may not be near-perfect squares anymore, at certain magnification and pixel density it may not be perceivable and may provide almost twice the pixel density in one axis of the image. FIG. 31 illustrates how pixels of such source image which has had its aspect ratio changed look like 3101.

Combining Intentional Image Distortion, Pixel Shifting and Changing the Aspect Ratio of the Source Image As illustrated in FIG. 31, intentional image distortion, pixel shifting and changing the aspect ratio of the source image may be combined 3104 to increase the resolution of the image even further. For example, if intentional image distortion 3103 is applied to a source microdisplay with a resolution of 1920×1080 pixels to produce 1.33 times more pixels in the middle portion of the image, then the resulting image may have a resolution of around a 2553×1436 pixel resolution image when viewing the middle portion of the image and around 1440×812 pixel resolution image on the very edges. If a two consecutive frame pixel shifting 3102 is applied to such an image before or after the intentional image distortion 3103, the resulting image may have a resolution of around a 2553×2872 pixel resolution image when viewing the middle portion of the image and around 1440×1624 pixel resolution image on the very edges. If the aspect ratio of the source image is changed from 16:9 to closer to a 1:1 ratio 3101, then a similar pixel density in both axes of the final image may be achieved with an eyepiece with equal or almost equal horizontal and vertical fields of view. This may be applied to both the high resolution small image and low resolution large image.

As an example, if the image source is made of three LCoS panels with a 240 Hz refresh rate combined with an X-Cube prism or dichroic prisms, two consecutive frames may be used for displaying the two pixel-shifted portions of the high resolution small image and the next consecutive 2 frames may be used for displaying the two pixel-shifted portions of the low resolution large image. Such high resolution images may require considerable amount of processing power to render so eye tracking and foveated content generated based on the eye tracking data may still be used.

One or more of these methods may be used with a lens array image duplication element to allow a reduction in the size of the lens array and avoid issues that may arise with lens arrays with many lenslets, such as light efficiency and diffraction limit. One or more of these techniques may be applied to both the small image and large image, and they may share the optical elements performing these tasks, for example by having the lens elements before, inside or part of the projection lens. Although these three methods may not increase resolution as much as having a separate small and large image, they may help in increasing the size of the high resolution small image and/or the size of the transition region between the small image and large image and may allow the low resolution large image to have more resolution, all of which may provide a more seamless variable resolution image to the viewer.

High Gain Video Projection Screen for Head-Mounted Display

Figure 32B:
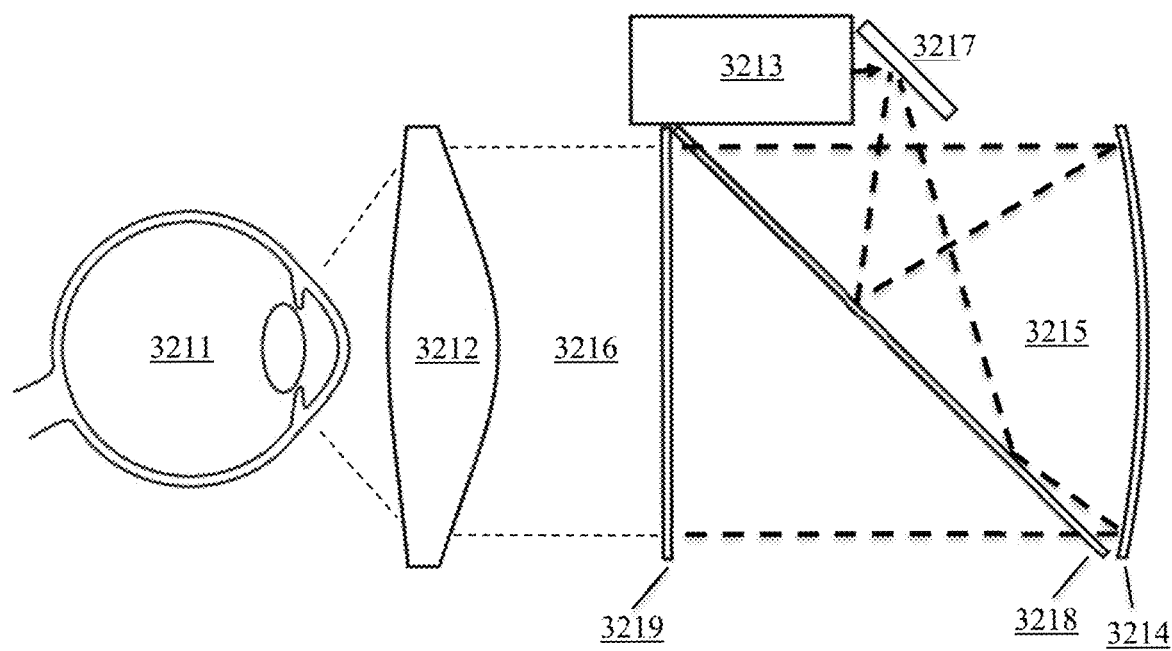
FIG. 32B illustrates how a curved mirror, beam splitter and rear projection screen with engineered scattering properties may be used to steer the projection beam by the curved mirror and scatter it by a specific amount by the rear projection screen to achieve a very high gain projection screen, in accordance with an embodiment.
Figure 32C:
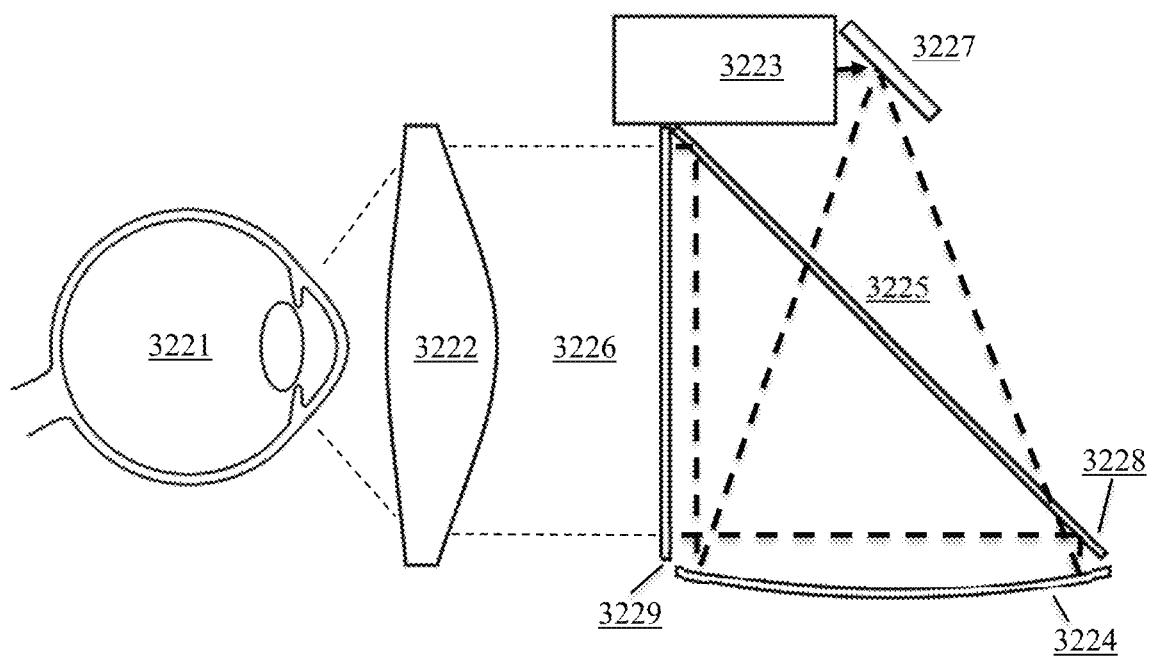
FIG. 32C illustrates a different configuration of how a curved mirror, beam splitter and rear projection screen with engineered scattering properties may be used to steer the projection beam by the curved mirror and scatter it by a specific amount by the rear projection screen to achieve a very high gain projection screen, in accordance with an embodiment.

Video projection screen gain refers to the brightness of the image from the screen, usually using a barium sulfate or magnesium carbonate surface as a reference which have a gain of 1.0. A video projection screen works by reflecting and scattering the image beam projected onto it in a specific way. High gain usually corresponds with a narrow scattering angle and therefore limited viewable area in front of or behind the screen. Unlike traditional video projectors, VR or AR head-mounted displays have screen and projected image positions mostly fixed to the viewer's eye, so the projection screen may be engineered to have much smaller viewable area corresponding to the size of the eye-box and therefore provide much higher gain than a traditional video projection screen. On the other hand, there are stricter requirements for the screen surface and structures such as microscopic glass beads on the screen since the video projection pixels inside a head-mounted display are much smaller as well and parts of such structures may end up either outside of the depth of focus of the projection or degrade resolution by causing too much scattering or cause diffraction. A solution to this issue may be to have the projection screen inside a head-mounted display be used to not only scatter the projected pixel beams but to also steer them by having the screen be biaxially curved, as is illustrated in FIG. 32A. For a rear projection screen, a curved mirror or lens may be used for steering instead and the rear projection screen itself may be flat and responsible for scattering but not steering, as is illustrated in FIGS. 32B and 32C, or the screen may still be biaxially curved for matching a field curvature of an eyepiece lens. The screen may then be engineered to increase the reflected pixel beam angle due to scattering by a specific amount required by the eyepiece eye-box and not more for providing a very high gain projection screen.

FIG. 32A illustrates how a curved projection screen may be used with engineered reflective and scattering properties to both steer the projection beam as well as scatter it by a specific amount to achieve a very high gain projection screen, in accordance with an embodiment. In FIG. 32A the projector 3203 produces an image that is reflected off of a mirror 3207. The mirror 3207 reflects the light to a beam splitter 3208 which reflects the projection beam 3205 onto the curved projection screen 3204. The curved projection screen 3204 both steers and scatters the projection beam 3205. The human eye 3201 is behind an eyepiece lens 3202 or other optics and the viewer sees through the beam splitter 3208 the steered and scattered light 3206 from the image on the screen 3204.

FIG. 32B illustrates how a curved mirror, beam splitter and rear projection screen with engineered scattering properties may be used to steer the projection beam by the curved mirror and scatter it by a specific amount by the rear projection screen to achieve a very high gain projection screen, in accordance with an embodiment. In FIG. 32B the projector 3213 produces an image beam that is reflected off of a mirror 3217. The mirror 3217 reflects the light to a beam splitter 3218 which reflects the projection beam 3215 onto the curved mirror 3214. The curved mirror 3214 only steers and does not scatter the projection beam 3215. The projection beam 3215 is then steered and focused onto a rear projection screen 3219, which scatters but does not steer the projection beam 3215. The human eye 3211 is behind an eyepiece lens 3212 or other optics and the viewer sees the scattered light 3216 from the image on the screen 3219. The curvature of the mirror 3224 may also be freeform, for example for the mirror to steer a projection beam which may not be perfectly perpendicular to it and may not be reflected from a beam splitter.

FIG. 32C illustrates a different configuration of how a curved mirror, beam splitter and rear projection screen with engineered scattering properties may be used to steer the projection beam by the curved mirror and scatter it by a specific amount by the rear projection screen to achieve a very high gain projection screen, in accordance with an embodiment. In FIG. 32C the projector 3223 produces an image beam that is reflected off of a mirror 3227. The mirror 3227 reflects the light to a beam splitter 3228 which on the first pass transmits the projection beam 3225 onto the curved mirror 3224. The curved mirror 3224 only steers and does not scatter the projection beam 3225 onto a rear projection screen 3229 through a reflection from the beam splitter 3228. The human eye 3221 is behind an eyepiece lens 3222 or other optics and the viewer sees the scattered light 3226 from the image on the screen 3229.

To reduce light loss and image artifacts, the beam splitter 3208, 3218, 3228 may be a reflective polarizer beam splitter and there may be an additional quarter wave plate placed between the reflective polarizer beam splitter 3208, 3218, 3228 and the curved screen 3204 or mirror 3214, 3224. An additional absorptive polarizer may be placed before the eye or before, inside or after the eyepiece to filter out any reflections or stray light from the projection lens on the reflective polarizer or quarter wave plate.

Size of projected pixels is less of an issue with HMPDs (Head-Mounted Projective Display), and a regular retro-reflective projection screen may be used with them, which are known to provide considerable amount of screen gain.
Contrast and Bit Depth (Color Depth) Enhancement without Optical Masking Element Consecutive frames or time multiplexed as well as optically overlayed small and large images may be used not only to increase resolution, but also to increase contrast and bit depth (color depth) of the final image. With pixel shifting, consecutive frames, since their pixels partially overlap, may be used for enhancing contrast or bit depth (color depth) of the final image. With bit depth (color depth) enhancement specifically, one consecutive frame may be used to display a specific color information, while the other may display the rest of the color information. Brightness of the consecutive frames may be adjusted electrically or optically, if needed.

Figure 33:
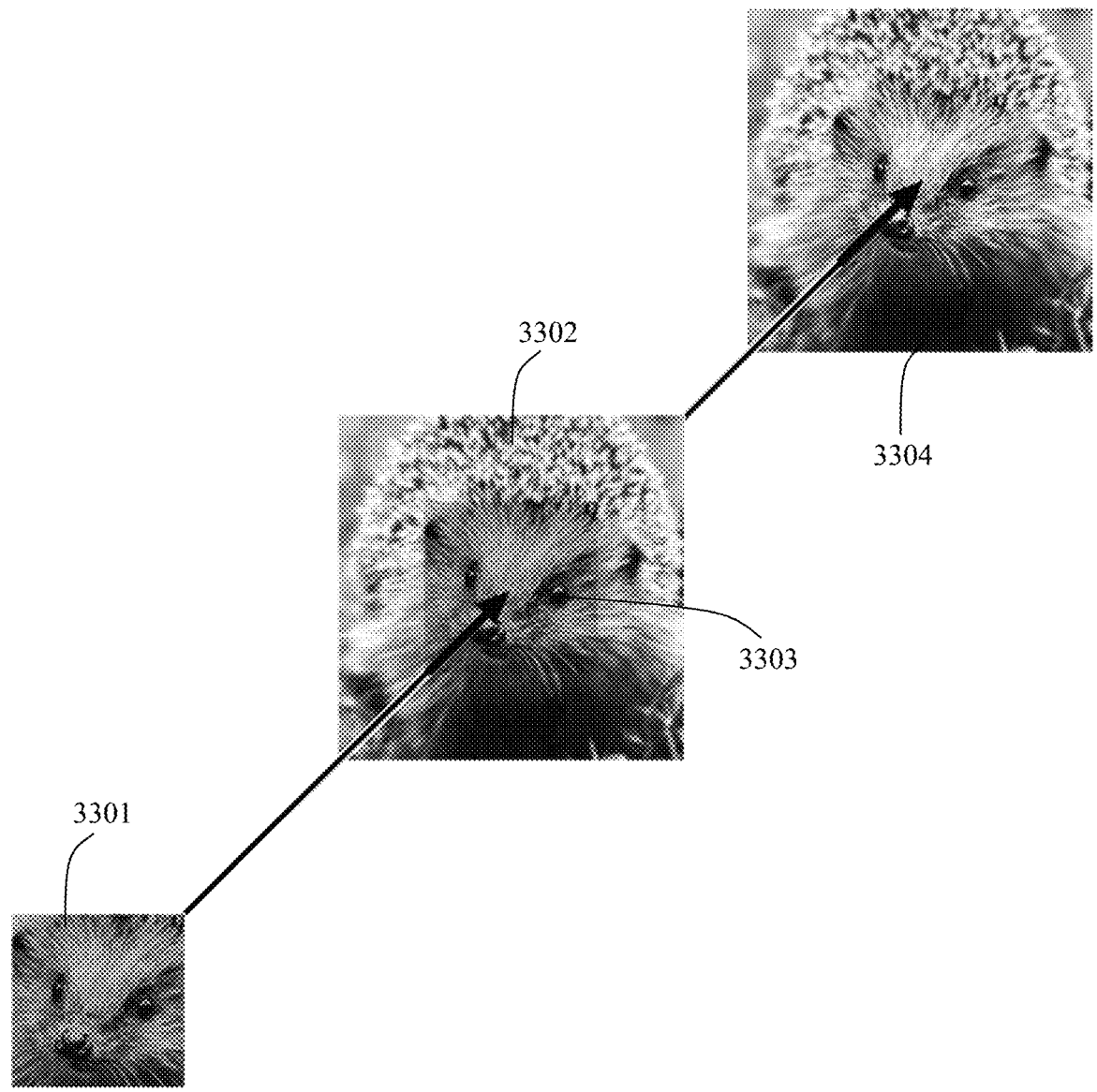
FIG. 33 illustrates how the pixel information displayed by the high resolution small image and the region of the low resolution large image that corresponds to the high resolution small image may be used together to increase at least one of a contrast or bit depth (color depth) of the region of the final image corresponding to the high resolution small image, in accordance with an embodiment.

FIG. 33 illustrates how the pixel information displayed by the high resolution small image and the region of the low resolution large image that corresponds to the high resolution small image may be used together to increase at least one of a contrast or bit depth (color depth) of the small image portion of the final image, in accordance with an embodiment. With embodiments with a small image and large image as illustrated in FIG. 33, instead of completely masking the portion of the low resolution large image that corresponds to the high resolution small image (referred to as a high resolution small image copy portion 3303 of the large image 3302) by displaying black pixels there, a copy of the high resolution small image may be displayed there instead 3303, albeit at a lower resolution. The brightness may be electrically or optically adjusted for the small image 3301 and digitally for the copy of the high resolution small image portion 3303 on the large image 3302 to ensure brightness uniformity across the final image 3304. Since the brightness of the high resolution small image 3301 is adjusted electrically or optically, the pixel information displayed by the high resolution small image 3301 and the high resolution small image copy portion of the large image 3303 may serve to increase at least one of a contrast or bit depth (color depth) of the small image portion of the final image.
Enhancing Non-VR Content Displayed by a Variable Resolution Screen A variable resolution screen head-mounted display may be used to display non-VR content, for example a desktop of an operating system. There are several visual effects to enhance such 2D frames with a variable resolution screen head-mounted display not possible with other display devices and to make the 2D frames appear to cover more field of view than they actually do.

FIG. 34 illustrates various visual effects that may be applied beyond a source 2D frame on a variable resolution screen, in accordance with an embodiment. In FIG. 34, image 3401 shows a source 2D frame while images 3402, 3403 and 3404 show visual effects applied beyond the frame. Image 3402 shows a visual effect where the pixels on the edges of the frame are used beyond the 2D frame. Various image filters may be applied to these pixels, for example a gaussian blur or zoom blur (what is illustrated) to achieve various effects. Similar video effects exist on some TVs where there are colored LEDs on the back side of the TV illuminating the wall behind the TV. Since here there is more control on what can be displayed beyond the edges of the frame rather than a simple diffuse reflection as in the TV example, more effects are possible. Image 3403 illustrates such an advanced effect. The source frame is digitally scaled up, placed on the back of the source frame and blurred to not take the attention of the viewer from the source small frame displayed in the middle. A similar effect is commonly used in videos when a non 16:9 aspect ratio content is displayed on a 16:9 frame, instead of merely displaying black or white borders. In our example the effect is not only applied to two edges of the 2D frame but all around it. Image 3404 illustrates a more advanced effect which needs more information from the source rather than just the 2d frames. In the middle the actual 2d frame is displayed, while beyond the frame a lower resolution continuation of the frame is displayed. This effects requires the video input source to supply the video beyond the frame as well. The source in this instance may be a PC program or video game.

The head-mounted display with a variable resolution screen may take the 2D frame from an input, for example a desktop of an operating system, while displaying another content on the pixels beyond the frame, for example a 3D rendering of a virtual office or home environment. In this example the 2D frame may appear floating in the middle of the viewer's field of view while the 3D rendering may be updated to match the viewer's head position and rotation. Such a visual effect may be useful when switching between a desktop of an operating system and a VR program without having to take off the head-mounted display to be able to see the desktop on a monitor and then put it back on again.

The foregoing devices and operations, including their implementation, will be familiar to, and understood by, those having ordinary skill in the art. All sizes and proportions used in this description could be scaled up or down or changed without impacting the scope of these inventions.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

What is claimed is:
1. A head-mounted display, comprising:
an image source configured to output one or more image components; and
one or more optical element configured to receive the one or more image components and output one or more images focused onto a projection screen that scatters and steers the one or more images for viewing by a viewer's retina.
2. The head-mounted display of claim 1, wherein the image source comprises a separate display or microdisplay panel for each color channel of a plurality of color channels, the head-mounted display further comprising:
at least one of a trichroic prism, an X-cube prism or a dichroic filter to optically combine the plurality of color channels.
3. The head-mounted display of claim 2, wherein the head-mounted display comprises the projection screen, and wherein the projection screen is a rear projection screen in front of or part of an emissive or transmissive display panel, and wherein the projection screen is configured to scatter light from the emissive or transmissive display panel to cause a visible image from the projection screen and the emissive or transmissive display panel to be on a same focal plane.
4. The head-mounted display of claim 3, wherein the emissive or transmissive display panel is a liquid crystal display (LCD) panel, an organic light emitting diode (OLED) display panel, or a micro-LED display panel.

5. The head-mounted display of claim 2, further comprising:
an emissive or transmissive display panel configured to provide increased contrast or color depth for the one or more images; and
the projection screen, wherein the projection screen is a rear projection screen in front of or part of the emissive or transmissive display panel.

6. The head-mounted display of claim 5, wherein the emissive or transmissive display panel is a liquid crystal display (LCD) panel, an organic light emitting diode (OLED) display panel, or a micro-LED display panel.

7. The head-mounted display of claim 1, wherein the projection screen is a rear projection screen.

8. The head-mounted display of claim 1, wherein the projection screen is biaxially curved.

9. The head-mounted display of claim 1, further comprising:
a liquid crystal display, a liquid crystal microdisplay, or a liquid crystal shutter array configured to phase modulate at least one image of the one or more images.

10. The head-mounted display of claim 1, further comprising:
a pixel shifting element configured to perform pixel shifting to increase a resolution of at least one image of the one or more images.

11. The head-mounted display of claim 10, wherein the pixel shifting element is selected from the group consisting of:
a liquid prism,
a liquid crystal prism,
a liquid crystal microprism array, and
a liquid crystal polarization rotator and a birefringent optical element before or after the liquid crystal polarization rotator.

12. The head-mounted display of claim 1, wherein the projection screen is a front projection screen that is biaxially curved and that both steers and scatters a projection beam comprising the one or more images.

13. The head-mounted display of claim 1, wherein the one or more image components comprises a plurality of consecutive frames, and wherein the head-mounted display is to use the plurality of consecutive frames to enhance a contrast or a bit depth of the one or more images.

14. A head-mounted display, comprising:
an image source configured to output one or more image components; and
one or more optical element configured to receive the one or more image components and output one or more images onto a projection screen;
wherein the one or more image components comprise a high resolution, small image component and a low resolution, large image component, wherein the one or more optical element is configured to receive the high resolution, small image component and output a high resolution, small image and to receive the low resolution, large image component and output a low resolution, large image, and wherein the high resolution, small image and the low resolution, large image appear as a variable resolution image on the projection screen.

15. The head-mounted display of claim 14, wherein the one or more optical element comprises a small image optical element configured to receive the high resolution, small image component and a large image optical element configured to receive the low resolution, large image component, and wherein the small image optical element and the large image optical element share one or more of their constituents.

16. The head-mounted display of claim 14, wherein the one or more optical element comprises a small image optical element configured to receive the high resolution, small image component and a large image optical element configured to receive the low resolution, large image component, and wherein the small image optical element includes a duplication element and an optical masking element, and wherein:
the duplication element is to receive the high resolution, small image and output a plurality of duplicates of the high resolution, small image; and
the optical masking element is to mask off one or more of the plurality of duplicates of the high resolution, small image such that at least portions of one or more duplicates of the high resolution, small image remain, wherein at least the portions of the one or more duplicates of the high resolution, small image form a complete single duplicate of the high resolution, small image that is focused onto a target position on the projection screen.

17. The head-mounted display of claim 16, wherein the duplication element comprises:
a beam splitter; and
a lens or a lens array.

18. The head-mounted display of claim 16, wherein the duplication element comprises:
a beam splitter array; and
a lens or a lens array.

19. The head-mounted display of claim 16, wherein the duplication element comprises:
at least one of a multi-element lens or a lens array configured to reduce optical aberrations in the plurality of duplicates of the high resolution, small image.

20. The head-mounted display of claim 14, further comprising:
an image steering element configured to control a placement of the high resolution, small image on the projection screen.

21. The head-mounted display of claim 20, wherein the image steering element comprises a liquid crystal prism.

22. The head-mounted display of claim 20, wherein the image steering element comprises a birefringent element and liquid crystal polarization rotator.

23. The head-mounted display of claim 14, wherein at least one of the high resolution, small image or the low resolution, large image is a light field image.

24. The head-mounted display of claim 14, wherein pixel information displayed by the high resolution, small image and a region of the low resolution, large image that corresponds to the high resolution, small image are used together to enhance a contrast or bit depth of the high resolution, small image as it appears in the variable resolution image on the projection screen.

25. A head-mounted display, comprising:
an image source configured to output one or more image components;
one or more optical element configured to receive the one or more image components and output one or more images onto a projection screen that scatters the one or more images for viewing by a viewer's retina through an eyepiece; and the eyepiece, configured to view the projection screen, wherein the eyepiece comprises a liquid crystal lens to provide variable image focus based on eye tracking data.

26. A head-mounted display, comprising:
an image source configured to output one or more image components; and
one or more optical element configured to receive the one or more image components and output one or more images having an intentional image distortion onto a projection screen, the intentional image distortion comprising at least one of pincushion distortion or barrel distortion;
wherein the head-mounted display is configured to increase a resolution of at least one image of the one or more images with the intentional image distortion.

27. The head-mounted display of claim 26, wherein the projection screen is a viewer's retina.

28. A head-mounted display, comprising:
an image source configured to output one or more image components;
one or more optical element configured to receive the one or more image components and output one or more images onto a projection screen; and
an optical masking element configured to display a copy of at least one image of the one or more images to provide at least one of an increased contrast or an increased color depth for the at least one image, wherein the optical masking element comprises at least one of a microdisplay or a display.

29. The head-mounted display of claim 28, wherein the projection screen is a viewer's retina.

30. A head-mounted display, comprising:
an image source configured to output one or more image components having a first aspect ratio; and
one or more optical element configured to receive the one or more image components having the first aspect ratio and output one or more images having a second aspect ratio onto a projection screen;
wherein a resolution of the one or more images is increased based on changing from the first aspect ratio to the second aspect ratio for the one or more images.

31. The head-mounted display of claim 30, wherein the projection screen is a viewer's retina.

32. A head-mounted display, comprising:
an image source configured to output one or more image components, wherein the image source comprises a separate display or microdisplay panel for each color channel of a plurality of color channels;
at least one of a trichroic prism, an X-cube prism or a dichroic filter to optically combine the plurality of color channels; and
one or more optical element configured to receive the one or more image components and output one or more images onto a projection screen, wherein the head-mounted display is a head-mounted projective display (HMPD) and the projection screen is an external projection screen that is not part of the head-mounted display.

* * * * *